United States Patent [19]
Van Loo et al.

[11] Patent Number: 5,657,472
[45] Date of Patent: Aug. 12, 1997

[54] MEMORY TRANSACTION EXECUTION SYSTEM AND METHOD FOR MULTIPROCESSOR SYSTEM HAVING INDEPENDENT PARALLEL TRANSACTION QUEUES ASSOCIATED WITH EACH PROCESSOR

[75] Inventors: William C. Van Loo, Palo Alto; Zahir Ebrahim, Mountain View; Satyanarayana Nishtala, Cupertino; Kevin Normoyle, San Jose; Leslie Kohn, Fremont; Louis F. Coffin, III, San Jose; Charles E. Narad, Santa Clara, all of Calif.

[73] Assignee: Sun Microsystems, Inc., Mountain View, Calif.

[21] Appl. No.: 414,922

[22] Filed: Mar. 31, 1995

[51] Int. Cl.$^6$ ........................................ G06F 12/00
[52] U.S. Cl. ................................... 395/485; 395/470
[58] Field of Search .............................. 395/467, 468, 395/469, 473, 477, 481, 485, 449, 447

[56] References Cited

U.S. PATENT DOCUMENTS

| | | | |
|---|---|---|---|
| 4,228,503 | 10/1980 | Waite et al. | 395/448 |
| 4,747,043 | 5/1988 | Rodman | 395/451 |
| 4,992,930 | 2/1991 | Gilfenther et al. | 395/448 |
| 5,036,459 | 7/1991 | den Haan et al. | 395/200.14 |
| 5,058,006 | 10/1991 | Durdan et al. | 395/449 |
| 5,193,163 | 3/1993 | Sanders et al. | 395/449 |

(List continued on next page.)

FOREIGN PATENT DOCUMENTS

| | | |
|---|---|---|
| 0317481A3 | 5/1989 | European Pat. Off. |
| 89306534 | 6/1989 | European Pat. Off. |
| 0380842A2 | 8/1990 | European Pat. Off. |

(List continued on next page.)

OTHER PUBLICATIONS

"Rochester's Intelligent Gateway"; K.A. Lantz et al.; IEEE, vol. 15, No. 10, Oct. 1982; pp. 54–68.

"An approach to the design of distributed real–time operating systems"; Cvijovic,; Microprocessors and Microsystems; vol. 16, No. 2; 1992; pp. 81–89.

"A Second–Level Cache Controller for A Super–Scalar SPARC Procesor"; Chang et al.; 37th IEEE CompCon Conference; 2–24–28–92; pp. 142–151.

*Primary Examiner*—Eddie P. Chan
*Assistant Examiner*—Hong C. Kim
*Attorney, Agent, or Firm*—Gary S. Williams; Flehr Hohbach Test Albritton & Herbert LLP

[57] ABSTRACT

A multiprocessor computer system is provided having a multiplicity of sub-systems and a main memory coupled to a system controller. An interconnect module, interconnects the main memory and sub-systems in accordance with interconnect control signals received from the system controller. At least two of the sub-systems are data processors, each having a respective cache memory that stores multiple blocks of data and a respective master cache index. Each master cache index has a set of master cache tags (Etags), including one cache tag for each data block stored by the cache memory. Each data processor includes a master interface for sending memory transaction requests to the system controller and for receiving cache access requests from the system controller corresponding to memory transaction requests by other ones of the data processors. In the preferred embodiment, each memory transaction request is classified into one of two distinct master classes: a first transaction class including read memory access requests and a second transaction class including writeback memory access requests. The master interface and system controller have corresponding parallel request queues, one for each master class, for transmitting and receiving memory access requests. The system controller further includes memory transaction request logic for processing each memory transaction request and a duplicate cache index having a set of duplicate cache tags (Dtags), including one cache tag corresponding to each master cache tag in an associated data processor.

13 Claims, 19 Drawing Sheets

U.S. PATENT DOCUMENTS

| | | | |
|---|---|---|---|
| 5,222,224 | 6/1993 | Flynn et al. | 395/471 |
| 5,226,150 | 7/1993 | Callander et al. | 395/185.1 |
| 5,319,753 | 6/1994 | MacKenna et al. | 395/868 |
| 5,398,325 | 3/1995 | Chang et al. | 395/403 |
| 5,428,799 | 6/1995 | Woods et al. | 395/739 |
| 5,432,918 | 7/1995 | Stamm | 345/483 |
| 5,434,993 | 7/1995 | Liencres et al. | 395/460 |
| 5,530,933 | 6/1996 | Frink et al. | 395/468 |
| 5,537,575 | 7/1996 | Foley et al. | 395/468 |

FOREIGN PATENT DOCUMENTS

| | | |
|---|---|---|
| 91401732 | 6/1991 | European Pat. Off. . |
| 91311835 | 12/1991 | European Pat. Off. . |
| 0468831A2 | 1/1992 | European Pat. Off. . |
| 0507571A3 | 10/1992 | European Pat. Off. . |
| 0537899A1 | 4/1993 | European Pat. Off. . |
| 0598535A1 | 5/1994 | European Pat. Off. . |
| 0644489A3 | 3/1995 | European Pat. Off. . |
| 96301927 | 6/1996 | European Pat. Off. . |
| WO93/00638 | 1/1993 | WIPO . |

| FIGURE 8A |
| FIGURE 8B |
| FIGURE 8C |
| FIGURE 8D |

MEMORY TRANSACTION EXECUTION SYSTEM AND METHOD FOR MULTIPROCESSOR SYSTEM HAVING INDEPENDENT PARALLEL TRANSACTION QUEUES ASSOCIATED WITH EACH PROCESSOR

The present invention relates generally to multiprocessor computer systems in which the processors share memory resources, and particularly to a multiprocessor computer system that utilizes an interconnect architecture and cache coherence methodology to minimize memory access latency by providing a master class interface architecture for allowing parallelized read and writeback transactions.

BACKGROUND OF THE INVENTION

The need to maintain "cache coherence" in multiprocessor systems is well known. Maintaining "cache coherence" means, at a minimum, that whenever data is written into a specified location in a shared address space by one processor, the caches for any other processors which store data for the same address location are either invalidated, or updated with the new data.

There are two primary system architectures used for maintaining cache coherence. One, herein called the cache snoop architecture, requires that each data processor's cache include logic for monitoring a shared address bus and various control lines so as to detect when data in shared memory is being overwritten with new data, determining whether it's data processor's cache contains an entry for the same memory location, and updating its cache contents and/or the corresponding cache tag when data stored in the cache is invalidated by another processor. Thus, in the cache snoop architecture, every data processor is responsible for maintaining its own cache in a state that is consistent with the state of the other caches.

In a second cache coherence architecture, herein called the memory directory architecture, main memory includes a set of status bits for every block of data that indicate which data processors, if any, have the data block stored in cache. The main memory's status bits may store additional information, such as which processor is considered to be the "owner" of the data block if the cache coherence architecture requires storage of such information.

In these cache coherence architectures, read-writeback transaction pairs arise when a read miss requires victimizing a cache line which has modified data, thereby necessitating a writeback to main memory. In the prior art, these transactions normally are strictly ordered, with the victimizing read transaction executing prior to the writeback transaction in order to allow the requesting processor to receive the data right away. In addition to the strict ordering, cache coherence architectures of the prior art required these read and writeback transactions be sequentially executed, not allowing for any other coherent transactions to be executed from the same processor between the read and the writeback transactions, even when transactions are directed to a different cache index. Accordingly, an interface architecture which allowed the separation of these transactions into parallel operations would provide reduced latency in processing the individual read-writeback transaction pairs along with an improvement in the overall transaction throughput.

The parallel memory transaction support of the present invention is also useful for increasing parallel transaction processing other than for read-writeback pairs. For instance, a read transaction from one main memory location followed by a write location to another main memory location may be performed in parallel if the two locations are in different main memory banks and neither memory bank is busy with previously initiated transactions. The present invention performs these two memory transactions in parallel, or during substantially overlapping time periods, whenever possible and thus reduces the average latency experienced by data processors.

SUMMARY OF THE INVENTION

In summary, the present invention is a multiprocessor computer system that has a multiplicity of sub-systems and a main memory coupled to a system controller. An interconnect module, interconnects the main memory and sub-systems in accordance with interconnect control signals received from the system controller.

All of the sub-systems include a port that transmits and receives data as data packets of a fixed size. At least two of the sub-systems are data processors, each having a respective cache memory that stores multiple blocks of data and a respective master cache index. Each master cache index has a set of N master cache tags (Etags), including one cache tag for each data block stored by the cache memory.

Each data processor includes a master interface for sending memory transaction requests to the system controller and for receiving cache access requests from the system controller corresponding to memory transaction requests by other ones of the data processors. In the preferred embodiment, each memory transaction request is classified into one of two distinct master classes: a first transaction class including read memory access requests and a second transaction class including writeback memory access requests. The master interface has at least two parallel independent outgoing request queues, one for each master class, for storing memory access requests to be sent to the system controller.

The system controller includes a corresponding interface coupled to each data processor for receiving and sending memory access requests to the respective data processors. The system controller interface includes at least two parallel independent incoming request queues for storing memory access requests received from the data processor, and a second interface including at least two parallel independent output request queues for storing transaction requests for transmission to the data processors.

The system controller further includes memory transaction request logic for processing each memory transaction request by a data processor, for determining which one of the cache memories and main memory to couple to the requesting data processor, for sending corresponding interconnect control signals to the interconnect module so as to couple the requesting data processor to the determined one of the cache memories and main memory, and for sending a reply message to the requesting data processor to prompt the requesting data processor to transmit or receive one data packet to or from the determined one of the cache memories and main memory.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
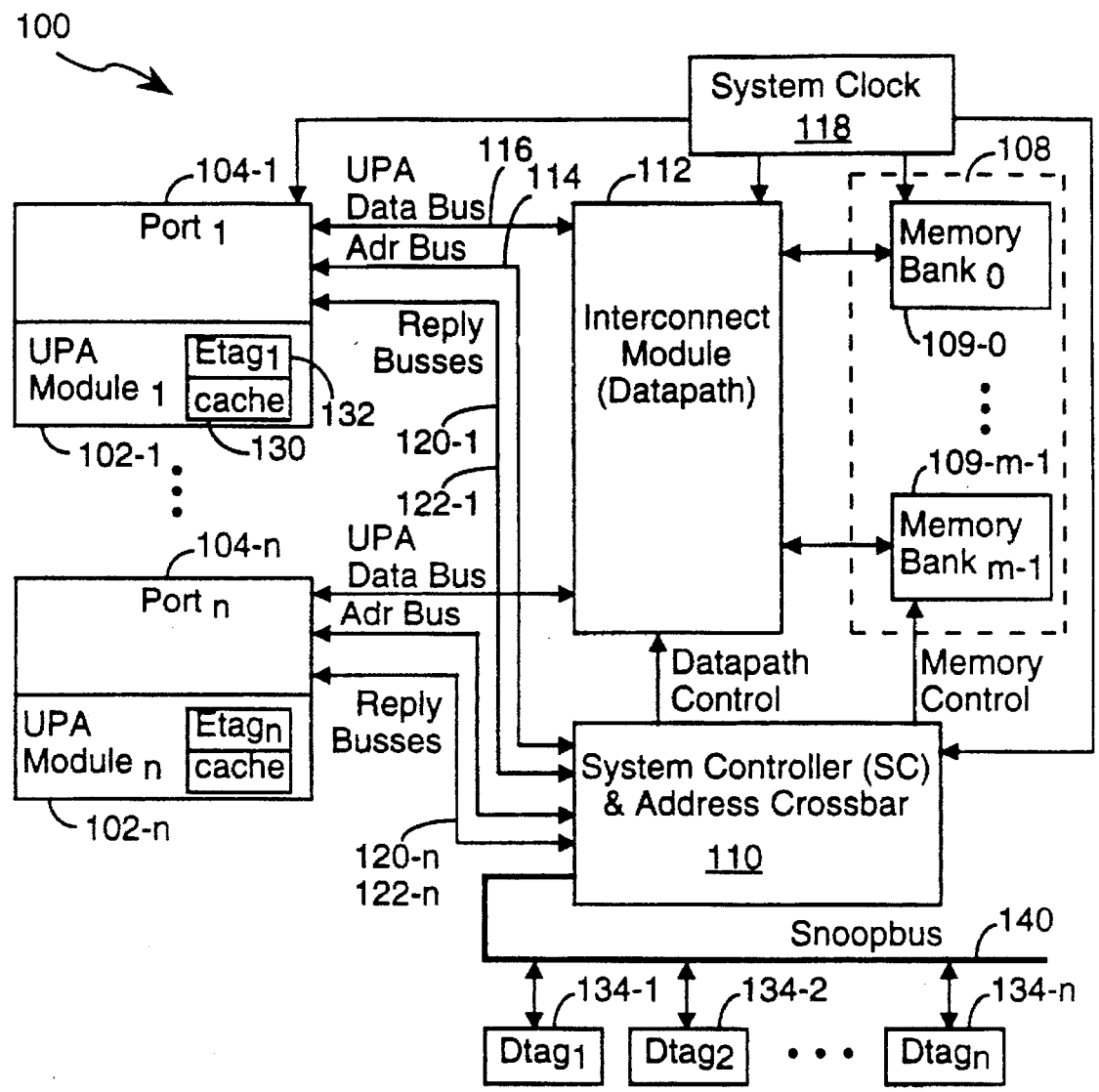
FIG. 1 is a block diagram of a computer system incorporating the present invention.

The following is a glossary of terms used in this document.

Cache Coherence: keeping all copies of each data block consistent.

Tag: a tag is a record in a cache index for indicating the status of one cache line and for storing the high order address bits of the address for the data block stored in the cache line.

Etag: the primary array of cache tags for a cache memory. The Etag array is accessed and updated by the data processor module in a UPA port.

Dtag: a duplicate array of cache tags maintained by the system controller.

Interconnect: The set of system components that interconnect data processors, I/O processors and their ports. The "interconnect" includes the system controller 110, interconnect module 112, data busses 116, address busses 114, and reply busses 120 (for S_REPLY's), 122 (for P_REPLY's) in the preferred embodiment.

Victim: a data block displaced from a cache line.

Dirty Victim: a data block that was updated by the associated data processor prior to its being displaced from the cache by another data block. Dirty victims must normally be written back to main memory, except that in the present invention the writeback can be canceled if the same data block is invalidated by another data processor prior to the writeback transaction becoming "Active."

Line: the unit of memory in a cache memory used to store a single data block.

Invalidate: changing the status of a cache line to "invalid" by writing the appropriate status value in the cache line's tag.

Master Class: an independent request queue in the UPA port for a data processor. A data processor having a UPA port with K master classes can issue transaction requests in each of the K master classes. Each master class has its own request FIFO buffer for issuing transaction requests to the System Controller as well as its own distinct inbound data buffer for receiving data packets in response to transaction requests and its own outbound data buffer for storing data packets to be transmitted.

Writeback: copying modified data from a cache memory into main memory.

The following is a list of abbreviations used in this document:

DVMA: direct virtual memory access (same as DMA, direct memory access for purposes of this document)

DVP: dirty victim pending

I/O: input/output

IVP: Invalidate me Advisory

MOESI: the five Etag states: Exclusive Modified (M), Shared Modified (O), Exclusive Clean (E), Shared Clean (S), Invalid (I).

MOSI: the four Dtag states: Exclusive and Potentially Modified (M), Shared Modified (O), Shared Clean (S), Invalid (I).

NDP: no data tag present

PA[xxx]: physical address [xxx]

SC: System Controller

UPA: Universal Port Architecture

Referring to FIG. 1, there is shown a multiprocessor computer system 100 incorporating the computer architecture of the present invention. The multiprocessor computer system 100 includes a set of "UPA modules." UPA modules 102 include data processors as well as slave devices such as I/O handlers and the like. Each UPA module 102 has a port 104, herein called a UPA port, where "UPA" stands for "universal port architecture." For simplicity, UPA modules and their associated ports will often be called, collectively, "ports" or "UPA ports," with the understanding that the port or UPA port being discussed includes both a port and its associated UPA module.

The system 100 further includes a main memory 108, which may be divided into multiple memory banks 109 Bank$_0$ to Bank$_m$, a system controller 110, and an interconnect module 112 for interconnecting the ports 104 and main memory 108. The interconnect module 112, under the control of datapath setup signals from the System Controller 110, can form a datapath between any port 104 and any other port 104 or between any port 104 and any memory bank 109. The interconnect module 112 can be as simple as a single, shared data bus with selectable access ports for each UPA port and memory module, or can be a somewhat more complex crossbar switch having m ports for m memory banks and n ports for n UPA ports, or can be a combination of the two. The present invention is not dependent on the type of interconnect module 112 used, and thus the present invention can be used with many different interconnect module configurations.

A UPA port 104 interfaces with the interconnect module 112 and the system controller 110 via a packet switched address bus 114 and packet switched data bus 116 respectively, each of which operates independently. A UPA module logically plugs into a UPA port. The UPA module 102 may contain a data processor, an I/O controller with interfaces to I/O busses, or a graphics frame buffer. The UPA interconnect architecture in the preferred embodiment supports up to thirty-two UPA ports, and multiple address and data busses in the interconnect. Up to four UPA ports 104 can share the same address bus 114, and arbitrate for its mastership with a distributed arbitration protocol.

The System Controller 110 is a centralized controller and performs the following functions:

Coherence control;

Memory and Datapath control; and

Address crossbar-like connectivity for multiple address busses.

The System Controller 110 controls the interconnect module 112, and schedules the transfer of data between two UPA ports 104, or between UPA, port 104 and memory 108. The architecture of the present invention supports an arbitrary number of memory banks 109. The System Controller 110 controls memory access timing in conjunction with datapath scheduling for maximum utilization of both resources.

The System Controller 110, the interconnect module 112, and memory 108 are in the "interconnect domain," and are coupled to UPA modules 102 by their respective UPA ports 104. The interconnect domain is fully synchronous with a centrally distributed system clock signal, generated by a System Clock 118, which is also sourced to the UPA modules 104. If desired, each UPA module 102 can synchronize its private internal clock with the system interconnect clock. All references to clock signals in this document refer to the system clock, unless otherwise noted.

Each UPA address bus 114 is a 36-bit bidirectional packet switched request bus, and includes 1-bit odd-parity. It carries address bits PA[40:4] of a 41-bit physical address space as well as transaction identification information.

Figure 2:
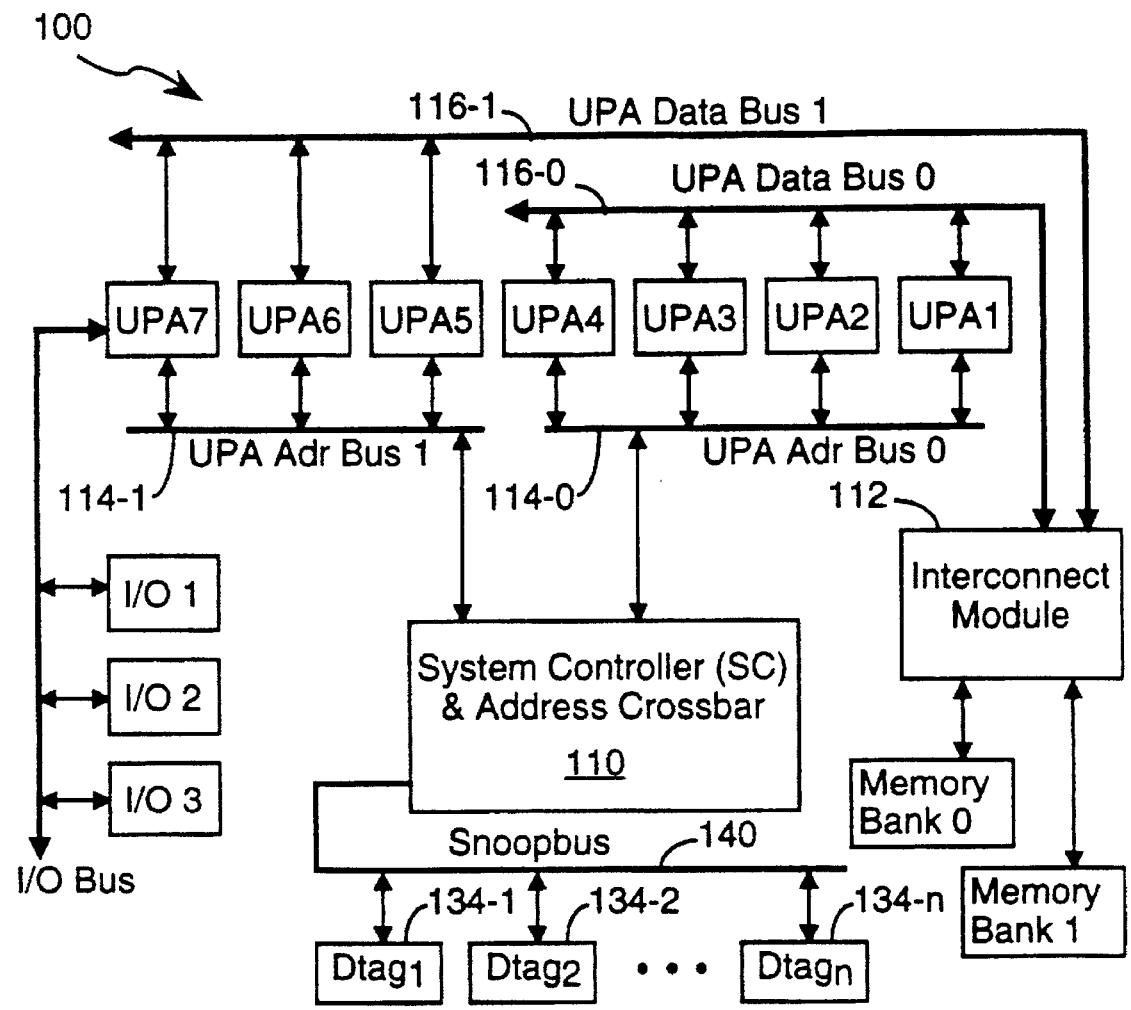
FIG. 2 is a block diagram of a computer system showing the data bus and address bus configuration used in one embodiment of the present invention.

Referring to FIG. 1 and 2, there may be multiple address busses 114 in the system, with up to four UPA ports 104 on each UPA address bus 114. The precise number of UPA address busses is variable, and will generally be dependent on system speed requirements. Since putting more ports on an address bus 114 will slow signal transmissions over the address bus, the maximum number of ports per address bus will be determined by the signal transmission speed required for the address bus.

The datapath circuitry (i.e., the interconnect module 112) and the address busses 114 are independently scaleable. As a result, the number of address busses can be increased, or decreased, for a given number of processors so as to optimize the speed/cost tradeoff for the transmission of transaction requests over the address busses totally independently of decisions regarding the speed/cost tradeoffs associated with the design of the interconnect module 112.

Figure 3:
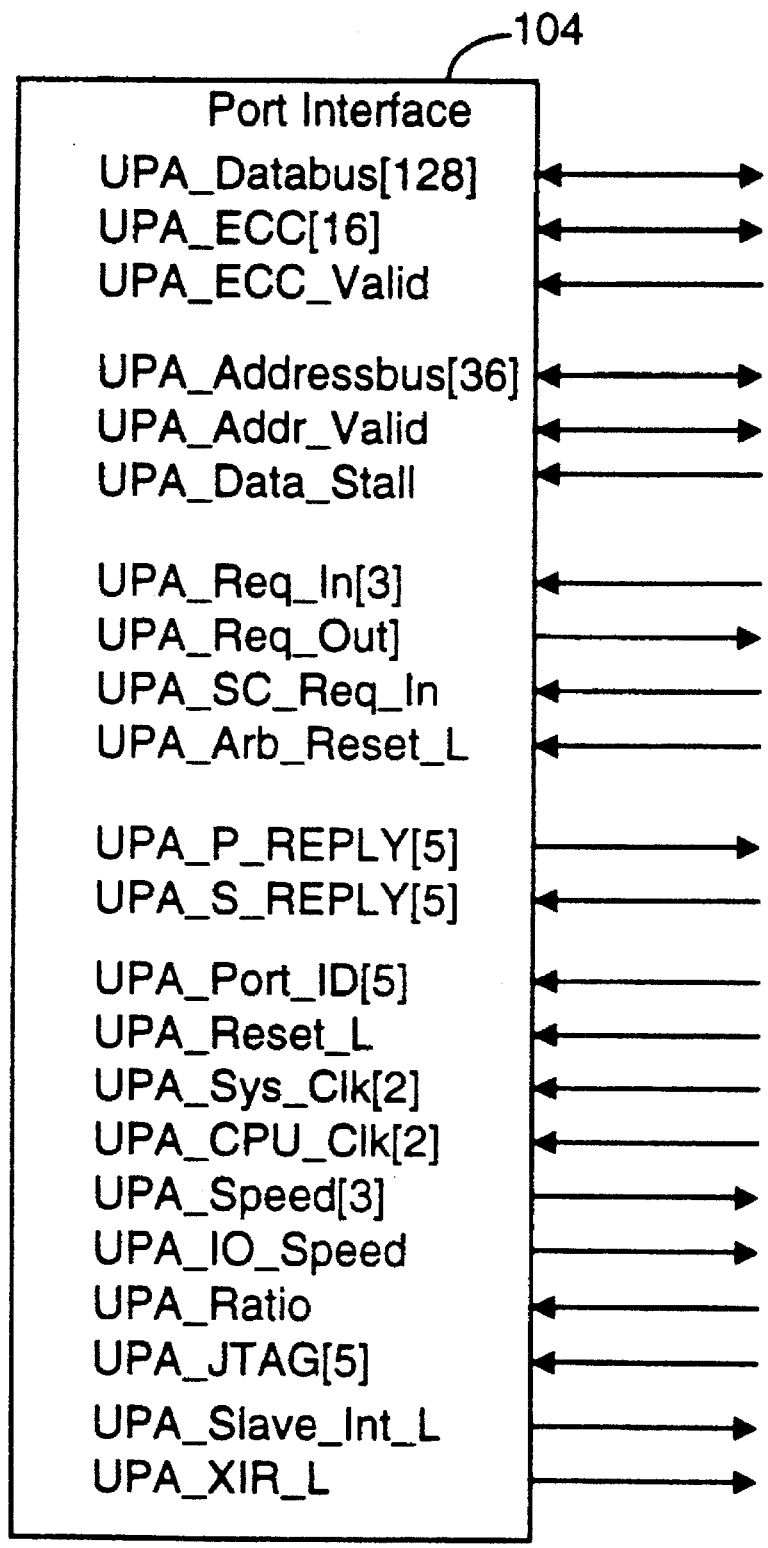
FIG. 3 depicts the signal lines associated with a port in a preferred embodiment of the present invention.

FIG. 3 shows the full set of signals received and transmitted by a UPA port having all four interfaces (described below) of the preferred embodiment. Table 1 provides a short description of each of the signals shown in FIG. 3.

TABLE 1

UPA Port Interface Signal Definitions

| Signal Name | Description |
|---|---|
| Data Bus Signals | |
| UPA_Databus[128] | 128-bit data bus. Depending on speed requirements and the bus technology used, a system can have as many as one 128-bit data bus for each UPA port, or each data bus can be shared by several ports. |
| UPA_ECC[16] | Bus for carrying error correction codes. UPA_ECC<15:8> carries the ECC for UPA_Databus<127:64>. UPA_ECC<7:0> carries the ECC for UPA_Databus<63:0>. |
| UPA_ECC_Valid | ECC valid. A unidirectional signal from the System Controller to each UPA port, driven by the System Controller to indicate whether the ECC is valid for the data on the data bus. |
| Address Bus Signals | |
| UPA_Addressbus[36] | 36-bit packet switched transaction request bus. See packet format in FIGS. 9A, 9B, 9C. |
| UPA_Req_In[3] | Arbitration request lines for up to three other UPA ports that might be sharing this UPA_Addressbus. |
| UPA_Req_Out | Arbitration request from this UPA port. |
| UPA_SC_Req_In | Arbitration request from System Controller. |
| UPA_Arb_Reset_L | Arbitration Reset, asserted at the same time that UPA_Reset_L is asserted. |
| UPA_AddrValid | There is a separate, bidirectional, address valid signal line between the System Controller and each UPA port. It is driven by the port which wins the |

TABLE 1-continued

UPA Port Interface Signal Definitions

| Signal Name | Description |
| --- | --- |
| UPA_Data_Stall | arbitration or by the System Controller when it drives the address bus. Data stall signal, driven by the System Controller to each UPA port to indicate, during transmission of a data packet, whether there is a data stall in between quad-words of a data packet. |
| Reply Signals | |
| UPA_P_Reply[S] | Port's reply packet, driven by a UPA port directly to the System Controller. There is a dedicated UPA_P_Reply bus for each UPA port. |
| UPA_S_Reply[6] | System Controller's reply packet, driven by System Controller directly to the UPA port. There is a dedicated UPA_S_Reply bus for each UPA port. |
| Miscellaneous Signals: | |
| UPA_Port_ID[5] | Five bit hardwired UPA Port Identification. |
| UPA_Reset_L | Reset. Driven by System Controller at power-on and on any fatal system reset. |
| UPA_Sys_Clk[2] | Differential UPA system clock, supplied by the system clock to all UPA ports. |
| UPA_CPU_Clk[2] | Differential processor clock, supplied by the system clock controller only to processor UPA ports. |
| UPA_Speed[3] | Used only for processor UPA parts, this hardwired three bit signal encodes the maximum speed at which the UPA port can operate. |
| UPA_IO_Speed | Used only by IO UPA ports, this signal encodes the maximum speed at which the UPA port can operate. |
| UPA_Ratio | Used only for processor UPA ports, this signal encodes the ratio of the system clock to the processor clock, and is used by the processor to internally synchronize the system clock and processor clock if it uses a synchronous internal interface. |
| UPA_JTAG[5] | JTAG scan control signals, TDI, TMS, TCLK, TRST_L and TDO. TDO is output by the UPA port, the others are inputs. |
| UPA_Slave_Int_L | Interrupt, for slave-only UPA ports. This is a dedicated line from the UPA port to the System Controller. |
| UPA_XIR_L | XIR reset signal, asserted by the System Controller to signal XIR reset. |

A valid packet on the UPA address bus 114 is identified by the driver (i.e., the UPA port 104 or the System Controller 110) asserting the UPA_Addr_valid signal.

The System Controller 110 is connected to each UPA address bus 114 in the system 100. The UPA ports 104 and System Controller 110 arbitrate for use of each UPA address bus 114 using a distributed arbitration protocol. The arbitration protocol is described in patent application Ser. No. 08/414,559, filed Mar. 31, 1995, which is hereby incorporated by reference.

UPA ports do not communicate directly with other UPA ports on a shared UPA address bus 114. Instead, when a requesting UPA port generates a request packet that requests access to an addressed UPA port, the System Controller 110 forwards a slave access to the addressed UPA port by retransmitting the request packet and qualifying the destination UPA port with its UPA_Addr_valid signal.

A UPA port also does not "snoop" on the UPA address bus to maintain cache coherence. The System Controller 110 performs snooping on behalf of those UPA ports whose respective UPA modules include cache memory using a write-invalidate cache coherence protocol described below.

The UPA address bus 114 and UPA data bus 116 coupled to any UPA port 104 are independent. An address is associated with its data through ordering rules discussed below.

The UPA data bus is a 128-bit quad-word bidirectional data bus, plus 16 additional ECC (error correction code) bits. A "word" is defined herein to be a 32-bit, 4-byte datum. A quad-word consists of four words, or 16 bytes. In some embodiments, all or some of the data busses 116 in the system 110 can be 64-bit double word bidirectional data bus, plus 8 additional bits for ECC. The ECC bits are divided into two 8-bit halves for the 128-bit wide data bus. Although the 64-bit wide UPA data bus has half as many signal lines, it carries the same number of bytes per transaction as the 128-bit wide UPA data bus, but in twice the number of clock cycles. In the preferred embodiment, the smallest unit of coherent data transfer is 64 bytes, requiring four transfers of 16 bytes during four successive system clock cycles over the 128-bit UPA data bus.

A "master" UPA port, also called a UPA master port, is herein defined to be one which can initiate data transfer transactions. All data processor UPA modules must have a master UPA port 104.

Note that graphics devices, which may include some data processing capabilities, typically have only a slave interface. Slave interfaces are described below. For the purposes of this document, a "data processor" is defined to be a programmable computer or data processing device (e.g., a microprocessor) that both reads and writes data from and to main memory. Most, but not necessarily all, "data processors" have an associated cache memory. For instance, an I/O controller is a data processor and its UPA port will be a master UPA port. However, in may cases an I/O controller will not have a cache memory (or at least not a cache memory for storing data in the coherence domain).

A caching UPA master port is a master UPA port for a data processor that also has a coherent cache. The caching UPA master port participates in the cache coherence protocol.

A "slave" UPA port is herein defined to be one which cannot initiate data transfer transactions, but is the recipient of such transactions. A slave port responds to requests from the System Controller. A slave port has an address space associated with it for programmed I/O. A "slave port" within a master UPA port (i.e., a slave interface within a master UPA port) also handles copyback requests for cache blocks, and handles interrupt transactions in a UPA port which contains a data processor.

Each set of 8 ECC bits carry Shigeo Kaneda's 64-bit SEC-DED-S4ED code. The interconnect does not generate or check ECC. Each UPA port sourcing data generates the corresponding ECC bits, and the UPA port receiving the data checks the ECC bits. UPA ports with master capability support ECC. Slave-only UPA port containing a graphics framebuffer need not support ECC (See UPA_ECC_Valid signal).

The UPA data bus 116 is not a globally shared common data bus. As shown in FIGS. 1 and 2, there may be more than one UPA data bus 116 in the system, and the precise number is implementation specific. Data is always transferred in units of 16 bytes per clock-cycle on the 128-bit wide UPA data bus, and in units of 16 bytes per two clock-cycles on the 64-bit wide UPA data bus.

The size of each cache line in the preferred embodiment is 64 bytes, or sixteen 32-bit words. As will be described below, 64 bytes is the minimum unit of data transfer for all transactions involving the transfer of cached data. That is, each data packet of cached data transferred via the interconnect is 64 packets. Transfers of non-cached data can transfer 1 to 16 bytes within a single quad-word transmission, qualified with a 16-bit bytemask to indicate which bytes within the quad-word contain the data being transferred.

System Controller 110 schedules a data transfer on a UPA data bus 116 using a signal herein called the S_REPLY. For block transfers, if successive quadwords cannot be read or written in successive clock cycles from memory, the UPA_Data_Stall signal is asserted by System Controller 110 to the UPA port.

For coherent block read and copyback transactions of 64-byte data blocks, the quad-word (16 bytes) addressed on physical address bits PA[5:4] is delivered first, and the successive quad words are delivered in the wrap order shown in Table 2. The addressed quad-word is delivered first so that the requesting data processor can receive and begin processing the addressed quad-word prior to receipt of the last quad-word in the associated data block. In this way, latency associated with the cache update transaction is reduced. Non-cached block read and block writes of 64 byte data blocks are always aligned on a 64-byte block boundary (PA[5:4]=0×0).

Note that these 64-byte data packets are delivered without an attached address, address tag, or transaction tag. Address information and data are transmitted independently over independent busses. While this is efficient, in order to match up incoming data packets with cache miss data requests an ordering constraint must be applied: data packets must be transmitted to a UPA port in the same order as the corresponding requests within each master class. (There is no ordering requirement for data requests in different master classes.) When this ordering constraint is followed, each incoming data packet must be in response to the longest outstanding cache miss transaction request for the corresponding master class.

TABLE 2

| | Quad-word wrap order for block reads on the UPA data bus | | | |
|---|---|---|---|---|
| Address PA[5:4] | First Qword on data bus | Second Qword on data bus | Third Qword on data bus | Fourth Qword on data bus |
| 0×0 | Qword0 | Qword1 | Qword2 | Qword3 |
| 0×1 | Qword1 | Qword0 | Qword3 | Qword2 |
| 0×2 | Qword2 | Qword3 | Qword0 | Qword1 |
| 0×5 | Qword3 | Qword2 | Qword1 | Qword0 |

Request and Reply Messages

Transactions are initiated by "request" messages and are executed upon the receipt of a "reply" message. Any request by a UPA port is herein labelled P_REQ, which stands for "port request." A port request is transmitted via the UPA port's address bus 114. If the address bus 114 is shared by more than one UPA port, the requesting port transmits its request only after it successfully arbitrates for the address bus.

Each port request is acknowledged by the System Controller 110 via a reply message called S_REPLY. There is a dedicated point-to-point 5-bit system reply bus, S_REPLY bus 120, for each UPA port that unidirectionally sends 5-bit reply messages from the System Controller 110 to each UPA port. The System Controller 110 drives a reply code on the S_REPLY bus 120 in acknowledgment to a transaction request, and to coordinate the sourcing and sinking of data on the UPA data bus 116. More particularly, the System Controller 110 generates an S_REPLY in response to a P_REQ either when the System Controller 110 is ready to set up the data path needed to perform the requested transaction, or when the requested transaction is completed if the transaction (such as an invalidate transaction request) does not involve a data transfer. The S_REPLY message is generated by the System Controller at essentially the same time that the System Controller sends the corresponding setup signals to the interconnect module 112.

Each transaction initiated by the System Controller 110 is initiated by sending a S_REQ (i.e., system controller request) message over the address bus 114 coupled to the UPA port 104 to which the request is directed. Transactions initiated by the System Controller 110, are generally "nested transactions" performed by the System Controller 110 in response to a transaction request by a UPA port. For instance, a certain memory transaction request by a UPA port may require that all cache entries in other UPA ports for the requested data block be invalidated before the System Controller can transfer the requested data block to the requesting UPA port's cache. The cache invalidations are performed by the System Controller making transaction requests to each UPA port whose cache stores the requested data block.

Each UPA port 104 has a dedicated point-to-point 5-bit port reply bus, P_REPLY, 122 used by that port to acknowledge System Controller requests.

All system controller requests are directed to the "slave port" portion of the target UPA port. The UPA port's slave port drives a reply code on the P_REPLY bus 122 in acknowledgment to a transaction received from the System Controller 110 to indicate that requested data is ready for read requests, that transmitted data has been absorbed for write requests, that cache invalidations are complete for invalidation requests, and that an interrupt has been handled for interrupt requests.

The System Controller 110 uses the P_REPLY acknowledgement message received from the UPA slave port to trigger the transmission of its S_REPLY message to the requesting UPA port.

Cache Memories, Tags and Snoopbus

Referring to FIG. 1, for each UPA module 102 that includes a cache memory 130, a primary cache index 132 having a set of primary cache tags called Etags is maintained. It should be understood that in most implementations, the cache memory 130 is a "second level cache" or "third level cache," because the data processor 178 (shown in FIG. 4) in the UPA module 102 will typically include an embedded first level or second level cache. The duplicate cache tags are only maintained for the outer most direct mapped coherent cache for each data processor, and any other lower level caches are considered private to the UPA port and are kept coherent by the UPA port through perfect inclusion.

There is one Etag for each line of the cache memory 130, and each line of the cache memory stores one 64-byte (16-word) data block. In the preferred embodiment, each Etag stores tag state and a set of address bits that identify the address of the 64-byte block stored in the cache line.

As just stated, the cache block size is 64 bytes. The unit of cache coherence is also 64 bytes. Each UPA port can have a different sized cache. In addition, in the preferred embodiment, only direct mapped cache memories are used in data processor and I/O UPA ports. I/O UPA ports may have any of a variety of cache memory structures. System Controller support for such cache memory structures is implemented through dedicated duplicate tags of a like structure in the System Controller. In the preferred embodiment, the I/O UPA port has a plurality of fully associative coherent buffers with a corresponding number of Dtags in the System Controller.

As is standard, the number of address bits required to identify the data block depends on the size of the cache memory and the size of the address space mapped into the cache memory. For example, for an 8-gigabyte address space, and a 512 kilobyte direct mapped cache memory, 14 address bits are needed to identify the data block in each line of the cache memory. That is, given a 33-bit address PA[32:0] for a specific byte, and a 27-bit address PA[32:6] for the corresponding 64-byte data block stored in a 512 kilobyte cache memory with 64-byte lines, the 14 most significant address bits PA[32:19] of the data block's full address are stored in the cache tag to identify the data block, and the next 13 bits PA[18:6] of the data block's address determine which cache line in which the data block is stored. In system 100, with a 1-terabyte coherent address space PA[39:0] and a 512 kilobyte direct mapped cache memory 130, each Etag will need to store the 21 most significant bits of the full address of the data block stored in the corresponding line of the cache memory.

The number of address bits stored in the cache index and hence the cache size for each master UPA port is determined by system initialization software by probing the port ID register 158 of each UPA port, as will be explained in more detail below.

In order to avoid snoop interference with a processor's reference to its coherent cache in multiprocessor systems, a duplicate set of tags (Dtags 134 that mirror the UPA module's Etags 132, is maintained by System Controller 110 for each UPA module having a cache memory that is to be kept coherent with the other cache memories in the system 100. The Dtags 134 support direct mapped cache memories. For each Etag entry there is a corresponding Dtag entry, such that a lookup on the Dtags by the System Controller 110 correctly indicates the corresponding Etag state for a data block, without interfering with a processors access to its Etags.

The Snoopbus 140 is an address bus capable of carrying all the relevant physical address bits PA[40:6] corresponding to the size of the cacheable address space in the system (size of main memory space). The Snoopbus further includes two bidirectional bit lines, a match signal line and a write control line for each Dtag array 134. The two bit lines convey a 2-bit cache line state from the Dtags arrays 134 to the System Controller 100 when the Dtags are being read, and are used to transmit a 2-bit updated line cache when the System Controller 110 updates the Dtags. The match line for a particular Dtag array carries a match signal indicating whether the address on the Snoopbus 140 matches the address of a data block stored in the associated cache memory. The match signal is equivalent to the cache hit/miss signal generated by the cache memory's primary cache index when presented with the same address, except that the match signal is generated from the Dtag array without interfering with the operation of the cache memory's primary index (i.e., the Etag array).

The Snoopbus 140 is scaleable independent of the address busses 114 and the independent of the data busses 116. Thus, the number of parallel snoopbusses 140 used and the number of Dtag arrays 134 which load each Snoopbus 140 can be based solely on the speed requirements of the Dtag lookup and update operations, without any dependence on the speed requirements of the address and data busses 114, 116.

UPA Port Model

Each UPA port 104 is identified by a unique 5-bit value, called the Port ID or UPA_Port_ID (see FIG. 3). This allows a maximum of 32 UPA ports in a system 100.

Figure 4:
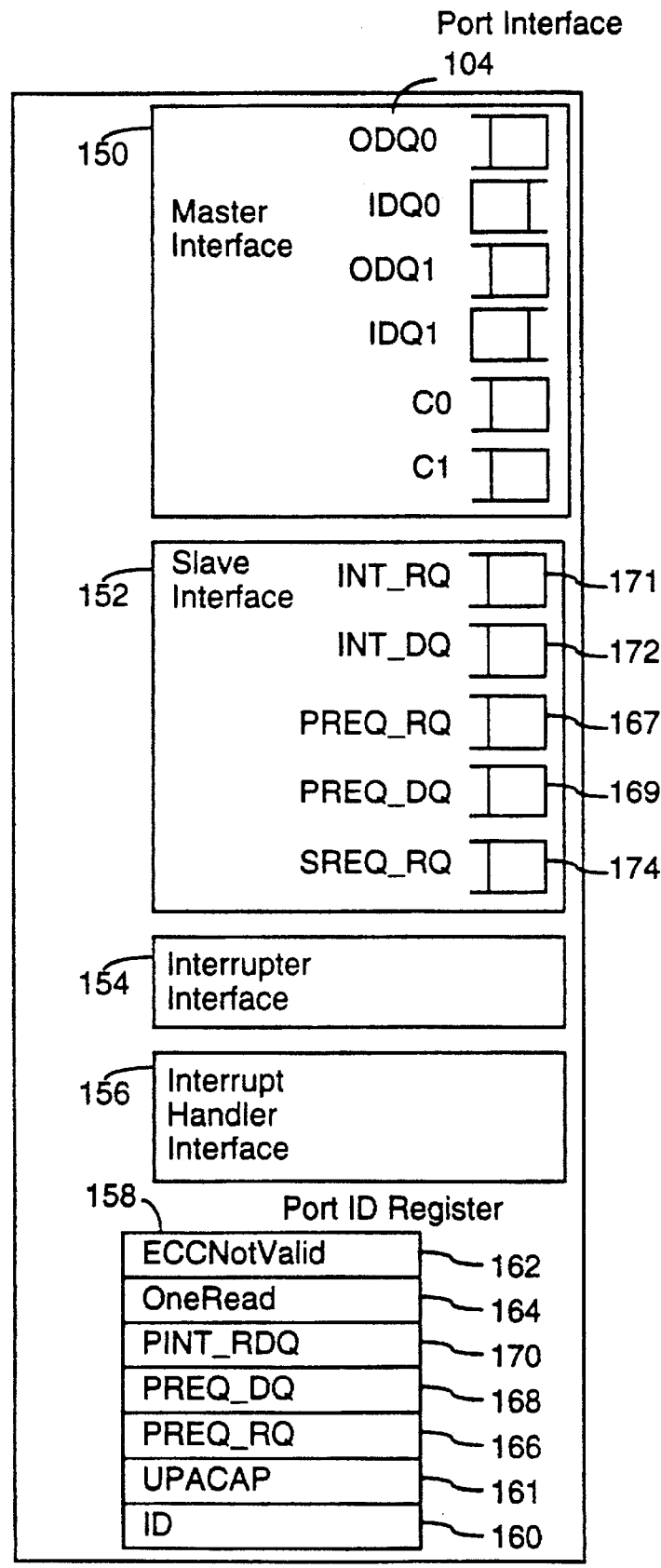
FIG. 4 is a block diagram of the interfaces and port ID register found in a port in a preferred embodiment of the present invention.

Referring to FIG. 4, each UPA port can have as many as four functional interfaces: a master interface 150, a slave interface 152, an interrupter interface 154 and an interrupt handler interface 156. All UPA ports include the UPA slave interface 152 and a port ID register 158. The port ID register 158 is used by the UPA port 104 to communicate its capabilities to the System Controller 110.

As shown in FIG. 4, these interfaces includes a number of queues. The slave interface 152 includes input request queues for receiving transaction requests (PREQ, SREQ), interrupt requests (INT), and data (PREQ_DQ, INT_DQ) associated with the requests. The master interface 150 includes queues C0, C1 for outbound requests and optionally includes inbound and outbound data queues IDQ0, ODQ0, IDQ1, ODQ1 for each master class.

Some of the following explanations make reference to specific transactions and reply messages. All such transactions and reply messages are described in the section of this document entitled "Detailed Description of Transactions."

The fields of the port ID register 158 are as follows:

the ID field 160 is a 16-bit field that identifies the UPA module associated with the port, including 6 bits for a manufacturer's ID (assigned by Sun Microsystems, Inc.), 6 bits for the module or processor type (assigned by the manufacturer), and 4 bits for a module version/revision number (assigned by the manufacturer).

The UPACAP field 161 is a 5-bit mask field to indicate the capabilities of the UPA port.

UPACAP[0] is set if UPA has a master interface.

UPACAP[1] is set if the UPA module has a cache (making the UPA port a "CacheMaster").

UPACAP[2] is set if the UPA port has an interrupter interface using the UPA_Slave_Int_L signal. This bit is set primarily by slave-only UPA ports. Software assigns this UPA port a target-MID corresponding to an interrupt handler.

UPACAP[3] is set if the UPA port has an interrupter interface using the P_INT_REQ transaction request protocol. Software assigns this UPA port a target-MID corresponding to an interrupt handler.

UPACAP[4] is set if the UPA port has an interrupt handler interface.

The System Controller forwards P_INT_REQ interrupt requests from other UPA ports to this port only if this bit is set.

The ECCNotValid field 162 is a 1-bit field to indicate that this UPA port does not support ECC. This field is set to 0×0 if the UPA port can generate ECC when sourcing data. It is set to 0×1 if the UPA port does not support ECC generation when sourcing data, and requires the System Controller 110 to indicate to the recipient UPA port to disable ECC checking. When ECCNotValid is set to 0×1, the UPA port will also not support ECC checking on the UPA data bus, nor parity checking on the UPA address bus.

The ONEREAD field 164 is a 1-bit field to indicate that this UPA port only supports one outstanding slave read P_REQ transaction to it at a time. If the ONEREAD field is set, this UPA port cannot issue P_RAB_REPLY and P_RASP_REPLY messages, it must use the P_RASB_REPLY reply message. As a result, if the ONEREAD field is set, this UPA port will use the P_RASB reply for P_NCRD_REQ and P_NCBRD_REQ transactions directed to it for slave access. As will be explained below, the System Controller will keep the MID, Class, and size information for these transactions on behalf of the UPA port. The P_NCRD_REQ transaction request message and the P_RASB reply message are also described in more detail below.

The PREQ_RQ[3:0] field 166 is a 4-bit field that encodes the size of the PREQ_RQ queue 167 in the slave interface 152. This field specifies the maximum number of (2 cycle) incoming P_REQ transaction request packets that the UPA slave interface 152 can simultaneously store. The minimum value of PREQ_RQ is 0×1, since every UPA port, at a minimum, must support a slave read of its port ID register.

The PREQ_DQ[5:0] field 168 is a 6-bit field that encodes the size of the PREQ_DQ queue 169. This field specifies the number of incoming quadwords (16-byte quantities) that the UPA slave port can receive in its P_REQ write data queue 169. The write data queue PREQ_DQ must accommodate data blocks (64 bytes) for the maximum number of requests supported in the PREQ_RQ request queue. As a result, PREQ_DQ data queue is always 4 times the size specified in the PREQ_RQ field 166, except that PREQ_DQ can be set equal to 0×0 if the UPA port does not support slave writes.

The PINT_RDQ[1:0] field 170 is a 2-bit field that encodes the size of the INT_RQ and INT_DQ queues 171, 172. The PINT_RDQ field 170 is valid only if the UPA port has an Interrupt Handler interface 156. The size of the interrupt request queue, INT_RQ 171, is equal to the binary value of this field plus 1. The maximum size of the interrupt request queue is four interrupt requests. In summary, this field specifies the number of (2 cycle) incoming P_INT_REQ requests that the UPA slave port can receive, as well as the number of 64-byte interrupt data blocks the UPA slave interface can receive.

With regard to the UPACAP field, there is no mask bit to indicate slave capability, as every UPA port is required to have a slave interface in order for the port ID register to be read. The following are some examples of the settings for the UPACAP field. A full function UPA port such as a processor module, will have its UPACAP mask set to 0×1 B. A slave only UPA port such as a graphics device that is only mapped for slave access and does not interrupt, will have its UPACAP mask set to 0×0. A smart slave only UPA port that generates interrupts (with UPA_Slave_INT) will have its UPACAP mask set to 0×04. An I/O UPA port that performs DVMA (direct virtual memory access), does not have a cache, and generates P_INT_REQ interrupt request transaction will have its UPACAP mask set to 0×9.

Master Interface

A master interface 150 is optional. A UPA master interface allows a UPA port to initiate transaction requests (P_REQ). A UPA port 104 having a mater interface 150 is herein called a master port.

The UPA module for a master port may contain a physically addressed coherent cache, in which case it is called a cache master port. The cache participates in the "MOESI cache coherence protocol" (which is explained in detail below), and responds to copyback-invalidation requests from the System Controller 110. The coherent cache has total inclusion of any other private local caches in the UPA module. In the preferred embodiment, each caching UPA master port can at most have one outstanding dirty victim writeback, in part because each data processor's cache memory has only a single writeback buffer (see buffer 280 in FIG. 8), and in part to avoid complex control logic that multiple writeback buffers would require.

In other embodiments, where the data processor can issue multiple loads and cache misses or prefetches, there can be a plurality of writeback buffers in the data processor and a corresponding number of Dtag transient buffers in the System Controller. The writeback handling logical protocols described here work with any number of outstanding writebacks from the UPA port.

A UPA master interface 150 has up to two independent outgoing request queues C0 and C1 for two "classes" of transaction requests. C0 and C1 are also called "master classes," since they are classes of transactions initiated by UPA master ports. The UPA master interface may issue a transaction request from any class. A bit in each transaction request packet specifies to the System Controller which class the request is from. The port ID of the UPA port is also carried in the transaction packet in the MID field (see discussion of transactions, below). The master interface 150 may also include inbound and outbound data queues, IDQ0, ODQ0, and IDQ1, ODQ1, for each of the transaction classes.

The purpose of having two or more transaction classes (herein called master classes) is to increase parallel execution of memory transactions by allowing each data processor to indicate which memory transactions need to be sequentially ordered and which do not. Transactions in each master class from a particular data processor are "strongly ordered," which means that the transactions in each class must be completed in the same order that the data processor generates the memory requests in that class. There is no ordering requirement between memory transactions in different classes. Thus, if a data processor issues memory transaction requests T1-1, T1-2 and T1-3 in sequence in class 1 and memory transactions T2-1 and T2-2 in sequence in class two, the System Controller must complete transactions T1-1, T1-2 and T1-3 in the same sequential order that they were generated. Similarly, the System Controller must complete transactions T2-1 and T2-2 in the same sequential order that they were generated; but it can complete transactions T2-1 and T2-2 at any time with respect to transactions T1-1, T1-2 and T1-3.

Data queues are used in the preferred embodiments to simplify the handling of data transfers. Outbound data queues are always filled with data to be transmitted before the corresponding transaction request or reply message is transmitted. In this way, when a data write transaction request message is transmitted, or a "data ready" reply message is transmitted by a UPA port, the interconnect is assured that the associated data is ready for immediate transmission. Inbound data queues, most of which are optional, are typically implemented using FIFO (first-in first-out) buffers that can be filled independently of the status of any other logic. As a result, whenever inbound data queues are provided in a UPA port, neither the UPA module (such as a data processor) nor its UPA port needs to manage the handshake protocol for receiving data packets. Rather, the data is simply stored by the interconnect in the inbound data queue and the associated UPA port or its UPA module processes that data whenever the required resources are available.

The S_REPLY for the transactions in each master request class are issued by System Controller 110 to the requesting master UPA port in the same order as the order in which the transaction requests were originally issued by the requesting UPA port. This requirement is implemented in the System controller by (A) treating each master class request queue SCIQ0/1 as a first-in first-out buffer such that the transactions within each master request class are activated by the System Controller strictly in the same order as the order in which the transaction requests are issued, and (B) within the set of active transactions, queuing the issuance of S_REPLY's for transactions having the same requesting UPA port and master class in same order as those transactions were activated.

As noted above, there is no ordering relation between the two transaction request classes C0, C1. The S_REPLY for a request from one class may come earlier or later than the S_REPLY for a request from the second class, without regard to the order in which those requests were transmitted to the System Controller.

There is also no ordering relation between requests from different master UPA ports. Read/write requests from different master UPA ports directed to a UPA port's slave interface can be executed by the UPA port slave interface in any order, but requests from the same master UPA port and in the same master request class will be executed by the UPA port slave interface in the same order as they are received by the UPA port slave interface.

References to I/O devices are sequentially consistent. The slave UPA interface orders transactions by device addresses. All references to the same I/O device (or a predefined address range) are required to complete in the same order that they arrive in at the UPA slave interface. However, there is no ordering of references going to different I/O devices hanging off the same UPA slave interface (such as in a bus bridge) and the UPA slave interface is allowed to execute transactions going to different I/O devices (or different predefined address ranges) in parallel.

Each UPA module is required to put in a single master request class all transaction requests for which ordering is important. The preferred class assignment for all processor UPA modules is as follows:

Class 0 is used for read transactions due to cache misses, and block loads.

Class 1 is used for writeback requests, WriteInvalidate requests, block stores, interrupt requests, and non-cached read/write requests.

This assignment of memory transactions to classes enables the memory transactions caused by cache misses to not be blocked by other transactions and is especially significant when the data processor supports multiple outstanding loads and/or prefetching. This gives the lowest possible latency for cache fills, in conjunction with other optimizations.

The interconnect can maximize parallel execution of transactions and allow them to complete in any order, except for transactions from the same UPA port and class. For maintaining coherence, and to achieve sequential consistency from the programmer's point of view, the TSO (total store order), PSO (partial store order) and RMO (relaxed memory order) memory models and the SSO (strong sequential order) I/O space memory model are supported without actually making the hardware of the interconnect sequentially consistent.

A UPA master port is solely responsible for the ordering of its internal memory events based on its memory model, and can issue any combination of transactions from any request class to support that memory model ordering requirement. The UPA port's data processor may use the two master classes to parallelize and order transactions as needed based on its local memory model. All barriers and synchronizations are enforced by the data processor based on its memory model before it issues the transactions from the master classes.

All data transactions always complete and there is no retry NACK from the System Controller 110 to the master UPA port (with the exception of one interrupt transaction).

The UPA master port must not make a read/write slave access to its own slave port, nor make a request for a data block which is already in its cache, nor send interrupts to itself. Loopback is not supported by the preferred embodiment of the present invention due to electrical constraints associated with the connectors. However, there is nothing in the system architecture the present invention that logically prevents the use of loopbacks. In fact, the protocols of S_REPLY, data transfers and cache coherence are designed to work with lookback.

Slave Interface

All UPA ports include a slave interface 152, and all UPA ports implement the port ID register 158. A slave interface 152 can only respond to transactions, it cannot initiate them. A slave interface 152 is sometimes herein called a "slave port". All references to slave ports mean the slave interface of a UPA port, regardless of whether or not the UPA port is a master UPA port.

A UPA slave interface 152 on a caching master UPA port allows the UPA 6 port to receive copyback-invalidation requests from System Controller 110.

A UPA slave interface 152 allows a UPA port to receive interrupt packet transactions if the slave interface is part of a UPA port that includes an interrupt handler interface 156.

A UPA slave interface has a noncached address space, and allows programmed I/O (PIO) read and write access to devices and registers, including reading its port ID register 158, on the UPA module from master UPA ports. Each UPA slave interface is assigned an 8-gigabyte non-cached address space. When a UPA port sees the UPA_Addr_Valid signal asserted to it, if the most significant address bit, PA[40], is equal to 1, the physical address bits PA[32:4] from the transaction request packet represent addresses in the non-cache address space.

The UPA interconnect architecture does not define the system wide address space, nor the address decodes for any of the system registers, except the port ID register 158.

A UPA slave interface processes PIO read/write transaction requests from the same master class from a master UPA port in the same order as those requests are received. That is, it sends P_REPLY messages for those transaction requests in the same order as the transaction requests were received. It need not, however, maintain any ordering for requests in different master classes from a UPA port, or for requests from different UPA ports.

If the UPA slave interface is connected to an I/O bus interface, it is required that the I/O bus interface also maintain the ordering for the transactions it receives for each distinct address or address range. For instance, a write transaction to address A (or to device A) on the I/O bus followed by a read transaction to address A (or to device A) on the same I/O bus must not cause the I/O bus interface to reorder the read before the write. However, a write to address A (or to device A) followed by read of address B (or to device B) can be executed by the I/O bus interface in any order. The precise mechanism for I/O bus ordering can vary from implementation to implementation of the I/O bus interface. However, a blocking bit and blocking bit map scheme similar the one described above for class ordering can be used for both class based ordering and I/O address based ordering.

A UPA slave interface cannot guarantee write completion on a write transaction. A write followed by a read (by the same processor) will return the result of the last write if the location exists. However, since read-write to I/O device registers can have implementation specific side affects, the semantics of this is up to each I/O device.

A master UPA port communicates to a slave UPA port only through the interconnect module 112, even if the two are sharing the same UPA address bus.

A slave-only UPA port (a UPA port that does not have a master interface) can use a dedicated interrupt wire to signal an interrupt to the System Controller. The System Controller will generate an interrupt packet for it, and will forward it to an interrupt handler UPA port.

Figure 5:
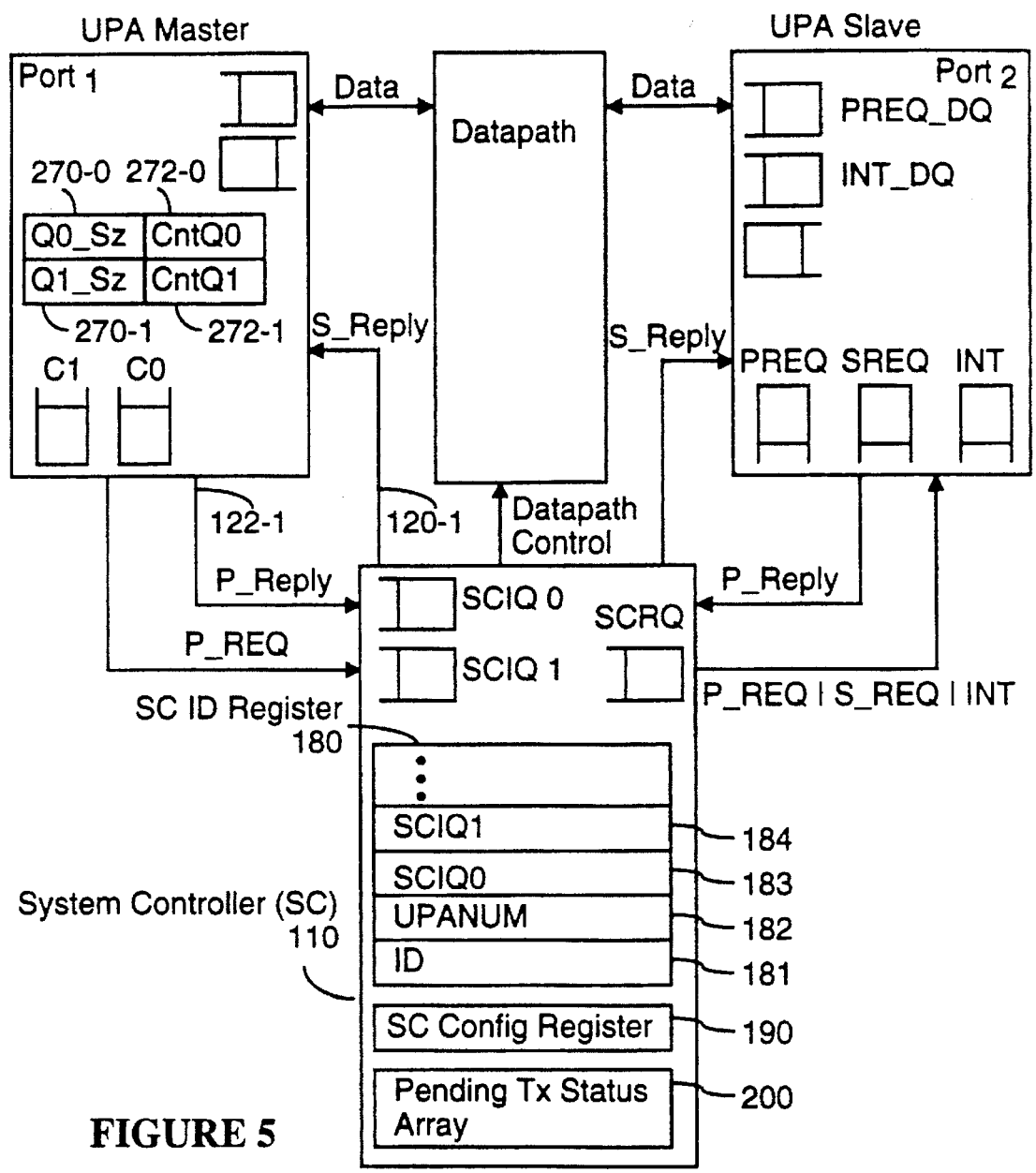
FIG. 5 is a block diagram of a computer system incorporating the present invention, depicting request and data queues used while performing data transfer transactions.

The System Controller 110 handles flow control of requests to a UPA port's slave interface by knowing the maximum size of the three slave request receive queues (PREQ_RQ, SREQ_RQ, INT_RQ) and the two data queues (PREQ_DQ, INT_DQ) shown in FIGS. 4 and 5. The port ID register 158 for each UPA port specifies the maximum number of outstanding transaction requests of each type it can simultaneously stored in its queues, and thus how many such requests can be sent to it by System Controller 110 until some of those requests have been services. The port ID register 158 also specifies the maximum number of quad-words (16-byte units) that each of the data queues can store.

The UPA slave port interface 152 cannot reply with a "retry NACK" to any transaction forwarded to it. To avoid the need for such negative acknowledgement messages, the System Controller 110 does not issue more requests to the UPA slave interface than what the slave interface has room for in its queues. A P_REPLY from the UPA slave interface to acknowledge the completion of a previous transaction informs System Controller 110 that there is room for one more request of that type in that slave UPA port's incoming request queue.

The maximum size of system controller request queue SREQ_RQ 174 in the slave port interface 152 in the preferred embodiment is fixed at 1. Thus there can be at most one outstanding S_REQ to a slave UPA port.

Figure 7:
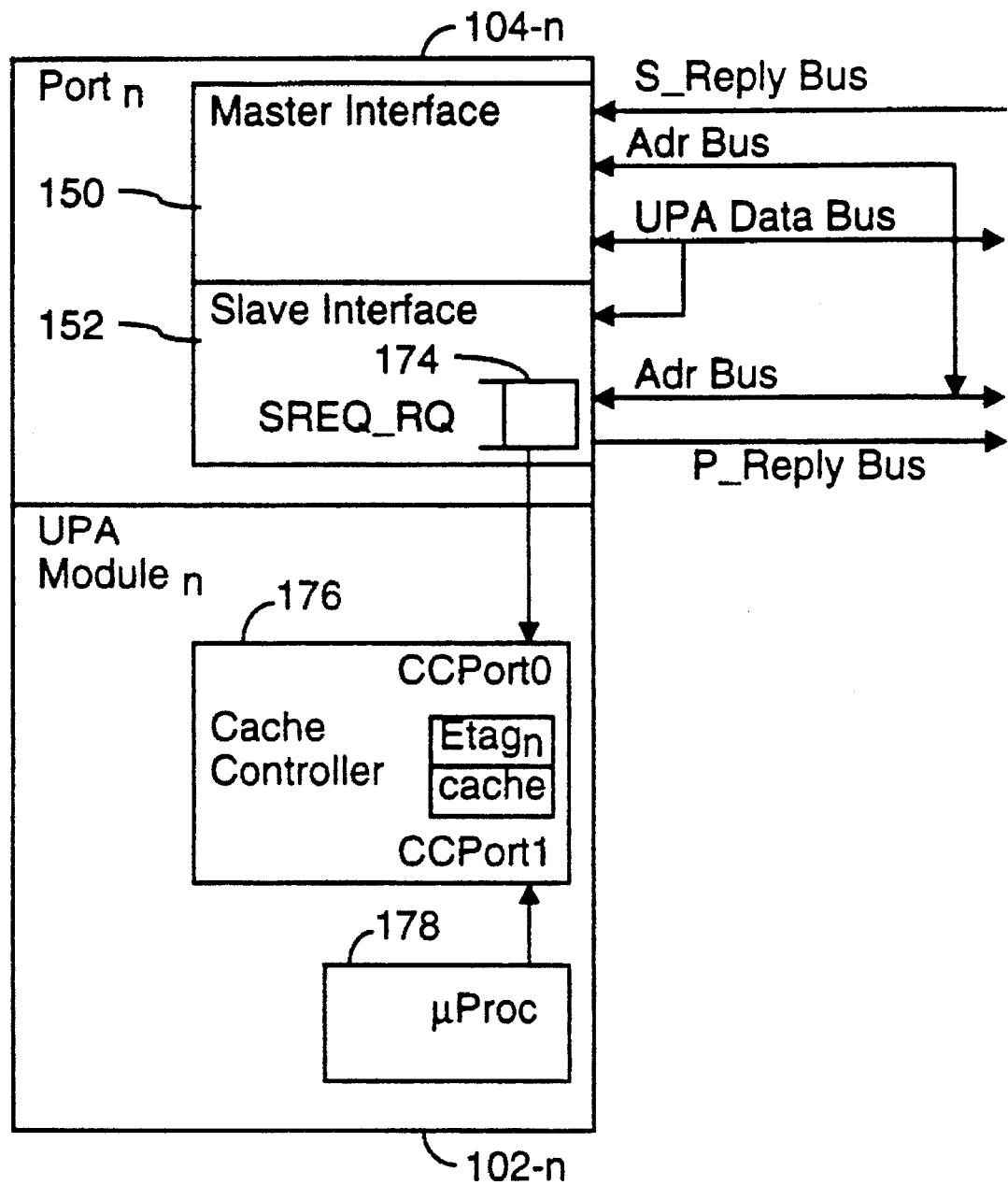
FIG. 7 is a block diagram of a caching UPA master port and the cache controller in the associated UPA module.

The reason a single entry request queue SREQ_RQ 174 can be used without hurting system performance is that all S_REQ requests are given the highest priority service by the slave interface and are serviced so quickly that queuing S_REQ requests is unnecessary. In particular, as shown in FIG. 7, in the preferred embodiment, the cache controller 176 in each caching UPA master port 104 is dual ported such that the cache controller accepts cache access requests from both the port's data processor 178 and from the SREQ_RQ request queue, with the SREQ_RQ being given higher priority than the data processor. Using this configuration, SREQ's are generally serviced by each slave interface within two to five system clock cycles of their storage in the SREQ_RQ request queue 174. In particular, if an atomic read-modify-write cache memory operation was started by the data processor 178 one clock cycle immediately prior to the SREQ being asserted, it might take as long as three additional system clock cycles for that cache transaction to complete, after which the SREQ would be service typically within two system clock cycles.

Furthermore, using the dual ported cache controller methodology describer above, a copyback request from one data processor 178 to another will complete in approximately the same amount of time as a load from main memory when the interconnect has no competing memory transactions. In particular, in the preferred embodiment, a load from main memory takes about 8 system clock cycles to complete, and a copyback from one data processor's cache memory to another data processor's cache memory takes about 8 system clock cycles to complete when there are no competing memory transactions.

In most implementations, each UPA slave interface is required to perform parity checks on transaction requests received via the UPA address bus and to report any parity error with a fatal error P_REPLY message. In most implementations each UPA slave interface 152 is also required to perform an ECC check on write transactions if ECC is valid, and to log and report data errors.

Interrupter Interface

An interrupter interface 154 is optional. If the UPA port supports a master interface 150, it can issue an interrupt packet transaction from any master class in the master UPA port to a target slave UPA port that is an interrupt handler.

An interrupter interface in a master UPA port generates interrupts by initiating a P_INT_REQ transaction (see discussion of transactions, below). The master UPA port generates an interrupt packet for a particular destination interrupt handler UPA port by specifying a target-ID<4:0> in the request packet. The target-ID is the same as the unique 5-bit UPA_Port_ID of the destination UPA port. An interrupt directed by a UPA Port to itself is not supported on the UPA interface in the preferred embodiment due to electrical connector considerations, but could well be supported in alternate embodiments of the present invention.

The target-ID of one (or more) interrupt handler UPA port(s) is assigned to each non-processor interrupter UPA port by system initialization software. The non-processor interrupter UPA port can then send interrupt transactions only to the assigned target-IDs. A processor UPA port can send interrupt transactions to any interrupt handler target-ID (for processor to processor software cross calls).

The target-ID<4:0> for each interrupt transaction request P_INT_REQ is carried in the physical address field PA<18:14> in the first cycle of the two cycle interrupt packet (see FIG. 9C). The UPA port can put the P_INT_REQ in any master request class. There is no requirement that it should be in one class or another. It is, however, put in class 1 in the preferred embodiment so as not to block any cache fill transactions.

If the UPA port that initiated the interrupt transaction receives a S_INAK reply (otherwise known as a NACK reply), the requesting UPA port removes the interrupt data from its out-going data queue and the P_INT_REQ request from the master request class queue, and retries after some back-off interval.

If the UPA port receives a S_WAB reply for driving the 64 bytes of interrupt data on the UPA data bus, then it is guaranteed that both the P_INT_REQ and the data will be delivered to the target UPA port by the System Controller (just like a non-cached block write transaction) if the target is a valid interrupt handler. If the target is not an interrupt handler, then either the System Controller may discard it (and set a status bit), or the recipient UPA port may discard it (silently).

An interrupter can send multiple back-to-back P_INT_REQ with different target-IDs (destination UPA Ports). If the interrupt packet can be delivered by the System Controller, it will be accepted. Otherwise it will be NACK'ed by the System Controller.

If an interrupter issues multiple back-to-back P_INT_REQ transactions to different UPA ports, there is no guarantee that they will get delivered in the same order. However back-to-back P_INT_REQ specifying the same target-ID will be delivered by the System Controller to the target UPA port in the same order, provided that any interrupt requests that result in NACKs from the System Controller 110 are also retried by the UPA interrupter interface in their original issue order.

If the UPA port does not support a master interface, but requires an interrupt interface 154, the interrupt interface 154 is coupled by a dedicated wire (labelled UPA_Save_INT_L in FIG. 3) to signal a single priority level interrupt to the System Controller 110. The System Controller 110 will cause an interrupt packet to be generated and sent to an interrupt handler UPA port.

In slave UPA ports having an interrupter interface, a second interrupt cannot be asserted on the UPA_Save_INT_L line until the interrupt handler clears the interrupt with a slave write to a predefined interrupt-clear register in the slave UPA port. In addition, only a single interrupt priority level is available for interrupts generated using the UPA_Slave_Int_L line.

Interrupt Handler Interface

A UPA port may be an interrupt handler 156. A data processor UPA module will typically support the interrupt handler interface. In order to be an interrupt handler, the UPA port must support the INT and INT_DQ queues shown in FIG. 16. The max size of the INT request queue is 4 interrupts The P_INT_REQ that is deposited in the INT request queue is examined by the processor. In the preferred embodiment, it causes a trap to a software interrupt handler. After the interrupt handler has completed handling the interrupt, it causes the P_REPLY to be generated by the UPA port to the System Controller to indicate that the P_INT_REQ has been handled and that there is room for another P_INT_REQ in its incoming interrupt request queue. In the preferred embodiment, the P_REPLY is generated when the software performs a write to an 'interrupt clear' register in the interrupt handler interface.

System Controller Registers

Referring to FIG. 5, the System Controller 110 includes separate queue for receiving transaction requests in each master class (SCIQ0, SCIQ1), as well as a queue (SCRQ) for both requests it generates and requests it forwards to UPA ports. The System Controller 110 also includes an SC ID register 180 for communicating its capabilities to the UPA ports, an SC Config Register 190, and a pending transaction status array 200. The Config Register 190 is used for storing the capabilities of all the UPA port in the system, as well as to keep track of how many transaction requests are currently stored in the input queues of each of the UPA ports 104, and the pending transaction status array 200 is used by the System Controller to keep track of all Inactive and Active pending transactions.

The fields of the SC ID register 180 are as follows:

the ID field 181 is a 16-bit field that identifies the System Controller.

The UPANUM field 182 is a 5-bit mask field that specifies the maximum number of UPA ports the System Controller can support.

SCIQ0[3:0] field 183 is a 4-bit field that specifies the number of (2-cycle) requests packets that can be stored in the incoming class 0 request queue SCIQ0 for a particular UPA port.

SCIQ1 [3:0] field 184 is a 4-bit field that specifies the number of (2-cycle) requests packets that can be stored in the incoming class 1 request queue SCIQ1 for a particular UPA port.

There is a separate set of SCIQ0 and SQIC1 registers for each master UPA port to indicate the size of the SCIQ0 and SCIQ1 request input queue for each such master UPA port.

Figure 6:
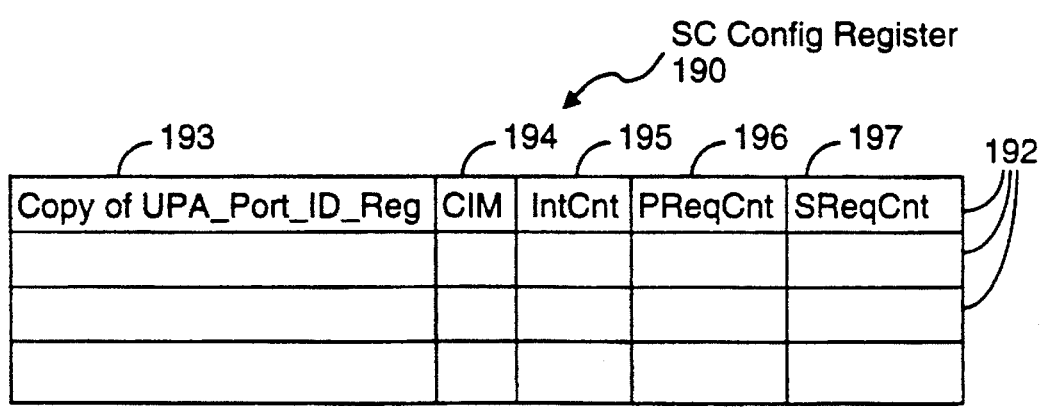
FIG. 6 is a block diagram of the System Controller Configuration register used in a preferred embodiment of the present invention.

Referring to FIG. 6, the SC Config register 190 includes one row or record 192 for each UPA port that can be supported by the System Controller 110. Each row's position in the SC Config register corresponds to the port ID of the corresponding UPA port. Thus, the first row of the SC Config register 190 stores configuration data for the UPA port with port ID 00000, the second row stores configuration data for the UPA port with port ID 00001, and so on. Each such record is herein called a "port record in the SC Config register". The fields in each port record in the SC Config register 190 are as follows:

Copy of UPA_Port_ID_Reg 193 is, literally, a copy of the port ID register of the corresponding UPA port.

Cache Index Mask (CIM) field 194 specifies the number of Etag block entries or lines in the coherent cache, if any, of the corresponding UPA port. This indicates to the System Controller how many low order address bit of the physical address PA[40:6] to use for address compares for implementing the cache coherence protocol. This field if valid only for cache master UPA ports.

IntCnt field 195 is the number of interrupt requests that the System Controller 110 has forwarded to the corresponding UPA port that have yet to be acknowledged by that UPA port. The System Controller blocks the transmission of additional interrupt requests to the UPA port whenever the value in this field is equal to the PINT_RDQ[1:0] field 170 in its copy 193 of the UPA_Port_ID register.

PReqCnt field 196 is the number of port transaction requests that the System Controller 110 has forwarded to the corresponding UPA port that have yet to be acknowledged by that UPA port. The System Controller blocks the transmission of additional port transaction requests to the UPA port whenever the value in this field is equal to the PREQ_RQ[3:0] field 166 in its copy 193 of the UPA port ID register.

SReqCnt field 197 is the number of System Controller transaction requests sent to the corresponding UPA port that have yet to be acknowledged by that UPA port. The System Controller blocks the transmission of additional System Controller transaction requests to the UPA port whenever the value in this field is equal to 1, since the maximum size of the SREQ queue in each slave interface is one.

Data Flow

Referring to FIGS. 5 and 7, typical read/write data flow to and from memory is as follows. Although not explicitly shown in the Figures, the System Controller 110 includes a separate set of SCIQ 0 and SCIQ 1 input request queues for each master UPA port. In addition, it is to be noted that the flow chart in FIG. 8 does not show all the steps of all data transfer transactions. Rather, it shows only those steps that are common to most data transfer transactions. Further details of all the defined data transfer transactions are described in the section of this document entitled "Detailed Description of Transactions."

The UPA master port issues a read/write transaction request (P_REQ) on its UPA address bus to the System Controller 110 (210), which the System Controller receives in one of its two request input queues (212). If it is a coherent request (214), System Controller 110 does a Dtag lookup (snoop) operation on the Snoopbus, followed by a Dtag update operation (216). At the same time as the Dtag lookup, if a read transaction is being performed on an address located in main memory, the System Controller starts a memory cycle (217).

A "snoop operation" simultaneously accesses all the Dtag arrays 134 coupled to the Snoopbus 140 to determine if any of the Dtag arrays 134 store a valid entry for a specified address. Each of the Dtag arrays 134 outputs a 2-bit status value as well as a hit/no-hit bit in response to each snoop operation. The 2-bit status value output by a Dtag array represents the state of a Dtag only if the hit/no-hit bit indicates that a matching entry was found in the Dtag array 134. A "hit" is detected in a Dtag array if the "hit" bit is True and the two bit Dtag state value is not equal to 00.

Depending on the specific transaction request being made, if a "hit" is detected in any of the Dtag arrays 134, data may be sourced from the cache memory of one of the master UPA ports, the cache entries in some or all of the cache memories which store data for the specified address may be invalidated, or the tag status of one or more the cache entries in the Dtag and Etag arrays may be updated in another manner, as will be described below.

For a coherent read transaction, if the snoop determines that the data is coming from memory because (A) there were no hits for the specified address in the Dtag arrays 134 (222), or (B) all Dtags corresponding to the cache hits are in the unmodified S (Shared Clean) state and the transaction is not a read to own (RDO) transaction (223), then a datapath through the interconnect module 112 from the main memory to the requesting UPA port is set up by the System Controller 110 (224). The System Controller 110 sends a S_REPLY message to the requesting UPA port (226) when it is time for the requesting UPA port to receive the data block corresponding to the specified address (228).

A coherent read from another UPA port's cache is required when there is a cache hit (222) for a cache memory in a data processor other than the requesting processor, and either (A) the Dtag for the non-requesting data processor is in the O or M state, indicated a modified data block, or (B) the read transaction is a read to own (P_RDO_REQ) transaction (223).

When System Controller determines (222, 223) that a data block must be sourced by another UPA port's cache, the System Controller 110 sends a copyback S_REQ to the slave interface of the sourcing UPA port, and aborts the memory cycle (240). In systems having more than two data processors, the System Controller also sends invalidate transaction requests (S_INV_REQ) to all caching UPA master ports for which a cache hit was detected, other than the sourcing UPA port (240).

When the data is ready, the slave UPA port issues a P_REPLY to the System Controller 110 (242). System Controller 110 then sends control signals to the interconnect module 112 to form a datapath from the sourcing UPA port to the requesting UPA port (244). The System Controller 112 also sends an S_REPLY to the sourcing UPA slave interface to drive the requested data on its UPA data bus, and sends an S_REPLY to the requesting UPA master port (246) to prompt it to receive the data from its UPA data bus (228).

In a typical coherent write (P_WRI_REQ) transaction, invalidate request are sent by the System Controller to the cache memories storing the same data block as the one being written to main memory (218), and an S_REPLY message is issued to the requesting UPA port by the System Controller (230) to cause it to source the data for the write operation (232) after a datapath through the interconnect module 112 from the requesting UPA port to the main memory is set up by the System Controller 110 and the main memory has been primed to write the data (220).

Writeback (P_WRB_REQ) transactions are handled differently than other coherent write transactions. When the results of the Dtag lookup (snoop) for the transaction are received, if the Dtag corresponding for the specified address in the writeback transaction request is invalid (250), that means another data processor has performed a transaction that required invalidation of the addressed data block. When this happens, the writeback transaction is cancelled by the System Controller by sending a writeback cancel (S_WBCAN) reply message back to the requesting UPA port (251), which causes the requesting UPA port to invalidate the contents of its writeback buffer 280 (see FIG. 9).

If the writeback transaction is not cancelled (250), the System Controller sets up a datapath from the requesting UPA port to main memory (252) and sends a write block acknowledgment message (S_WAB) to the requesting data process (253), which instructs the requesting data processor to source the data block to main memory (253, 254).

Figure 8A:
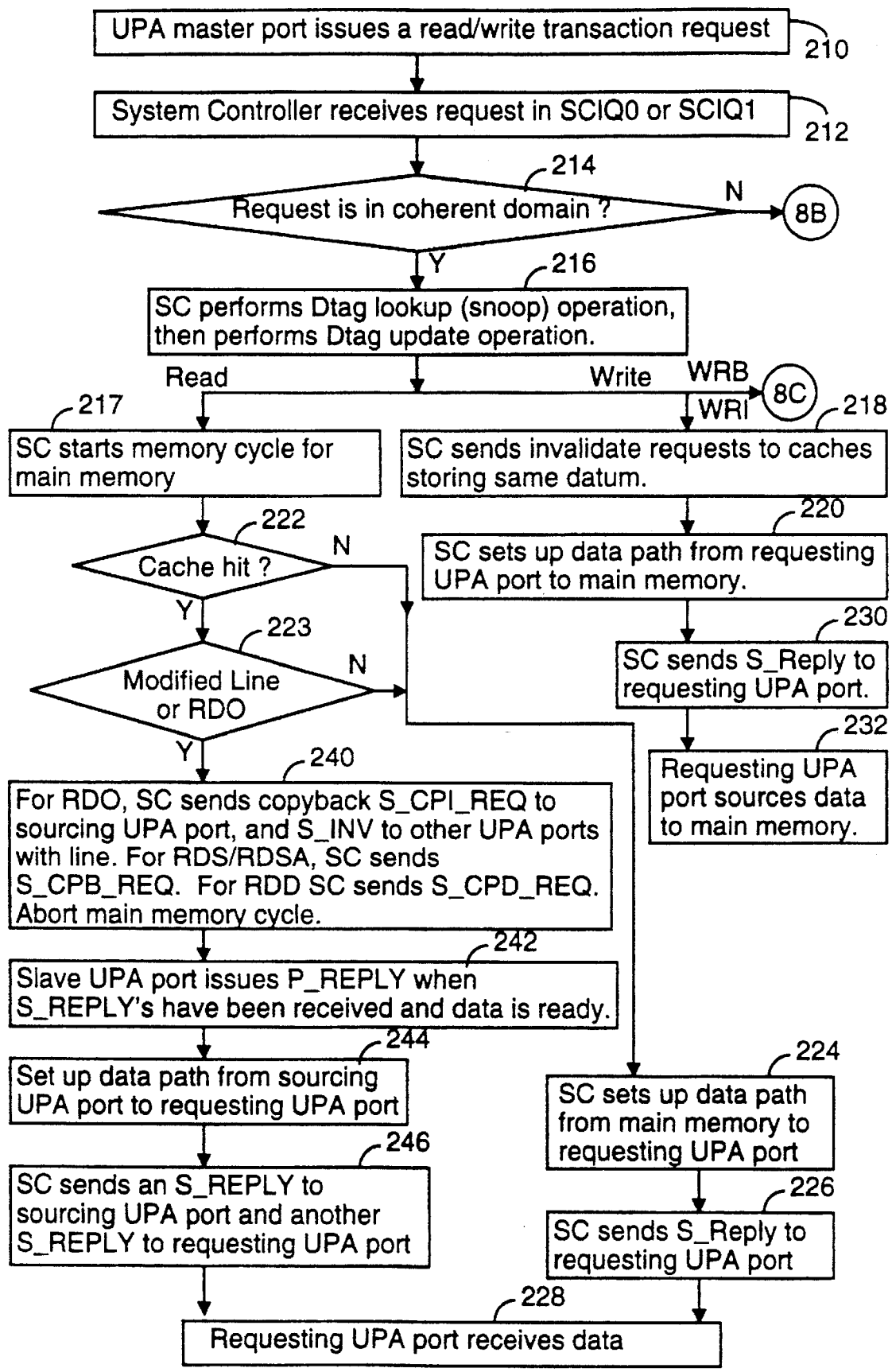
FIG. 8 is a simplified flow chart of typical read/write data flow transactions in a preferred embodiment of the present invention.
Figures 8, 8B:
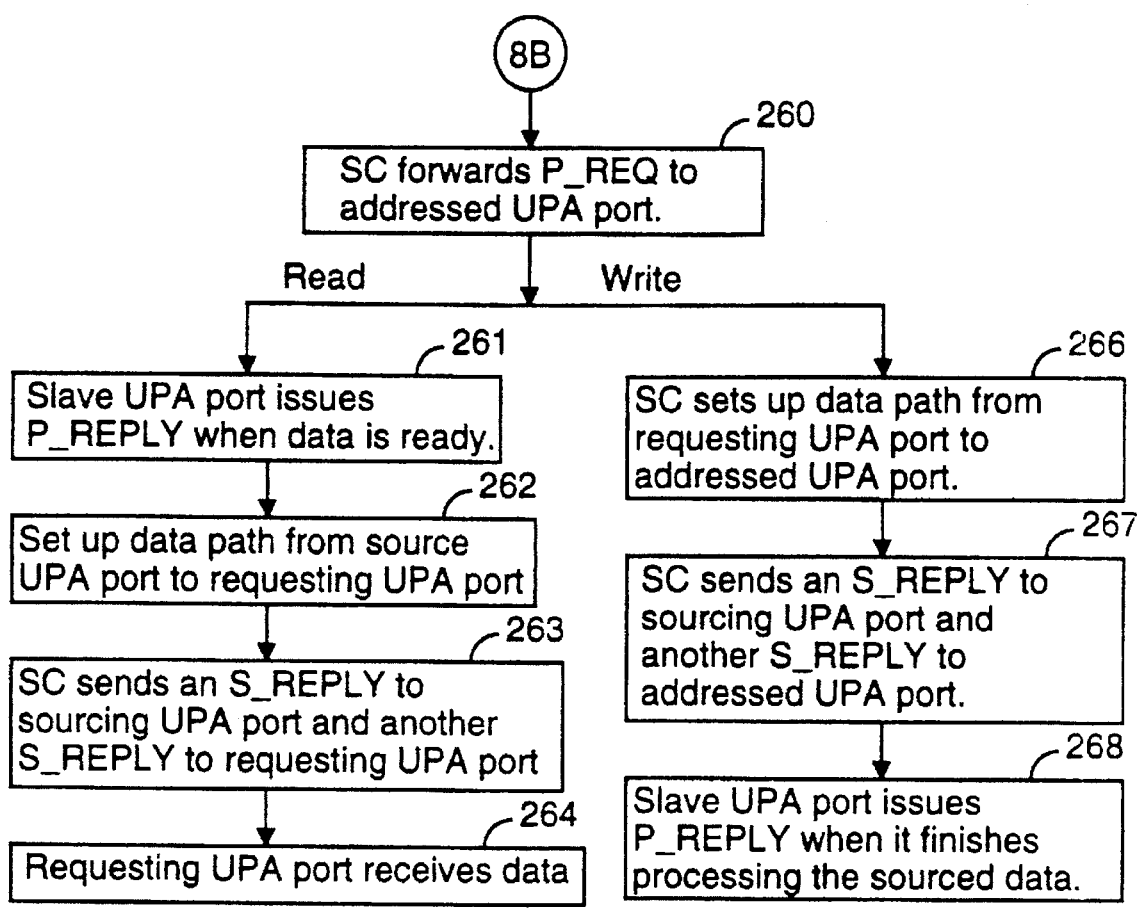
Figure 8C:
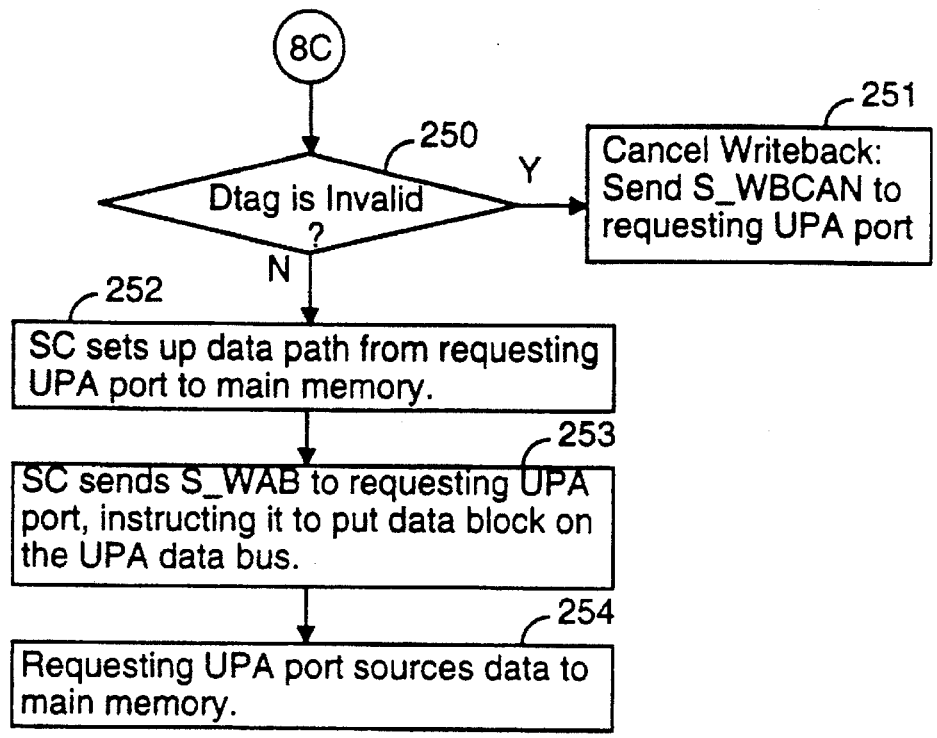
Figure 8D:
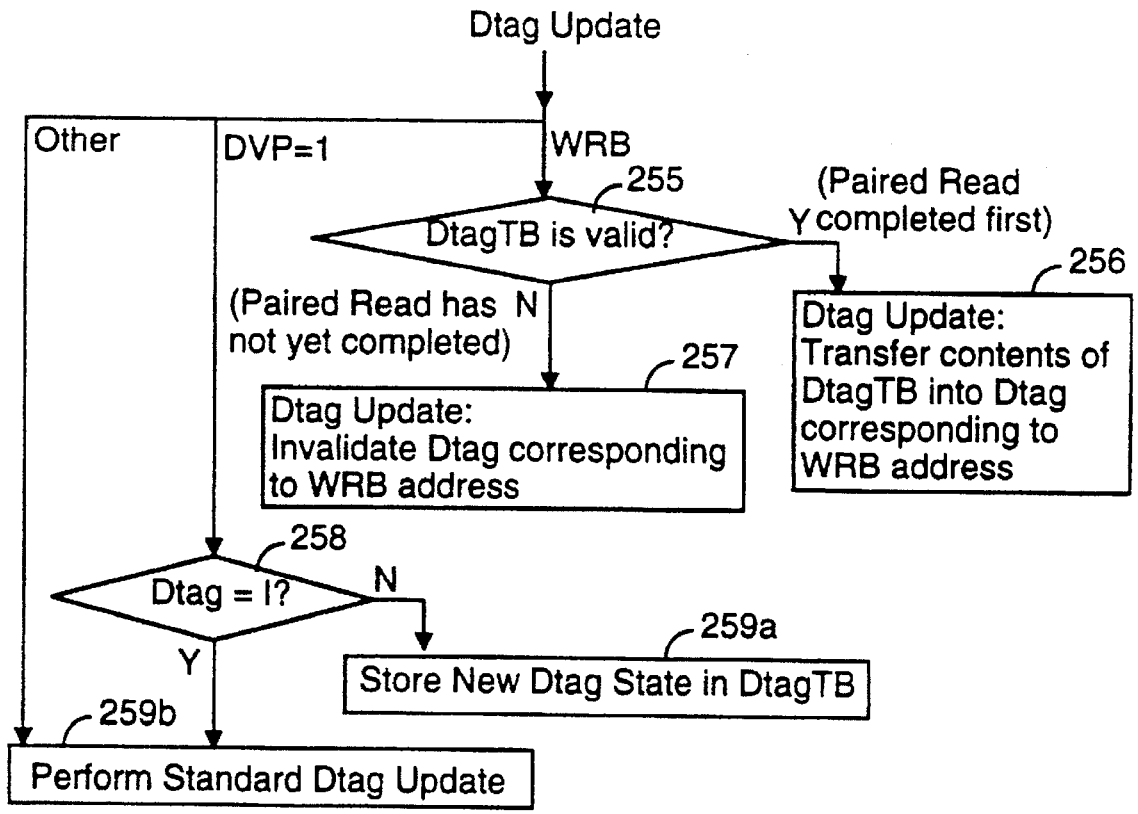

Referring to FIG. 8D, in most cases the Dtag update operation (216) stores new Dtag values in the same Dtag entries that are read during the Dtag lookup operation. However, there are two exceptions concerning read/writeback transaction pairs.

When executing the Dtag update operation for a writeback transaction, if the Dtag transient buffer DtagTB for the requesting processor is currently storing a valid value (255), that means the read transaction paired with the current writeback transaction has been completed (i.e., it completed before the writeback transaction). In that case, the Dtag update operation (256) performed at the end of the writeback transaction transfers the contents of the DtagTB into the Dtag corresponding to the address in the writeback request. If the DtagTB is not currently storing a valid value (255), that means the paired read transaction has not yet completed, in which case the Dtag update operation for the writeback transaction invalidates the Dtag corresponding to the address in the writeback request (257).

Note that if the DtagTB valid bit is set to True when a writeback transaction is canceled, the Dtag update operation still copies the contents of the DtagTB into the associated cache line's Dtag. The Dtags for all other data processors are neither inspected nor changed by the writeback transaction.

When executing the Dtag update operation for a read transaction, if the DVP (dirty victim pending) bit is set to "1" and the lookup of the Dtags for the requesting processor indicates that the corresponding writeback transaction is still pending (i.e., the Dtag state for the address data block is not equal to I) (258), the new Dtag state for the addressed data block is stored in the Dtag transient buffer (DtagTB) awaiting the writeback (259a). Otherwise (i.e., if the Dtag state for the addressed data block is equal to I), the writeback transaction has preceded the read transaction and the new Dtag value generated by the transaction is directly written into the Dtag for the addressed data block (259b).

There is no Dtag update operation for ReadToDiscard transactions since ReadToDiscard operations do not affect the contents of the cache memory of any UPA module. Similarly, the DVP bit should not be set in ReadToDiscard transactions because ReadToDiscard transactions do not displace data blocks in cache memory.

Referring to FIGS. 8A and 8B, a typical non-cached slave read sequence from another UPA Port is as follows. The UPA master port issues a read request (P_REQ) on its UPA address bus to the System Controller 110 (210, 212). After decoding the address and determining that the address is not in the coherent domain (214), the System Controller 110 forwards the P_REQ to the slave interface of the target (addressed) UPA port on the target UPA's UPA address bus (after arbitrating for it) (260). When the requested data is ready for transmission, the target UPA port issues a P_REPLY to the System Controller 110 (261). The System Controller 110 sets up a datapath in the interconnect module from the target UPA port to the requesting UPA port (262), issues an S_REPLY to the target UPA port to drive the requested data on its UPA data bus, and issues an S_REPLY to the requesting UPA master port (263) to receive the data from its UPA data bus (264).

A typical non-cached slave write sequence to another UPA port is as follows. The UPA master port issues a write request (P_REQ) on its UPA address bus to the System Controller 110 (210, 212). After decoding the address and determining that the address is not in the coherent domain (214), the System Controller 110 forwards the P_REQ to the addressed UPA port on that port's UPA address bus (after arbitrating for it) (250). The System Controller 110 sets up a datapath in the interconnect module 112 from the requesting UPA port to the target UPA port (266), issues an S_REPLY to the requesting master port to drive the data on its UPA data bus, and issues an S_REPLY to the target port to receive the data from its UPA data bus (267). The requesting master port considers the transaction completed when it receives the S_REPLY and has transferred the data. However, the target UPA port issues a P_REPLY when it finishes processing the sourced data (268), which is important for flow control purposes because the P_REPLY enables the System to decrement its PReqCnt count of outstanding requests in the target UPA port's slave input request and data queues.

Note that since the address and data paths are independent, and since the slave interface for every UPA port includes both request and data input queues, the request packet and the corresponding data may be forwarded in any order to the UPA port's slave interface, i.e., the data could be given to it before the address, and vice versa. When the data is delivered to the slave interface before the corresponding request packet, the delivered data simply sits in the slave interface's input data queue until the slave interface is ready to process it.

When the slave interface has drained the data and transaction request from its input queue, it issues a P_REPLY to the System Controller 110 indicating it is ready for another slave transaction. The System Controller 110 considers the transaction complete at this point.

Flow control is accomplished by ensuring that the sourcing device (A) always knows, in advance, the maximum size of the queue downstream and (B) keeps count of the remaining space in the latter queue. The maximum queue sizes are statically determined by initialization software at power-on from the UPA port ID registers 158 for all the UPA ports and from SC ID register 180 in the System Controller, and written into flow control registers for the queue immediately upstream. The flow control registers in the System Controller are (A) the queue size parameters PREQ_RQ and PINT_RDQ stored in the System Controller's copy 193 of the UPA Port ID register, and (B) the IntCnt, PReqCnt and SReqCnt counters 194, 195 and 196 in the SC Config Register 190. The other flow control registers in the system are registers 270, 272 in the master interfaces 150 of the UPA ports. In particular, referring to FIG. 5, each master interface 150 of each UPA port 104 includes two registers 270-0, 270-1 that indicate the size of the C0 and C1 master class request queues in the System Controller for that UPA port, and two counters 272-0, 272-1 that indicate the number of requests currently pending in each of the two master class request queues. The queue size values in the SC ID register SCIQ0, SCIQ1 (183, 184) for each UPA master port are copied into the size registers 270 of each corresponding UPA port master interface by the initialization software at power-on.

Flow control is described more completely in patent application Ser. No. 08/414,875, filed Mar. 31, 1995, which is hereby incorporated by reference.

There are no specific size restrictions or requirements for the data and request output queues, except that each such queue must be large enough to handle the maximum number of requests or data packets that the associated device may want to enqueue. Further, since the sizes of output data and request queues are not relevant to other devices in the system for flow control purposes, those size values are not denoted in the configuration registers accessed by the initialization software.

After the software initialization, the queue upstream does not issue more requests to the queue immediately downstream than what the latter queue has capacity for. An S_REPLY from System Controller 110 to the UPA port indicates to the UPA port that System Controller 110 has freed up space for one more request in the respective queue, and is ready for another master request for that queue. A P_REPLY from a UPA port to the System Controller 110 indicates to the System Controller 110 that the UPA slave port has freed up space for one more request in its respective queue, and is ready for another slave request.

An upstream device, such as a UPA port, can transmit in quick succession a series of transactions up to the maximum capacity of a downstream queue, without waiting for any replies, and then wait for at least one S_REPLY or P_REPLY before transmitting any additional requests to the downstream queue.

Flow control is pictorially depicted in FIG. 5. The System Controller 110 input request queues SCIQ0 and SCIQ1 are downstream from the UPA master request class queues C0 and C1 respectively (conversely, C0 and C1 are upstream). Similarly, all the queues in the UPA slave interface are downstream from the System Controller 110.

Cache Coherence Model Overview

The cache coherence protocol used in the present invention is point-to-point write-invalidate. It is based upon five "MOESI" states maintained in the cache tags (Etags) of caching UPA master ports. (Another embodiment of the present invention, as explained below, uses four "MESI" states for systems using "reflective memory" protocols.) The cache coherence protocol operates only on Physically Indexed Physically Tagged (PIPT) caches. The UPA cache coherence domain is bounded by the physically addressed caches. A first level virtually addressed cache, if present, must be kept coherent by the UPA module itself. The Etag cache states are as follows (see FIG. 10 for Etag cache state transitions):

Invalid (I): the cache index and cache line contents are invalid.

Shared Clean (S): the data block stored in the cache line corresponding to this Etag (A) has not been modified by the data processor coupled to this cache, and (B) may be stored one or more other cache memories.

Exclusive Clean (E): the data block stored in the cache line corresponding to this Etag has not been modified by the data processor coupled to this cache and is not stored in any other cache memories.

Shared Modified (O): the data block stored in the cache line corresponding to this Etag has been modified by the data processor coupled to this cache and may be stored in one or more other cache memories.

Exclusive Modified (M): the data block stored in the cache line corresponding to this Etag has been modified by the data processor coupled to this cache and is not stored in any other cache memories.

In another embodiment of the present invention, for systems using "reflective memory" protocols, only four "MESI" states are used. The reason the O state is not needed is that, in a reflective memory system, whenever a first data processor has a cache miss on a data block stored by a second data processor's cache in the M (Exclusive Modified) state, the copyback operation performed for copying the data block from the second to the first data processor also copies the modified data block to main memory. In the case of a regular copyback operation, at the conclusion of the transaction both data processors store the data block in the S (Shared Clean) state. In the case of a copyback and invalidate operation, the requesting data processor's Etag for the data block is in the E (Exclusive Clean) state and the other data processor's corresponding Etag is invalidated. Thus, in a reflective memory multiprocessor system a data block is never shared while in a modified state. Avoidance of the O state is indicated to the data processor by the System Controller with the use of a special copyback transaction called S_CPB_MSI_REQ (instead of S_CPB_REQ) which causes the data processor to make the M→S transition instead of the M→O transition.

The unit of cache coherence is a block size of 64 bytes. Coherent read/write transactions transfer data in 64-byte blocks only, using 4 quadwords.

There is no minimum or maximum cache size requirement. The cache size present in each caching UPA master port is determined by system initialization software, and the number of bits in the cache index are written into a cache index mask (CIM) 194 in the System controller's SC Config register 190.

The System Controller 110 (SC) maintains cache coherence on UPA master caches by sending copyback-invalidation transactions to specific UPA ports in response to read or write access to shared or modified data blocks from other UPA ports. The very first time a data block is referenced by a UPA port, it is given exclusively to that UPA port so that it can subsequently write, it directly without going to the interconnect for write permission. On a subsequent reference to that block from another UPA port, the System Controller 110 sends the appropriate copyback-invalidation to the first UPA port and performs a cache-to-cache transfer of data to the requesting UPA port. In general, System Controller 110 guarantees exclusive ownership on stores by invalidating all other copies of the datum before giving write permission to the requesting UPA master port, and all subsequent loads or stores from any other UPA master port always see the latest value of that datum regardless of which master last performed the store.

In an alternate "performance" implementation, the processor performing the store is allowed to proceed even before all other copies have been invalidated. In such an embodiment, other processors may continue to see the old values in their caches for some transient amount of time until the pending invalidation transaction takes affect. However, all store misses from processors which having pending invalidations are delayed and prevented by the interconnect from completing until the invalidations in those processors are completed. In this optimization the System Controller does not wait for all the invalidation replies. However, even when employing this optimization, stores are still exclusive (i.e., only one processor at a time can write to a cache block) and there is never any transient stale state between two stores from two processors to the same cache block.

Figure 9:
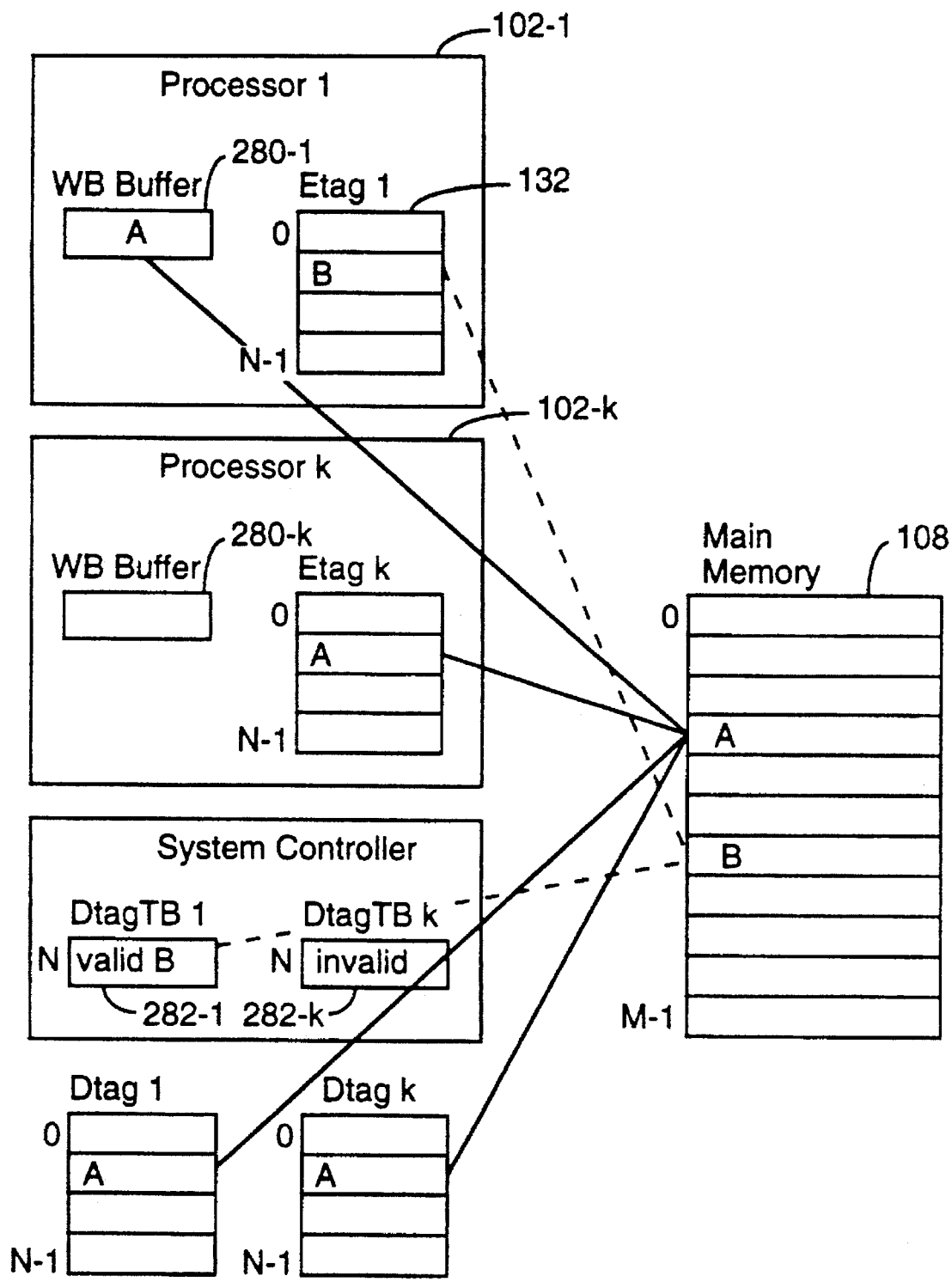
FIG. 9 depicts the writeback buffer and Dtag Transient Buffers used for handling coherent cache writeback operations.

Referring to FIGS. 7 and 9, the cache coherence protocol of the present invention restricts outstanding copyback-invalidation transactions from System Controller 110 to the UPA port to one per UPA port, and requires the UPA port to service the request with high priority by giving it preference over other local accesses to the coherent cache.

The cache coherence protocol supports writeback caches, and restricts outstanding dirty victim writeback transactions to one per UPA port. To simplify the UPA port handling of dirty victimized lines which are required to be kept in the coherence domain until the writeback is completed, the cache coherence protocol does not allow the UPA master port to retract the writeback transaction if the dirty victim is invalidated before the writeback is completed. Instead, the System Controller is made responsible for remembering that the writeback needs to be aborted (cancelled) when the writeback transaction does come along.

In an alternate embodiment, multiple writeback transactions are supported by providing multiple writeback buffers in the processors, and an equal number of Dtag transient buffers in the System Controller. The same protocol works for a plurality of writeback transactions. The present embodiment uses only one outstanding writeback because the preferred data processor does not issue multiple outstanding cache miss transactions. The alternate embodiment would be a requirement for a data processor which utilizes multiple outstanding cache misses.

In order to avoid snoop interference with a processor's reference to its coherent cache in multiprocessor systems, a duplicate cache index (called the Dtag index) having a duplicate set of tags (Dtags) that mirror the UPA port's Etags is maintained by System Controller 110 for each caching master UPA port. The Dtags utilize four "MOSI" cache states, with the E and M states of the Etags being merged. The Dtags support direct mapped cache memories. For each Etag entry there is a corresponding Dtag entry, such that a lookup on the Dtags by the System Controller 110 correctly indicates the corresponding Etag state for a data block, without interfering with a processors access to its Etags. The Dtag states are as follows:

Invalid (I): the cache index and cache line contents are invalid.

Shared Clean (S): the data block stored in the cache line corresponding to this Etag (A) has not been modified by the data processor coupled to this cache, and (B) may be stored one or more other cache memories.

Shared Modified (O): the data block stored in the cache line corresponding to this Etag has been modified by the data processor coupled to this cache and may be stored in one or more other cache memories.

Exclusive and Potentially Modified (M): the data block stored in the cache line corresponding to this Etag may have been modified by the data processor coupled to this cache and is not stored in any other cache memories.

The reason no E state is used in the Dtags is as follows. When a data processor has a cache miss and requests a datum with the "read to own" transaction request, the data processor's UPA port receives the requested data packet and sets its Etag state to M, while the corresponding Dtag is also set by the System Controller to the M state. Thus, the System Controller "assumes" that the data processor will modify the requested data block and stores a cache line state value indicating the data block has been modified even before the data processor has an opportunity to modify the requested data block. As a result, when a data processor modifies a data block received due to an P_RDO_REQ transaction request, it does not need to send a transaction to the System Controller since the System Controller's corresponding Dtag will already denote the cache line as being in the M state. In addition, when a load miss causes a data block to be stored in a requesting data processors cache with an Etag in the E state and a Dtag in the M state, the data processor does not perform a transaction request to the System Controller if it thereafter modifies that data block because the Dtag is already in the M state (Exclusive Modified). The merging of the Dtag E state into the M state is herein called the "first write" optimization, and it greatly reduces the number of transactions that must be generated by each data processor.

As described above, in systems using "reflective memory" protocols, the O state is not needed because a modified data block is never shared. As a result, in reflective memory multiprocessor system, only three "MSI" states are used for Dtags.

Support for caching by an I/O UPA port is provided by the System Controller. For instance, if the I/O UPA port has N fully associative cache buffers, then the System Controller will have a corresponding number of fully associative Dtags. System Controller support for an I/O UPA port's cache memory is independent of the I/O busses and I/O coupled to the I/O UPA port.

Referring to FIG. 9, the present invention provides a special mechanism for handling the writeback of displaced cache data blocks, called "dirty victims," where "dirty" refers to the fact that the displaced data block has modified data written by the data processor associated with the UPA port, and where "victim" refers to the displacement of a cache data block when the data processor references another datum which maps to the same cache line as the data block that is being displaced. The cache writeback mechanism of the present invention allows the writeback transaction to be handled independently of the transaction that stores a new data block in the cache line previously occupied by the dirty victim, thereby avoiding the ordering constraints typically associated with writeback transactions.

FIG. 9 shows the processor Etags 132, the processor's single writeback buffer 280, the duplicate entries maintained in the Dtag arrays by the System Controller 110, and the Dtag Transient Buffers (DtagTBs) 282 inside the system controller for each caching UPA master port. The DtagTB acts as the n+1th Dtag entry (where n is the number of Etag entries in the Etag array), and temporarily holds the Dtag state for a new cache block when a cache miss displaces a dirty block from the cache. The cache fill (read) transaction is performed independent from the dirty victim writeback in order to minimize the cache miss penalty.

If the read transaction completes first, the associated Dtag new state information is stored in the DtagTB. Then, when the writeback transaction request for the dirty victim block completes and the Dtag update operation for the writeback transaction is performed, the contents of the DtagTB are transferred to the Dtag entry for the associated cache line for that processor. The DtagTB to Dtag transfer is a Dtag update operation. If the writeback transaction completes first, the DtagTB is not used.

Whenever the valid bit associated with the DtagTB is set, the DtagTB is included in all Dtag lookup operations as well as all Dtag update operations. For instance, it is quite possible for the cache line updated by a cache fill operation to be modified or invalidated by a subsequent transaction, but before the corresponding writeback transaction is performed. For this reason, the DtagTB is treated in all respects the same as any other Dtag entry so long as its valid bit is set and so long as the transaction being performed is not a writeback transaction. The Dtag update operation for a writeback transaction, as indicated above, causes the contents of the DtagTB to be transferred into the regular Dtag array.

FIG. 9 shows two data processors 102-1 and 102-k that cache the same data block A. Processor 1 has block A in the O state (shared modified), and processor k in S state (shared clean). Processor 1 victimizes block A for a new data block B, and transfers the dirty block A to its writeback buffer 280-1 for writing to memory. The System Controller 110 keeps the Dtag state for block B in the DtagTB 282-1, marks the buffer 282-1 valid, and waits for the writeback transaction. If processor k were to also victimize block A for block B, then block B will simply overwrite block A in the Etags and the Dtags for processor k; and the writeback buffer and DtagTB in processor k will not be used for a transaction as the victim cache line in processor k is clean.

The following is an example sequence of events for a system using the cache coherence protocol of the present invention and the centralized duplicate tags as shown in FIG. 9.

Referring to FIG. 8, a UPA master port asserts a request signal to indicate it wants to arbitrate for the UPA address bus (assuming that a shared UPA address bus is used). The UPA master port eventually wins the arbitration and drives a request packet on the UPA address bus (210).

The System Controller 110 receives the request (212), decodes the transaction type and the physical address in the request packet, and if it is a coherent read or write transaction request (214), the System Controller takes the full address and puts it in the snoop pipeline for a lookup operation (216). The transaction is now considered Active, and will remain Active until the concomitant Update operation is completed for this transaction and an S_REPLY is sent to the requesting UPA master port. While the transaction is Active, the System Controller 110 will block new incoming transactions which have the same cache index from becoming Active. Transaction blocking is discussed in detail below in the section of this document entitled "Transaction Activation."

If the address specified in the coherent transaction is in main memory, the System Controller also initiates the memory cycle (217). If the address specified is not in main memory, the coherent transaction is terminated with an error.

The System Controller consolidates the result of the lookup from all the Dtags, and in the next cycle determines where the data will come from for a read transaction (222, 223). If the data is to be sourced from main memory, the System Controller continues with the memory cycle. If the data is to be sourced from another master UPA port's cache, the System Controller aborts the memory cycle, and sends a S_REQ to at least one of the UPA ports which have a copy of the requested cache line (240). If type of S_REQ sent to the sourcing UPA port depending on the type of P_REQ from the requesting UPA port: for a P_RDO_REQ request, the S_REQ sent to the sourcing port is an S_CPI_REQ; for an P_RDS_REQ or P_RDSA_REQ, the S_REQ sent is a S_CPB_REQ; and for a P_RDD_REQ, the S_REQ sent is a S_CPD_REQ.

If the requesting UPA port is requesting exclusive ownership of the specified data block (i.e., the request is a P_RDO_REQ request) then S_REQ invalidation requests are sent to all the ports which have a copy of the requested cache line. The System Controller waits for a P_REPLY from the UPA ports to which a S_REQ was sent, before generating the S_REPLY to the requesting UPA port (246).

Alternately, the System Controller 110 can generate the S_REPLY to the requesting UPA port after receiving the P_REPLY from the sourcing UPA port, without waiting for the P_REPLY's from other UPA ports to which a S_REQ was sent. However, the coherent read transaction is not completed and removed from the System Controller's pending transaction status array 200 of Active transactions until the System Controller receives all the P_REPLY's from the UPA ports to which a S_REQ was sent. This second methodology is the preferred implementation because it minimizes latency. That is, the requesting data processor receives the requested datum earlier when using the second cache coherence protocol. Furthermore the cache invalidation S_REQ transactions are performed in parallel with the data transfer to the requesting UPA port, thereby making efficient use of the available system resources.

The Dtags are written simultaneously for all the UPA ports which returned a match in the lookup operation. The MOSI state bits in the Dtags are updated with the new value.

When the data is ready to be transferred to the requesting UPA port, the System Controller sends the acknowledgment S_REPLY to the requestor UPA port and the data is transferred on the UPA_Databus either from a sourcing cache, or from main memory.

If the Active transaction is a writeback request, then the Dtag lookup and update are only performed for the requesting master UPA Port, before generating the S_REPLY to it for either driving the data on the UPA data bus, or cancelling the writeback.

If the Active transaction is a write-invalidate request, then the lookup and update are performed in the same manner as for coherent read requests. The System Controller sends an invalidation S_REQ to all UPA ports which have a lookup match. The S_REPLY to the requesting master UPA port for driving the data on the UPA_Databus is held off until all the P_REPLY acknowledgments for invalidations are received. Alternately, the System Controller 110 can generate the S_REPLY to the requesting UPA port after receiving the P_REPLY from only the sourcing UPA port, if any, without waiting for the P_REPLY's from other UPA ports to which a S_REQ was sent. However, the coherent write transaction is not completed and removed from the System Controller's pending transaction status array 200 of Active transactions until the System Controller receives all the P_REPLY's from all the UPA ports to which a S_REQ was sent. This second methodology is the preferred implementation because it minimizes latency.

Ordering Constraints

Transactions from each UPA master request class are strongly ordered end to end at the master interface and at the slave interface. This requirement implies the following constraints:

For multiple outstanding requests from a master class, the S_REPLY for each request is given to the master (by the System Controller) in the same order as the order in which the transaction requests were issued by the UPA master. For example, if T1, T2 are back-to-back read and write transactions issued by a master UPA port from the same master class, the S_REPLY for T1 will be issued by System Controller 110 before the S_REPLY for T2, even if the System Controller 110 could have completed T2 before T1.

For multiple outstanding write requests from a master class to different UPA ports (or to the slave devices connected to UPA slave ports), the System Controller 110 waits for P_REPLY for all the transactions forwarded to one slave UPA port before forwarding any subsequent slave transactions to another slave UPA port. For example, if T1, T2 are back-to-back write transactions issued by a master UPA port to a slave UPA port A, and T3 is a subsequent write transaction issued by the same master to slave UPA port B, the System Controller 110 will wait for the P_REPLY for T1 and T2 from slave port A before forwarding T3 to slave port B.

For multiple outstanding read requests from a master class to different UPA slave ports, the System Controller 110 issues the S_REPLY for data ready to the requesting master UPA in the same order that the master issued the read requests.

For multiple outstanding read requests to a Slave UPA port from a master class, the slave UPA port issues the P_REPLY acknowledgment for them (to the System Controller) in the same order that it received the transactions.

A slave UPA port cannot guarantee write completion to a slave device. Therefore a UPA port can issue a P_REPLY to the System Controller even before the write has reached its final destination (if it is going to a device connected to the I/O bus for instance).

The UPA slave port requires an I/O bus interface to maintain ordering of transactions such that a programmed input/output (PIO) read-after-write to an I/O device location (or an implementation specific range of addresses) returns the datum last written if the I/O device itself supports this (i.e. the addressed location is memory like).

There is no ordering constraint for transactions issued from different master classes from the same UPA port, or for transactions issued from different UPA ports. Maintaining order (if desired) between the two master request classes in a master UPA port is the responsibility of that master (with appropriate interlocks introduced between the two classes before the transaction is issued to the interconnect). A slave UPA port is also not required to order the P_REPLY's for transactions from different UPA masters, or from different master classes from the same UPA port.

There are no synchronization or barrier transactions in the preferred embodiment. Synchronization and barriers are up to the processor on the UPA module, and is required to be taken care of before launching transactions from the UPA master port interface.

In the preferred embodiment of the present invention, references to coherent shared address space (main memory) appear sequentially consistent, even though the interconnect may not be physically sequentially consistent (i.e., there may not be any global order defined in the interconnect). The interconnect however guarantees exclusivity of stores to each UPA port. The interconnect also guarantees correct ordering of transaction completion to enable Dekker's algorithm for acquiring locks in a multiprocessor system to work.

References to I/O devices are sequentially consistent. The slave UPA interface orders transactions by device addresses. All references to the same I/O device (or a predefined address range) are required to complete in the same order that they arrive in at the UPA slave interface. However, there is no ordering of references going to different I/O devices hanging off the same UPA slave interface (such as in a bus bridge) and the UPA slave interface is allowed to execute transactions going to different I/O devices (or different predefined address ranges) in parallel.

Detailed Description of Transactions

The set of defined UPA transactions in the preferred embodiment is specifically designed for efficiently supporting the needs of UPA based workstation and server products. The following are the major requirements and goals of the UPA transactions:

To satisfy bandwidth and latency requirements on the memory system, read/write to main memory are performed in 64-byte blocks only. There are no partial writes to memory, and no read-modify-writes to memory.

The cache block size in the UPA processor modules is 64 bytes, requiring cache fill/writeback and maintaining of cache coherence on 64-byte sized data blocks.

The use of duplicate cache tags (Dtags) by a central interconnect processor (i.e., the System Controller) eliminates the need for atomic locks on main memory datums, but requires efficient support for writeback semantics, point-to-point data transfer semantics, and semantics for read-only misses on instruction fetch.

The interrupt semantics require delivering some software defined "opaque" state information from the interrupting source, requiring 64-byte interrupt packets with non-blocking retry for reliable delivery.

Due to the nature of the UPA interconnect, the transaction set is composed of four sets of components:

P_REQ refers to a transaction request generated by a master UPA port on its UPA address bus. This is what initiates all data transfer activity in the system. The System Controller either forwards the P_REQ transaction request to the slave interface of a UPA port (slave access or an interrupt packet), or services the transaction itself if the address in the request packet falls within its managed address space (i.e., main memory).

S_REQ refers to a transaction request generated by the System Controller on the appropriate UPA address bus, directed to the slave interface of caching UPA ports for copyback-invalidation in response to some a P_REQ.

P_REPLY refers to a transaction acknowledgment generated by a UPA port on point-to-point unidirectional wires from the UPA port to the System Controller. Generated in response to a previous S_REQ transaction from System Controller, or forwarding of a previous P_REQ slave address space transaction by System Controller.

S_REPLY refers to a transaction acknowledgment generated by the System Controller on point-to-point unidirectional wires from the System Controller to a UPA port. S_REPLY messages are generated in response to a P_REQ or P_REPLY from a UPA port.

Figure 10A:
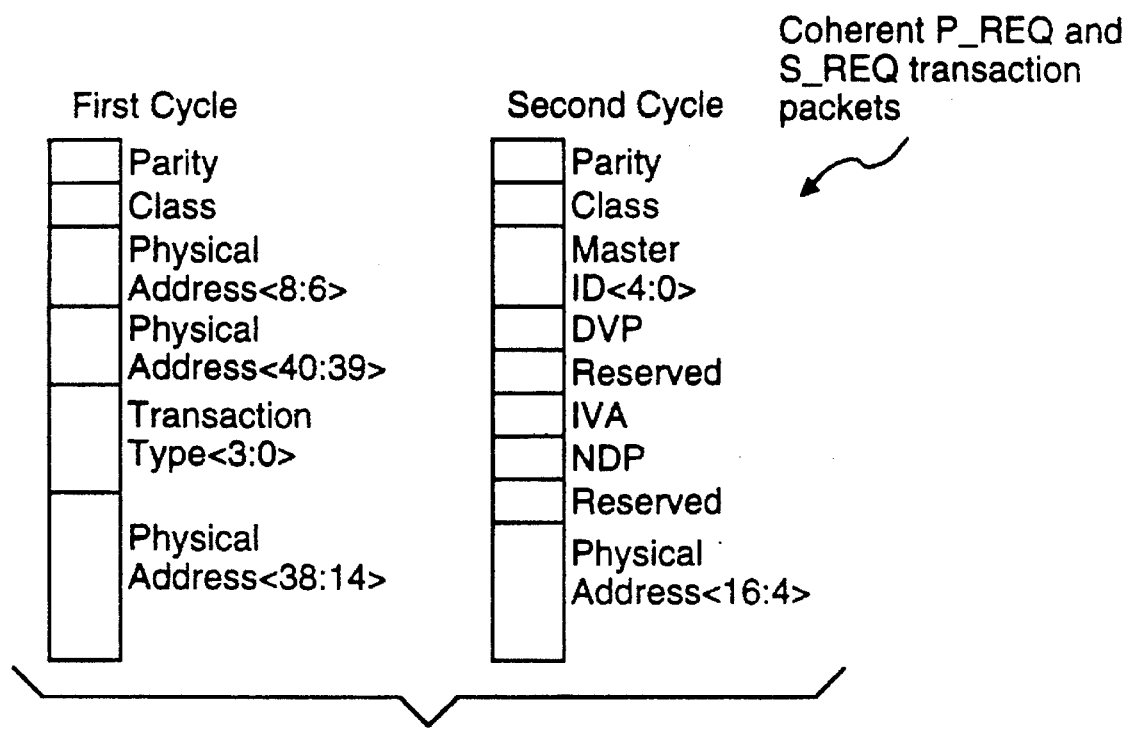
FIGS. 10A, 10B 10C, 10D and 10E show the data packet formats for various transaction request packets.
Figure 10B:
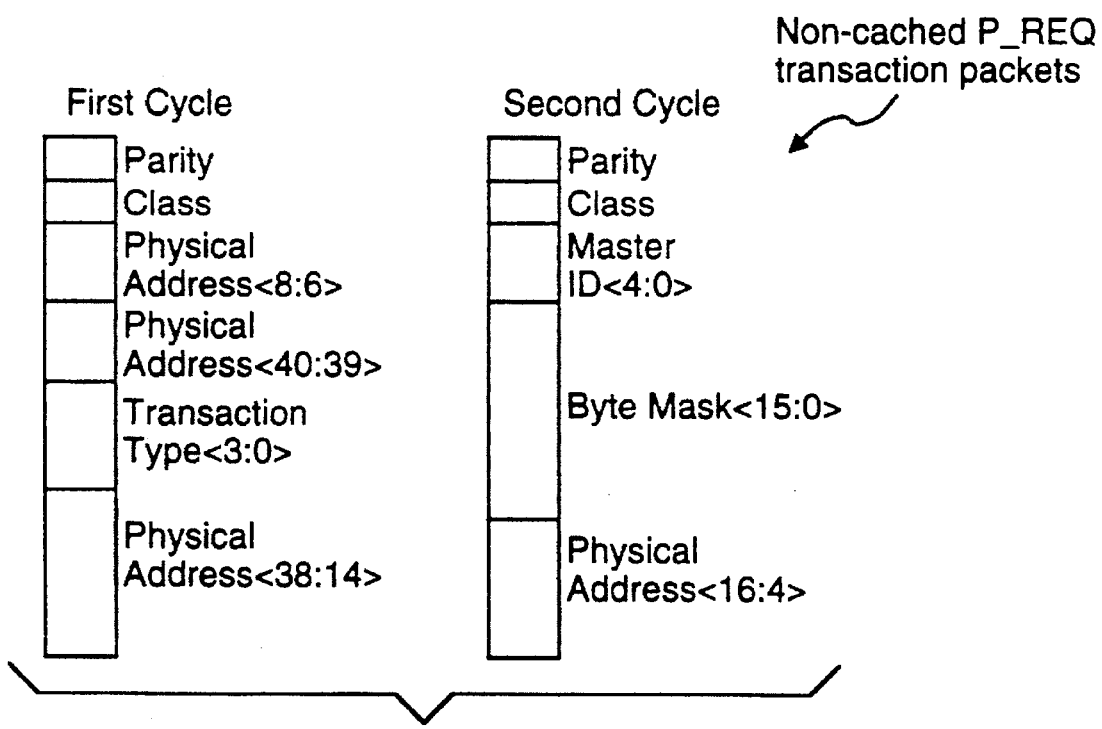
Figure 10C:
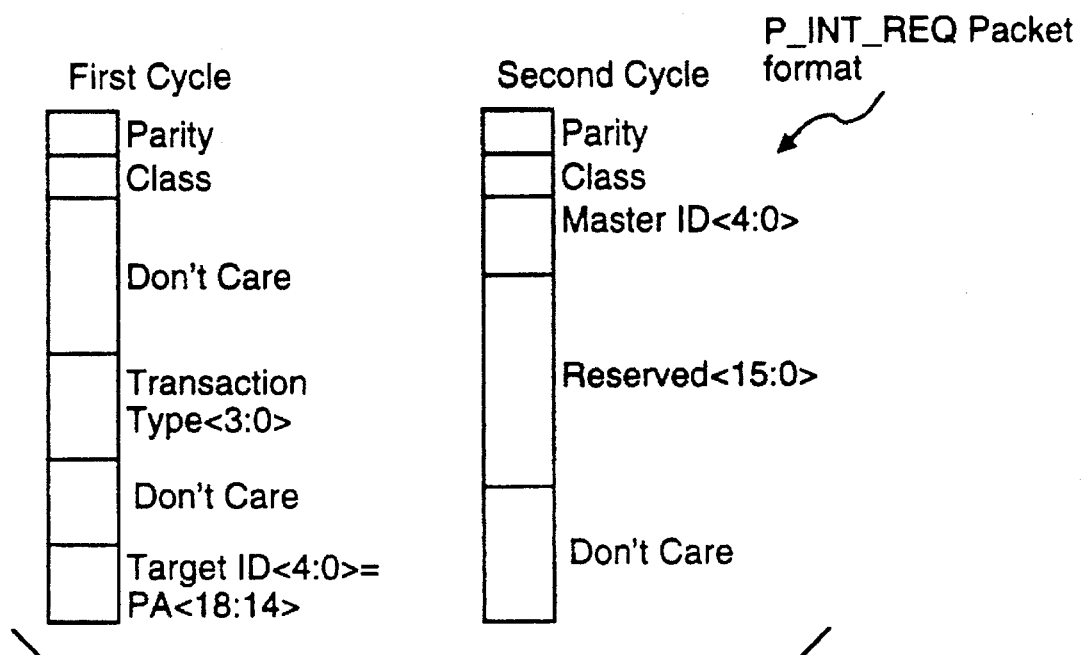

FIG. 10A shows the data packet format for coherent P_REQ and S_REQ transaction request packets. FIG. 10B shows the data packet format for non-cached P_REQ transaction request packets. FIG. 10C shows the data packet format for interrupt P_INT_REQ transaction request packets. These figures will be referenced in the following discussion.

A summary of the transaction set is given in Table 3. Tables 4 and 5 respectively specify the legal request/reply combinations for UPA master and slave interfaces. Table 6 specifies the transaction type to use due to various events for a Caching UPA master port.

TABLE 3

| Transaction Set | | | |
| --- | --- | --- | --- |
| Transaction Request Generated by UPA Port | Transaction Request Generated by System Cntrlr | P_REPLY generated by UPA port | S_REPLY generated by System Cntrlr |
| P_RDS_REQ | S_INV_REQ | P_IDLE | S_IDLE |
| P_RDSA_REQ | S_CPB_REQ | P_RTO | S_RTO |

TABLE 3-continued

Transaction Set

| Transaction Request Generated by UPA Port | Transaction Request Generated by System Cntrlr | P_REPLY generated by UPA port | S_REPLY generated by System Cntrlr |
|---|---|---|---|
| P_RDO_REQ | S_CPI_REQ | P_RERR | S_ERR |
| P_RDD_REQ | S_CPD_REQ | P_FERR | S_WAS |
| P_WRB_REQ | S_CPB_MSI_REQ | P_RAS | S_WAB |
| P_WRI_REQ | | P_RAB | S_OAK |
| P_NCRD_REQ | | P_RASB | S_RBU |
| P_NCWR_REQ | | P_WAS | S_RBS |
| P_NCBRD_REQ | | P_WAB | S_RAS |
| P_NCBWR_REQ | | P_IAK | S_SRS |
| P_INT_REQ | | P_SACK | S_SRB |
| | | P_SACKD | S_CRAB |
| | | P_SNACK | S_SWS |
| | | | S_SWB |
| | | | S_SWIB |
| | | | S_INAK |
| | | | S_WBCAN |

TABLE 4

Valid Requests and Reply Types at UPA Master Interface

| Transaction Type | P_REPLY | S_REPLY |
|---|---|---|
| P_RDS_REQ | none | S_RBU | S_RBS | S_ERR* | S_RTO* |
| P_RDSA_REQ | none | S_RBS | S_ERR* | S_RTO* |
| P_RDO_REQ | none | S_OAK* | S_RBU | S_ERR* | S_RTO* |
| P_RDD_REQ | none | S_RBS | S_ERR* | S_RTO |
| P_WRB_REQ | none | S_WAB | S_WBCAN |
| P_WRI_REQ | none | S_WAB |
| P_NCRD_REQ | none | S_RAS | S_ERR* | S_RTO |
| P_NCWR_REQ | none | S_WAS |
| P_NCBRD_REQ | none | S_RBU | S_ERR* | S_RTO |
| P_NCBWR_REQ | none | S_WAB |
| P_INT_REQ | none | S_WAB | S_INAK* |

*There is no data transfer for these S_REPLY types, and the System Controller terminates the transaction after issuing any of these S_REPLY types to the master interface.

TABLE 5

Valid Requests and Reply Types at UPA Slave Interface

| Transaction Type | P_REPLY | S_REPLY# |
|---|---|---|
| S_INV_REQ | P_SACK | P_SACKD | P_SNACK* | P_FERR† | none |
| S_CPB_REQ | P_SACK | P_SACKD | P_SNACK* | P_FERR† | S_CRAB |
| S_CPD_REQ | P_SACK | P_SACKD | P_SNACK* | P_FERR† | S_CRAB |
| S_CPI_REQ | P_SACK | P_SACKD | P_SNACK* | P_FERR† | S_CRAB |
| P_NCBWR_REQ | P_WAS | P_FERR† | S_SWB |
| P_NCWR_REQ | P_WAS | P_FERR† | S_SWS |
| P_NCBRD_REQ | P_RAB | P_RASB^ | P_RERR** | P_RTO** | P_FERR† | S_SRB |
| P_NCRD_REQ | P_RAS | P_RASB^ | P_RERR** | P_RTO** | P_FERR† | S_SRS |
| P_INT_REQ | P_IAK | P_FERR† | S_SWIB |

*P_SNACK reply for these S_REQ is only considered valid by the system if the NDP (no Dtag present) bit is set in the S_REQ packet. If the NDP bit is not set, then P_SNACK is treated by the system as a fatal error indicating a hardware fault condition. There is no data transfer with P_SNACK and the transaction is terminated by the slave interface after issuing it.
**P_RERR (bus error) and P_RTO (timeout) are only available for non-cached slave read transactions. There is no data transfer and the transaction is terminated by the slave after issuing the P_REPLY's. Note that these P_REPLY's are not asserted on any S_REQ.
†P_FERR is a valid reply at the UPA slave interface for all transactions and causes a system wide power-on reset to be generated. It is primarily asserted upon the slave detecting a parity error on the request packet. P_FERR may be asserted at any time by a slave interface to perform a system reset. There is no data transfer and the UPA port can expect to receive a system reset within a small number of clock cycles after issuing P_FERR.
^P_RASB can only be used by a slave interface if it has the ONEREAD bit set in its port ID register.
S_REPLY is given only if there is no error and data is to be transferred to or from the slave interface.

TABLE 6

UPA Master Interface Decision Table for which Transaction Type to Use

| Etag Block State | UPA Interface Visible Event | Transaction |
|---|---|---|
| I (Cache Miss) | Instruction Fetch | P_RDSA_REQ |
| | Data Load | P_RDS_REQ |
| | Block Load \| DVMA Read | P_RDD_REQ |
| | Data Store \| Atomic | P_RDO_REQ |
| | Block Store \| DVMA Write | P_WRI_REQ |
| | Missed on a Dirty Victim (Writeback) | P_WRB_REQ |
| | Partial Write (read-modify-write in a merge buffer for DVMA)+ | P_RDO_REQ & P_WRB_REQ |
| M (Cache Hit) | Block Load \| DVMA Read | P_RDD_REQ |
| | Block Store \| DVMA Write | P_WRI_REQ |
| O (Cache Hit) | Data Store \| Atomic | P_RDO_REQ |
| | Block Load \| DVMA Read | P_RDD_REQ |
| | Block Store \| DVMA Write | P_WRI_REQ |
| E (Cache Hit) | Block Load \| DVMA Read | P_RDD_REQ |
| | Block Store \| DVMA Write | P_WRI_REQ |
| S (Cache Hit) | Data Store \| Atomic | P_RDO_REQ |
| | Block Load \| DVMA Read | P_RDD_REQ |
| | Block Store \| DVMA Write | P_WRI_REQ |
| Non-Cached | Block Load | P_NCBRD_REQ |
| | Block Store | P_NCBWR_REQ |
| | 1-16 Byte Load | P_NCRD_REQ |
| | 1-16 Byte Store (with byte mask) | P_NCWR_REQ |

+P_RDO_REQ has the DVP bit set to indicate that a writeback is following.

Cache Coherent Transactions

Cache coherent transactions are transactions issued to access cacheable main memory address space. Many of these transactions modify the Etag and Dtag cache state of the requesting UPA master port, as well as the Etag and Dtag states of other UPA master ports. Cache state transitions are described in detail in the section of this document entitled "Cache Coherence Protocol".

The following are detailed explanations of each of the defined cache coherent transactions.

ReadToShare (P_RDS_REQ)

Coherent read to share transactions are sent by a UPA master port to the System Controller when the data processor in the associated UPA module attempts to load data from a specified address, and that address is not stored in the local cache memory. This is called a "load miss."

If no other cache has the requested datum, then the Etag state for the requested datum transitions to E, and the associated Dtag state transitions to M. This gives exclusive access to the caching UPA master to later write this datum without generating another interconnect transaction.

If another cache also has this datum, then both the Etag and Dtag states for the requested datum in the requesting UPA port transition to S.

If the data is sourced from another cache, the System Controller sends the sourcing UPA port the S_CPB_REQ copyback transaction request, and waits for a P_SACK or P_SACKD reply. When the P_REPLY is received, the System Controller commands the sourcing cache to transmit the requested data block by sending it a S_CRAB reply message.

The sourcing UPA port must provide the addressed quad-word first, and wrap modulo 16 bytes based on the low order physical address bits PA[5:4] for successive quad-words as shown in Table 2, above. The recipient UPA port requires data to be delivered in this order. This is true for all the data transfer transactions, and thus will not be repeated.

The System Controller provides the data to the requesting master UPA port with a S_RBS (Read Block Shared) reply message if another cache also shares it, and with a S_RBU (Read Block Unshared) reply message if no other cache has it.

If this transaction displaces a dirty victim block in the cache (Etag state is M or O), the Dirty Victim Pending (DVP) bit must be set in the request packet (see packet format in FIG. 10A).

The System Controller issues an S_RTO (timeout) reply message to the requesting UPA master port if the address in the master port's transaction request is for unimplemented main memory, S_ERR (bus error) if the address is in noncacheable address space, and causes a system reset if a parity error is detected.

If a UPA slave port receives this transaction from the System Controller, it can only be due to a fatal hardware fault in the System Controller. The UPA slave port is not required to issue any P_REPLY and can ignore the transaction, which will eventually hang the system.

ReadToShareAlways (P_RDSA_REQ)

Coherent read to share always transactions are sent by a UPA master to the System Controller 110 due to a read-only miss (i.e., a cache miss on a read of a read-only address location) such as miss on an instruction load. This transaction is the same as the ReadToShare transaction discussed above, except that the Etag and Dtag of the requesting master UPA port always transition to S (shared clean), and the System Controller provides the data with the S_RBS reply (read block shared acknowledgement).

If this transaction displaces a dirty victim block in the cache (i.e., the Etag state of the associated cache line is M or O), the Dirty Victim Pending (DVP) bit must be set in the request packet (see the packet format in FIG. 10A).

The ReadToShareAlways transaction is an optimization for the case when it is known, a priori, that the missed datum is read-only (such as in an Instruction Cache miss) and will not be modified. Hence this datum is always returned by the interconnect in the shared clean (S) state even when no one else has it. As a result, if another processor reads the same address, causing a cache miss in that processor, the missed data will be supplied by main memory, not the cache which already has the same datum. This avoids the "second read penalty" that occurs when data is sourced from a UPA port's cache memory when it should be sourced from main memory.

Sourcing data from a UPA port's cache memory when it should be sourced from main memory is called a "second read penalty" because sourcing data from a UPA port's cache memory interferes with use of that cache memory by its associated data processor. In the preferred embodiment, copyback transactions have priority over data processor requests to its cache memory, and thus an unnecessary cache read by the interconnect will typically delay the operation of the associated data processor for a couple of clock cycles.

Error handling for the ReadToShareAlways transaction is the same as for the ReadToShare transaction.

Further description of the RDSA transaction and associated logic circuitry is described in patent application Ser. No. 08/423,016, filed Mar. 31, 1995, which is hereby incorporated by reference.

ReadToOwn (P_RDO_REQ)

Coherent read invalidate transactions are sent by a UPA master to the System Controller due to a store miss, or a store hit on a shared line, or a read with intent to write for merging partial writes (read-modify-write).

This transaction causes the Etag and Dtag entries for the addressed data block to both transition to M (exclusive modified). If the UPA master does not have the addressed data block, and one or more other caches have the block, then the memory cycle is aborted. The System controller sends one UPA port a S_CPI_REQ request for copyback-and-invalidate, and sends to all other UPA ports (S_INV_REQ) invalidation requests. The System Controller waits for the P_SACK or P_SACKD replies from all the UPA ports to which S_REQ requests were sent. After all the P_REPLY's are received, the System Controller provides the data to the requesting master UPA port with S_RBU reply.

In an alternate embodiment, the System Controller 110 generates the S_REPLY to the requesting UPA port after receiving the P_REPLY only from the sourcing UPA port, if any, without waiting for the P_REPLY's from other UPA ports to which a S_REQ was sent. However, the coherent read transaction is not completed and removed from the System Controller's pending transaction status array 200 of Active transactions until the System Controller receives all the P_REPLY's from all the UPA ports to which a S_REQ was sent.

If the UPA master already has the block in the shared or owned state and wants exclusive ownership so it can write it (i.e., a store hit on a line in the S or O state), no data is transferred and the System Controller sends invalidate requests to all other caching UPA master ports that also store the addressed data block. The System Controller replies with an S_OAK (exclusive ownership acknowledgment) reply to the requesting UPA port after it receives P_SACK or P_SACKD replies from all other UPA ports that share this block.

In an alternate embodiment, the S_OAK reply is sent by the System Controller to the requesting UPA port immediately after the invalidate requests are sent to the other UPA ports that share the addressed data block, but the transaction is not completed and removed from the System Controller's pending transaction status array 200 of Active transactions until the System Controller receives P_REPLY's from all the UPA ports to which invalidate requests were sent. In addition, each processor that receives an invalidation request is prevented from completing any transactions subsequently initiated by that processor until the invalidation transaction is completed.

If this transaction displaces a dirty victim block in the cache (i.e., the Etag state is M or O), the Dirty Victim Pending (DVP) bit must be set in the request packet (see the packet format shown in FIG. 10A). The System Controller determines whether or not to transfer data by snooping the Dtags.

Error handling for the ReadToOwn transaction is the same as for the ReadToShare transaction.

ReadToDiscard (P_RDD_REQ)

Coherent read with intent to discard after first use transactions are sent by a UPA master to the System Controller when the data processor associated with the requesting UPA port does not want to pollute its cache and will discard the data after one use. This transaction is also used for taking data out of the coherent domain as in coherent DVMA reads, and block loads of registers for Bcopy (block copy) operations.

This transaction does not change any Dtag or Etag entries. This transaction causes a non-destructive read from an owning cache (in the M or O state), or from main memory. When the sourcing device is ready to transmit the requested data, the System Controller enables the data transfer by sending a S_REPLY to the requesting master UPA port.

The DVP bit in the transaction request packet is ignored by the System Controller for this transaction. Error handling for the ReadToOwn transaction is the same as for the ReadToShare transaction.

Writeback (P_WRB_REQ)

Writeback transaction requests are sent by a UPA master to the System Controller for writing back a dirty victimized block to its home location. There is always a coherent victimizing read transaction (with the DVP bit set) on the same cache index paired with the writeback request. The Etag and Dtag state transitions for the affected cache line depend on whether the writeback is executed first, or the coherent read which victimized the line is executed first.

If the writeback transaction is executed first, the Etag and Dtag state both transition to I (Invalid) when the writeback transaction is performed. When the read transaction is performed, the Etag and Dtag state will transition from the I state to the state associated with the read data block.

If the writeback transaction is executed last, when the read transaction is performed the Etag transitions to its new state and the corresponding Dtag state is stored in the DTag Transient Buffer 282. Then, when the writeback transaction is performed, the Etag remains unchanged and the Dtag that was temporarily stored in the Dtag Transient Buffer 282 is copied into the Dtag associated with the read data block.

If the writeback is to be cancelled because of an intervening invalidation (S_CPI_REQ or S_INV_REQ) for the victimized datum (due to a P_RDO_REQ or P_WRI_REQ transaction from another UPA port), no data is written and the System Controller cancels the writeback with a S_WBCAN reply. Writeback cancellation is discussed below in the section of this document entitled "Writeback Cancellation."

If the writeback is not cancelled, then the System Controller issues S_WAB to the requesting master UPA port, which prompts the requesting master UPA port to drive the 64-byte block of data aligned on a 64-byte boundary (A[5:4] =0×0) onto the UPA data bus.

Only one outstanding writeback transaction is allowed from each UPA port. The writeback transaction and its accompanying read transaction (with the DVP set) must both complete (receive the respective S_REPLY's from the System Controller) before a second writeback and its accompanying read can be issued by the UPA port.

Since a writeback request is always paired with a read request (with the DVP bit set), the writeback must always be issued if the read is issued, and vice versa, even if the read terminates with an error. If the address in the writeback transaction is for unimplemented main memory, the System Controller does nothing as this condition is illegal and cannot occur under normal operation. If it does occur, it can only be due to a fatal hardware fault in the UPA module and will eventually hang the system. The System Controller causes a system reset if it detects a parity error.

A P_WRB_REQ transaction directed to the noncached slave address space of a UPA port is illegal and cannot occur under normal operation and cannot be generated by any programming error. If a master UPA port issues P_WRB_REQ to any non-cacheable space, the System Controller will not complete the transaction and will hang the system.

If a UPA slave port receives the P_WRB_REQ transaction from the System Controller, it can only be due to a fatal hardware fault in the System Controller. The UPA slave port is not required to issue any P_REPLY and can ignore the transaction, which will eventually hang the system.

WriteInvalidate (P_WRI_REQ)

Coherent write and invalidate requests are sent by a UPA master to the System Controller to write a data block coherently to its home location. This transaction is used for coherent DVMA writes and Bcopy block stores and serves to inject new data into the coherent domain. There is no victim read transaction associated with this request.

Both the Etag and Dtag associated with the addressed data block transition to I. Before accepting the data from the requesting UPA port, the System Controller invalidates all copies of the data block in all caches, including the requesting UPA port, by sending an S_REQ to the slave interface of those UPA ports, and waits for P_REPLY from all of them. After all invalidations have been acknowledged, the System Controller issues S_WAB to the master UPA port to prompt the master UPA port to drive the 64-byte block of data aligned on a 64-byte boundary (A[5:4]=0×0) onto the UPA_Databus.

Alternately, the System Controller can send the invalidation requests, but not wait for the corresponding P_REPLY's before issuing the S_WAB transaction request to the requesting master UPA port. However, the coherent write transaction is not completed and removed from the System Controller's pending transaction status array 200 of Active transactions until the System Controller receives all the P_REPLY's from all the UPA ports to which a S_REQ invalidation request was sent. In addition, each processor that receives an invalidation request is prevented from completing any transactions subsequently initiated by that processor until the invalidation transaction is completed.

An Invalidate me Advisory bit (IVA) is defined in the P_WRI_REQ transaction packet for use in systems implemented without Dtags. The requesting UPA master sets this bit if it wants the System Controller to also send it a S_INV_REQ transaction. The System Controller uses this bit in systems without Dtags to send a S_INV_REQ transaction to the requesting UPA port only if the IVA bit is set. The System Controller ignores this bit in systems with Dtags, and uses the Dtags to determine which UPA ports to send S_INV_REQ to.

Further description of the transactions using the IVA bit and associated logic circuitry is described in patent application Ser. No. 08/414,365, filed Mar. 31, 1995, which is hereby incorporated by reference.

Multiple WriteInvalidate transactions can be issued back to back by a master UPA port so long as the System Controller has sufficient space in its request receiving queue C0 or C1 to store the transaction requests.

The System Controller silently discards the data (after giving the S_WAB reply) if the address is for unimplemented main memory, and causes system reset if a parity error is detected.

A P_WRI_REQ transaction directed to the non-cached slave address space of a UPA port is completed by the System Controller by sending a S_WAB reply to the master UPA port, but the transaction and its data are discarded silently. This error can occur due to a programming error and hence is detected and recovered by the system. Such errors may be logged by the System Controller.

If a UPA slave port receives this transaction from the System Controller, it can only be due to a fatal hardware fault in the System Controller. The UPA slave port is not required to issue any P_REPLY and can ignore the transaction, which will eventually hang the system.

Invalidate (S_INV_REQ)

Invalidate requests sent by the System Controller to the slave interface of caching UPA ports are generated by the System Controller to service a ReadToOwn (P_RDO_REQ) or WriteInvalidate (P_WRI_REQ) request for a data block. Both the Etag and Dtag associated with the addressed data block transition to I.

To service a P_RDO_REQ transaction, the System Controller sends the invalidate request to a UPA port according to the following rules. If only one UPA port has the datum, then S_INV_REQ is not sent to it, instead a copyback-invalidate request (S_CPI_REQ) is sent to that one UPA port to source and invalidate the datum. If more than one UPA port has the datum (with Dtag's in the S or O state), a S_CPI_REQ transaction request is sent to one of those UPA ports and an invalidate request (S_INV_REQ) is sent to all the others.

To service a P_WRI_REQ transaction, the System Controller sends the invalidate request to all UPA ports whose Dtag state is M or O or S, including the requesting UPA port.

In systems without Dtags, an Invalidate me Advisory bit (IVA) in the P_WRI_REQ transaction packet specifies to the System Controller whether or not to send S_INV_REQ to the requesting UPA port. The IVA bit acts as a snoop filter in systems without Dtags to avoid false invalidations to the requesting UPA port. The System Controller ignores this bit in systems with Dtags, and uses the Dtags to determine which UPA ports to send S_INV_REQ to.

The System Controller waits for the P_SACK or P_SACKD reply before issuing the appropriate S_REPLY to the requesting master UPA port. This transaction can be NACK'ed by the UPA port with P_SNACK reply if the block does not exist in its cache.

If a UPA port receiving the S_INV_REQ invalidate transaction request is not a Cache master (as specified by its port-ID register), it can only be due to a fatal hardware fault in the System Controller. The UPA port is not required to issue any P_REPLY and can ignore the transaction, which will eventually hang the system. A cache master UPA port however must issue a valid P_REPLY for this transaction to complete it.

If the UPA slave port detects a parity error, it asserts P_FERR, which causes the System Controller to generate a system reset.

Copyback (S_CPB_REQ)

A copyback request from the System Controller to the slave interface of a caching UPA port is generated by the System Controller to service a ReadToShare (P_RDS_REQ) or ReadToShareAlways (P_RDSA_REQ) request for a block. The final state of the Dtag and Etag associated with the addressed data block is O or S.

The System Controller sends the S_CPB_REQ transaction to one UPA port according to the following rules. The S_CPB_REQ is sent to a UPA port with a Dtag state of M or O. The S_CPB_REQ request cannot be sent to the requesting UPA port. The System Controller waits for a P_SACK or P_SACKD reply from the UPA port. This S_REQ cannot be NACK'ed with a P_SNACK reply if the UPA port does not have the block, unless the NDP (No Dtag Present) bit is set in the S_REQ. A P_SNACK reply if NDP bit is not set is treated by the System Controller as a fatal error.

After receiving the P_REPLY, the System Controller issues a S_CRAB reply to the sourcing UPA port to prompt the sourcing UPA port to drive the data on the UPA_Databus, and issues a S_RBS reply to the requesting master UPA port. The sourcing UPA port is required to copyback the addressed quad-word first, wrapping around on A[5:4] for successive quad-words.

Error handling for the Copyback transaction is the same as for the Invalidate transaction.

If the UPA slave port detects a data error, it must drive invalid checkbits on the UPA_Databus such that the master may detect an uncorrectable ECC error. An invalid, or unimplemented address is never sent in an S_REQ as the System Controller would have terminated the corresponding P_REQ transaction with an S_ERR.

Copyback (S_CPB_MSI_REQ)

The S_CPB_MSI_REQ copyback request is the same as the S_CPB_REQ copyback request, except: (A) the S_CPB_MSI_REQ is used only in systems having reflective memory, (B) the datablock written to the requesting UPA port is also written into main memory, and (C) both Etags and Dtags make the M→S transition in response to the S_CPB_MSI_REQ transaction request. The O state is not used in systems having reflective memory, and thus there are only three legal Dtag states: M, S and I and four legal Etag states: M, E, S and I.

CopybackInvalidate (S_CPI_REQ)

Copyback and invalidate requests are sent by the System Controller to the slave interface of a caching UPA port to service a ReadToOwn (P_RDO_REQ) request for a data block. Both the Etag and Dtag associated with the addressed data block transition to I.

The System Controller sends the S_CPI_REQ transaction to one UPA port according to the following rules. The S_CPI_REQ transaction request is sent to only one UPA port with a Dtag state of M, O or S. The S_CPI_REQ request cannot be sent to the requesting UPA port.

The System Controller waits for a P_SACK or P_SACKD reply from the UPA port to which the S_CPI_REQ request was sent. This S_REQ cannot be NACK'ed with a P_SNACK reply if the UPA port does not have the block, unless the NDP (No Dtag Present) bit is set in the S_REQ. A P_SNACK reply if NDP bit is not set is treated by the System Controller as a fatal error.

After receiving the P_REPLY from this UPA port (as well as from other UPA ports to which an invalidation was sent), the System Controller issues a S_CRAB reply to the sourcing UPA port to prompt the sourcing UPA port to drive the data onto the UPA data bus, and issues a S_RBU reply to the requesting master UPA port. The sourcing UPA port is required to copyback the addressed quad-word first, wrapping around on A[5:4] for successive quad-words.

Error handling for the CopybackInvalidate transaction is the same as for the Copyback transaction.

CopybackToDiscard (S_CPD_REQ)

Non-destructive copyback requests are sent by the System Controller to the slave interface of a caching master UPA port to service a ReadToDiscard (P_RDD_REQ) request for a data block. This transaction causes no state change in the Dtag and Etag associated with the addressed data block.

The System Controller sends the S_CPD_REQ transaction to one UPA port according to the following rules. The S_CPD_REQ request is sent to only one UPA port with a Dtag state of M or O. The S_CPD_REQ request cannot be sent to the requesting UPA port.

The System Controller waits for a P_SACK or P_SACKD reply from the UPA port to which the S_CPD_REQ was sent. This request cannot be NACK'ed with P_SNACK reply if the UPA port does not have the block, unless the NDP (No Dtag Present) bit is set in the S_REQ. A P_SNACK reply if NDP bit is not set is treated by the System Controller as a fatal error. After receiving the P_REPLY, the System Controller issues a S_CRAB reply to the sourcing UPA port to prompt the sourcing UPA port to drive the requested data block on the UPA data bus, and issues a S_RBS reply to the requesting master UPA port. The sourcing UPA port is required to copyback the addressed quad-word first, wrapping around on A[5:4] for successive quad-words.

Error handling for the CopybackToDiscard transaction is the same as for the Copyback transaction.

Non-Cached Data Transactions

Non-cached data transactions are transactions issued to non-cached address space. No snooping lookup operation is performed for these transactions, data from these transactions is not cached by the requester, and no address blocking is performed by the System Controller.

NonCachedRead (P_NCRD_REQ)

A non-cached read transaction request is generated by a UPA master port to read data in non-cached address space, including system registers and slave address space of other slave UPA ports. 1, 2, 4, 8, or 16 bytes are read with this transaction, and the byte location is specified with a bytemask. The address specified in the transaction request is aligned on 16-byte boundary.

Arbitrary bytemasks are not allowed for reads, and the slave should indicate an error (with P_RERR) if the read bytemask is not correct.

Main memory cannot be read with this transaction. The System Controller decodes the address in the request packet. If it is an address that falls in the address space managed by the System Controller, then the System Controller drives the data on the UPA data bus. If the address is for a UPA port's slave interface, then the System Controller forwards this transaction to the UPA port slave interface for sourcing the data and waits for a P_REPLY. When a P_RAS or P_RASB reply is received, the System Controller issues a S_SRS reply to the UPA port slave interface to drive the data on its UPA data bus. The System Controller prompts the requesting master UPA port to receive the requested data by sending it a S_RAS (Read Ack Single) reply.

The System Controller issues a S_ERR reply if the address in the S_NCRD_REQ request is for cacheable main memory space or an unimplemented address space, and does not forward the transaction to the UPA slave port. The System Controller asserts system reset if it detects a parity error in the request packet.

If the transaction is forwarded to a UPA port's slave interface, and if the UPA port's slave interface issues a P_RTO (timeout) or P_RERR (due to any type of bus error) reply, the System Controller issues a S_RTO or S_ERR reply, respectively, to the requesting UPA master port, and no data is transferred.

If an address packet parity error is detected by the UPA port slave interface, it asserts P_FERR, and the System Controller generates a system reset.

NonCachedBlockRead (P_NCBRD_REQ)

Non-cached block read requests are generated by a UPA master port for block reads of data in non-cached address space. 64 bytes of non-cached data is read by the master UPA port with this transaction.

This transaction is similar to the P_NCRD_REQ transaction, except that no bytemask is used. The requested data is aligned on 64-byte boundary (PA[5:4]=0×0). In addition, the System Controller prompts the delivery of the requested data to the requesting master UPA port with a S_RBU reply.

NonCachedWrite (P_NCWR_REQ)

Non-cached write transaction requests are generated by a UPA master port to write data in non-cached address space. The address specified by the request is aligned on 16-byte boundary. An arbitrary number of bytes, from zero to 16, can be written as specified by a 16-bit bytemask to slave devices that support writes with arbitrary byte masks (mainly graphics devices). A bytemask of all zeros indicates a no-op to the target slave interface.

Main memory cannot be written with this transaction. The System Controller issues a S_WAS reply to the requesting master UPA port to prompt it to drive the data to be written onto the UPA data bus. When the requesting master UPA port sees the S_REPLY from the System Controller, it considers the transaction completed and decrements its count of outstanding requests to the System Controller.

The System Controller stores the data provided by the requesting master UPA port if the destination address is in the address space managed by the System Controller. If the destination address is to a slave UPA port, then the System Controller forwards this transaction to the slave UPA port. The System Controller issues a S_SWS reply to the UPA port slave interface to prompt it to receive the data from the UPA data bus and forwards this P_NCWR_REQ request to it on the UPA address bus. The System Controller considers this transaction completed at this point, even though the UPA port slave interface still owes an acknowledgment P_REPLY to the System Controller. When the P_WAS reply is received (eventually) from the UPA port slave interface, the System Controller decrements its count (in the PReqCnt counter in the SC Config register) of outstanding requests in this slave UPA port's input request and data queues.

Note that the write request and the data may be forwarded in any order to the UPA port slave interface by the System Controller, as the address and data paths are independent.

Writes that fail, fail silently and only get reported asynchronously. For instance, the P_NCWR_REQ transaction is dropped by the System Controller if the address is in the cacheable main memory address space. It is dropped by the UPA port slave interface on any type of bus error or timeout error. If the System Controller drops the transaction due to an error, it may log the error. If the UPA slave port drops it, it may log the error and report it via an interrupt.

If an address packet parity error is detected by the slave, it asserts the P_FERR reply, which causes the System Controller to generate a system reset.

NonCachedBlockWrite (P_NCBWR_REQ)

Non-cached block write requests are generated by a UPA master port for block writes to non-cached address space. 64 bytes of non-cached data is written by the master UPA port with this transaction. This transaction is similar to the P_NCWR_REQ transaction except that no bytemask is used. The data to be written is aligned on a 64-byte boundary (PA[5:4]=0×0). The System Controller prompts the requesting master UPA port to source the data block to be Written with a S_WAB reply.

Non-Cached Control Transaction

This is unlike a data transaction in that the 64-byte datum does not have any address space associated with it. No snooping is performed and the datum is not cached by the requestor. The only non-cached control transaction in the preferred embodiment is the interrupt transaction.

Interrupt (P_INT_REQ)

Interrupt transaction request packets are generated by an interrupter master UPA port for delivering packetized interrupts consisting of a 64-byte block of data to a destination UPA port interrupt handler interface. The interrupt transaction is used for sending interrupts from I/O devices, asynchronus event and error reporting, and for posting software cross-calls to interrupt handler UPA ports. An interrupt transaction cannot be sent by a UPA port to itself.

The interrupt transaction packet does not contain a physical address. Instead, it carries an Interrupt Target ID, which is the same as the port ID (also called the MID) of the destination interrupt handler UPA port. The System Controller routes the interrupt packet to the UPA port specified by the target ID.

The following rules apply to the master interface of the interrupter UPA port. If the interrupt transaction can be delivered to the slave interface of the specified UPA port, the System Controller issues a S_WAB reply to the initiating UPA port to prompt it to drive the interrupt data on the UPA data bus. If the interrupt transaction cannot be delivered due to flow control restrictions (i.e., the interrupt input request queue of the target UPA port is full), the System Controller issues a S_INAK reply to the initiating UPA port to NACK the interrupt transaction. The UPA port must retry sending the interrupt transaction after some backoff period. During the backoff period, the interrupt transaction does not block any other transaction behind it in the master UPA port's class queues.

The following rules apply at the slave interface of the destination interrupt handler UPA port. The System Controller forwards the P_INT_REQ transaction to the specified slave UPA port on the UPA address bus and issues it a S_SWIB reply to prompt it to accept the interrupt data from the UPA data bus.

After the interrupt handler has removed the interrupt packet from the input queue, the slave UPA port responds with a P_IAK reply to the System Controller. The System Controller uses this P_REPLY to decrement its count (PIntCnt in the SC Config register 190) of outstanding interrupt requests to this slave UPA port for flow control.

If a slave UPA port that is not an interrupt handler as specified by its port-ID register receives the P_INT_REQ, it is required to accept it with the P_IAK reply and to discard the interrupt request and its data silently. The slave port is not required to log this misdirected transaction error.

A misdirected interrupt packet due to a programming error, i.e., directed to a non-interrupt handler UPA port, fails silently. The System Controller issues the S_WAB reply to the master UPA port to get the data, but discards it. The System Controller may log the misdirected interrupt.

If a P_INT_REQ transaction request is received by a non-interrupt handler UPA port, this can only occur due to some fatal hardware fault in the System Controller, or due to mis-configuration of the configuration register in the System Controller. The UPA port may ignore the transaction and not issue any P_REPLY.

P_REPLY messages

Figure 10D:
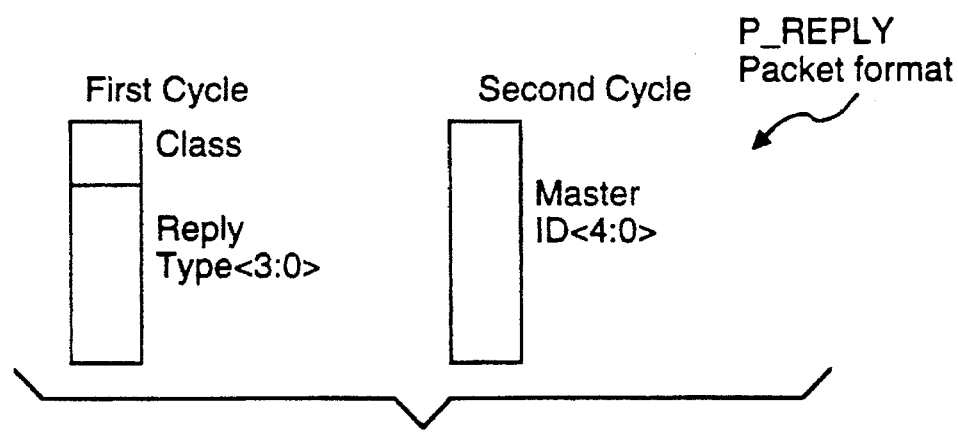

FIG. 10D shows the packet format for P_REPLY messages. Table 7 defines each of the P_REPLY messages used in the preferred embodiment, including the type value for each reply message, the number of clock cycles required to transmit the reply message, the name of the reply message, what transactions the reply message is used with, and the status of the UPA port when the reply message is sent.

The following rules apply to P_REPLY generation. P_REPLY messages are generated only by the slave interface of a UPA port. For slave read transactions, P_REPLY messages can be pipelined to the System Controller without waiting for an S_REPLY. The System Controller will issue the S_REPLY in the same order that it received the P_REPLY.

Each slave interface orders its P_REPLY messages with respect to the MID (i.e., the master ID) of the slave P_REQ transactions that it received. In other words, all P_REPLY messages with the same MID (i.e., the port ID of the requesting UPA port) are strictly ordered in the same order that the corresponding requests were received, but there is no ordering constraint for P_REPLY messages with different MIDs.

All P_REPLY acknowledgments for read requests, except P_RASB, contain the MID from the slave request to which the P_REPLY is responding. As shown in FIG. 10D the Master ID (MID) for the associated transaction is transmitted in the second cycle of the reply message. FIGS. 10A, 10B and 10C show the packet form of the various types of transaction requests, each of which includes a MID (Master ID) field in the second cycle of the transaction request packet format. The MID value in each reply message is copied from the MID value in a corresponding transaction request message.

The P_RASB reply message is a special optimization and does not contain the Master ID for the associated transaction. The P_RASB reply message is used by a UPA slave port (such as graphics) that only supports one outstanding slave read. The System Controller maintains the size, MID, and class information for each request transmitted to such UPA slave ports. When the P_RASB reply message is received, the System Controller knows whether it is read single or read block acknowledge due to the information it previously stored about the transaction, and appropriately asserts the respective S_SRB or S_SRS reply message to prompt the UPA slave port to output the requested data.

Generation of a P_REPLY message by a UPA port's slave interface may take an arbitrary amount of time. The timeout period is determined by the UPA port's slave interface, and not the master UPA port making the request.

The P_SACK, P_SACKD, P_SNACK reply messages are acknowledgments for all S_REQ transaction requests sent to a UPA slave port. P_SACK and P_SACKD are treated identically by the System Controller except for the following case. If the P_SACKD reply message is in response to a S_INV_REQ or S_CPI_REQ transaction request, the System Controller is required to remember this response in a system without Dtags, and must cancel the very next writeback transaction (P_WRB_REQ) that it sees from the same UPA Port.

TABLE 7

R_REPLY Definitions

| P_REPLY (Type value) (#cycles) | Definitions |
| --- | --- |
| P_IDLE (0000) (single) | Idle. This is the default state of the wires when a UPA module exists in a UPA slot and there is no reply to be given. |
| P_RTO (1111) two | Read Time-out. This reply is sent when the slave non-cached read request (P_NCRD_REQ or P_NCBRD_REQ) that was sent to this UPA slave port has timed out. No data is transferred. This is also the default state of the wires on an empty UPA slot (no module). |
| P_RERR (0101) (two) | Read Error. This reply is sent when there is a bus error (data error) on a non-cached read request (P_NCRD_REQ or P_NCBRD_REQ) that was sent to it. No data is transferred. |
| P_FERR | Fatal Error. This P_REPLY causes the System Controller to |

TABLE 7-continued

R_REPLY Definitions

| P_REPLY (Type value) (#cycles) | Definitions |
|---|---|
| (0100) (single) | generate a system wide hard reset. This P_REPLY is mandatory when the addressed UPA slave detects a parity error on the UPA address bus for any transaction request. This P_REPLY can be asserted by the UPA slave interface at any time (and not just in response to a transaction request). |
| P_RAS (1000) (two) | Read Ack Single. When the slave interface of a UPA port generates this reply message, there are 16 bytes of read Data ready in its output data queue for the P_NCRD_REQ request that was sent to it, and there is room in its input request queue for another slave P_REQ transaction request. |
| P_RAB (1001) (two) | Read Ack Block. When the slave interface of a UPA port generates this reply message, there are 64 bytes of read data ready in its output data queue for the P_NCBRD_REQ request sent to it, and there is room in its input request queue for another slave P_REQ for data. |
| P_RASB (0011) (single) | Read Ack single and Block. When the slave interface of a UPA port generates this reply message, there are 16 or 64 bytes of data ready in its output data queue for the P_NCRD_REQ or P_NCBRD_REQ transaction request sent to it, and there is room in its input request queue for another slave P_REQ for data. The System Controller knows how much data is in the slave interface' request that it sent to this slave UPA port. This reply message is applicable only if the ONEREAD bit in the port-ID register associated with the slave interface's UPA port is set. |
| P_WAS (0010) (single) | Write Ack Single. This reply is generated in response to P_NCWR_REQ requests for single writes forwarded to the UPA port by the System Controller. When the slave interface of a UPA port generates this reply message, the UPA slave port acknowledged that the 16 bytes of data placed in its input data queue by System Controller has been absorbed, that there is room for writing another 16 bytes of data into the input data queue, and that there is room in its input request queue for another slave P_REQ for data. |
| P_WAB (0001) (single) | Write Ack Block. This reply message is generated in response to a non-cached block write (P_NCBWR_REQ) transaction request forwarded to the UPA port by the System Controller. When the slave interface of a UPA port generates this reply message, there UPA slave interface acknowledges that the 64 bytes of data placed in its input data queue by System Controller has been absorbed, that there is room for writing another 64 bytes of data into the input data queue, and that there is room in its input request queue for another slave P_REQ for data. |
| P_IAK (1100) (two) | Interrupt Acknowledge. Reply to a P_INT_REQ. When this reply is generated, the UPA slave port acknowledges that the interrupt transaction delivered to it by the System Controller has been serviced, and that there is room in its input request and data queues for another interrupt request and its 64 bytes of data. |
| P_SACK (1010) (two) | Coherent Read Ack Block. This P_REPLY is asserted for any System Controller request (S_CPB_REQ, S_CPI_REQ, S_CPD_REQ, or S_INV_REQ) when the addressed datum is in the cache and is not pending a writeback due to victimization. If the S_REQ is for copyback, this P_REPLY indicates that 64 bytes of data is ready In the slave interface's output data queue. In all cases, this reply message indicates that there is room in the replying UPA port's input request queue for another S_REQ transaction from the System Controller. |
| P_SACKD (1101) (two) | Coherent Read Ack Block Dirty Victim. This P_REPLY is asserted for any System Controller transaction request (S_CPB_REQ, S_CPI_REQ, S_CPD_REQ, or S_INV_REQ) when the datum has been victimized and is pending a writeback in the writeback buffer. If the S_REQ is for copyback, this P_REPLY also Indicates that 64 bytes of data are ready in the slave interface's output data queue, and that there is room in its input request queue for another S_REQ transaction from the System Controller. If the S_REQ is a S_INV_REQ or S_CPI_REQ transaction request, the System Controller will cancel the subsequent writeback transaction for the dirty victim when it is issued from this UPA port. |
| P_SNACK (0111) (two) | Non Existent Block. No data is transferred. This reply is sent in response to a S_REQ when the addressed data block does not exist in the cache. By generating this reply message, the UPA salve interface also acknowledges that there is room in the input request queue for another S_REQ transaction from System Controller. If the NDP bit is not set in the corresponding S_REQ |

TABLE 7-continued

R_REPLY Definitions

P_REPLY
(Type value)
(#cycles)   Definitions transaction request, this reply is considered illegal for copyback
transactions (S_CPB_REQ, S_CPI_REQ, and S_CPD_REQ) and
the System Controller treats it as a fatal error. This P_REPLY is
always legal for S_INV_REQ requests regardless of the NDP bit.

S_REPLY messages

Figure 10E:
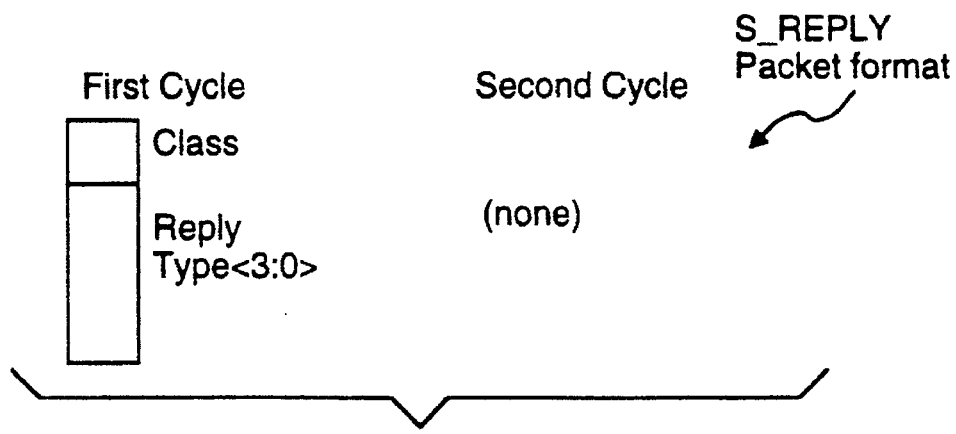

FIG. 10E shows the packet format for S_REPLY messages. Table 8 defines each of the S_REPLY messages used in the preferred embodiment, including the type value for each reply message, the number of clock cycles required to transmit the reply message, the name of the reply message, what transactions the reply message is used with, and the status of the UPA port when the reply message is sent.

The following rules apply to S_REPLY generation. The S_REPLY packet is a 5-bit message that is transmitted in a single interconnect clock cycle. It does not contain the Master ID of the transaction to which it is responding, since all S_REPLY messages are responses to transaction requests generated by the System Controller. The S_REPLY packet does contain the class bit for S_REPLY to master UPA ports so that the UPA master can determine which class the S_REPLY is for.

There is no requirement regarding the ordering of S_REPLY messages for transaction requests in different mater classes. Within each class, for each MID, all S_REPLY messages must be transmitted in the same order as the corresponding transactions were received.

There is a separate S_REPLY message for each of the two slave data receive queues, and for writing different sized data to the respective queues. The S_SWB reply tells the System Controller to write 64 bytes and the S_SWS reply tells the System Controller to write 16 bytes to the P_REQ data receive queue 169 of the slave, while the S_SWIB reply tells the System Controller to write 64 bytes to the interrupt data receive queue 172 20 (see FIG. 4) of an interrupt handler slave port 152.

TABLE 8

S_REPLY Definitions

| S_REPLY (Type value) | Definition |
| --- | --- |
| P_IDLE (0000) (single) | Idle. This is the default state of the wires and indicates no reply. |
| S_RTO (1011) | Read Time-out. With this reply the System Controller forwards an P_RTO repty from a UPA port's slave interface to the requesting master UPA port for P_NCRD_REQ and P_NCBRD_REQ transactions. Timed out write transactions are reported asynchronously via interrupt messages. |
| S_ERR (0001) | Error. No data is transferred. This reply is sent by the System Controller to a master UPA port when:<br>• Forwarding a P_RERR reply from a UPA port slave interface to the requesting master UPA port.<br>• Coherent read access to a UPA port's non-cached address space is attempted.<br>• Non-cached read access to cacheable address space is attempted.<br>• Other bus errors occur, such as accesses to unimplemented memory and unimplemented address spaces. |
| S_WAS (0100) | Write Ack Single to master UPA port. By sending this reply message, the System Controller commands the output data queue of the master UPA to drive 16 bytes of data on the UPA data bus in response to P_NCWR_REQ request from it |
| S_WAB (0101) | Write Ack Block to master UPA port. By sending this reply message, the System Controller commands the output data queue of the requesting master UPA to drive 64 bytes of data on the UPA data bus. This reply message is generated by the System Controller in response to P_NCBWR_REQ, P_WRB_REQ, P_WRI_REQ or P_INT_REQ request from a requesting master UPA port. |
| S_OAK (0110) | Ownership Ack Block to master UPA port. No data is transferred. This reply message is generated by the System Controller in response to a P_RDO_REQ request from the requesting UPA master port when its cache already has the data and only needs write permission. |
| S_RBU (1000) | Read Block Unshared Ack to master UPA port. The System Controller commands the input data queue of the requesting master UPA port to receive 64 bytes of unshared or non-cached data on |

TABLE 8-continued

S_REPLY Definitions

| S_REPLY (Type value) | Definition |
|---|---|
| | the UPA data bus in response to P_RDS_REQ | P_RDO_REQ | P_NCBRD_REQ request from it. |
| S_RBS (1001) | Read Block Shared Ack to master UPA port. By sending this reply message, the System Controller commands the input data queue of the requesting master UPA port to receive 64 bytes of shared data on the UPA data bus in response to a P_RDS_REQ, P_RDSA_REQ or P_RDD_REQ request sent by the requesting master UPA port. |
| S_RAS (1010) | Read Ack Single to master UPA port. By sending this reply message, the System Controller commands the input data queue of the requesting master UPA port to receive 16 bytes of data on the UPA data bus. This reply message is sent in response to a P_NCRD_REQ request from the requesting master UPA port. |
| S_SRS (1110) | Read single Ack to slave UPA port. By sending this reply message, the System Controller commands the output data queue of the UPA port's slave interface to drive 16 bytes of slave read data on the UPA data bus. This reply message is sent in response to a P_RAS reply message from the UPA port's slave interface. |
| S_SRB (1111) | Read Block Ack to slave UPA port. By sending this reply message, the System Controller commands the output data queue of the UPA port's slave interface to drive 64 bytes of slave read data on the UPA data bus. This reply message is sent by the System Controller in response to a P_RAB reply message from the UPA port's slave interface. This reply message represents the conclusion of the slave read P_REQ -> P_RAB -> SRB sequence. |
| S_CRAB (0010) | Copyback Read Block Ack to slave UPA port. By sending this reply message, the System Controller commands the output data queue of a UPA port's slave interface to drive 64 bytes of copyback read data on the UPA data bus. This reply message is sent by the System Controller in response to a P_SACK or P_SACKD reply from that UPA port. This reply message represents the conclusion of the P_RD*_REQ -> S_CPB_REQ/S_CPI_REQ/S_CPD_REQ P_SACK/P_SACKD -> S_CRAB sequence for copyback of a cache block. |
| S_SWS (1100) | Write Single Acknowledge to slave UPA port. By sending this reply message, the System Controller commands the input data queue of the slave UPA to accept 16 bytes of data from the UPA data bus. in parallel, the System Controller forwards the P_NCWR_REQ request corresponding to this data block to the input request queue of the slave UPA port on the UPA address bus. |
| S_SWB (1101) | Write Block Ack to slave UPA port. By sending this reply message, the System Controller commands the input data queue of the slave interface of a UPA port to accept 64 bytes of data from the UPA data bus. In parallel, the System Controller forwards the P_NCBWR_REQ or P_WRI_REQ request corresponding to this data block to the input request queue in the slave interface of the UPA port on the UPA address bus. |
| S_SWIB (1101) | Interrupt Write Block Ack to slave UPA port. By sending this reply message, the System Controller commands the input interrupt data queue of a UPA port's slave interface to accept 64 bytes of interrupt data from the UPA data bus. In parallel, the System Controller forwards the P_INT_REQ request corresponding to this block to the input interrupt request queue of the slave UPA port on the UPA address bus. |
| S_INAK (0111) | Interrupt NACK. No Data is transferred. This S_REPLY is generated by the System Controller (instead of S_WAB) to NACK the P_INT_REQ transaction to the master UPA port when the interrupt target UPA port cannot accept another interrupt packet due to flow control. By sending this reply message, the System Controller commands the UPA port to remove the interrupt packet from its outgoing master class queue and, to retry some time later. This is the only transaction that is NACK'ed by the System Controller. |
| S_WBCAN (0011) | Writeback cancel ack to master UPA port. This reply message is generated by the System Controller to a master UPA port which has previously sent it a P_WRB_REQ writeback request that needs to be cancelled. No data is transferred. |

Detailed Description of Cache Coherence Protocols

Figure 11:
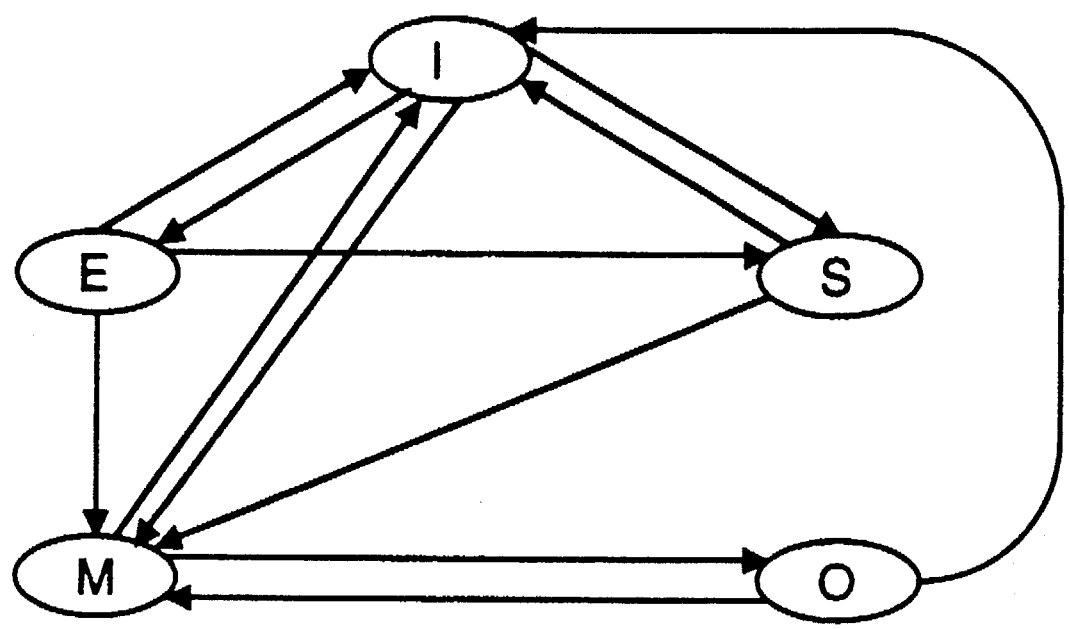
FIG. 11 is a state transition diagram of the cache tag line states for each cache entry in an Etag array in a preferred embodiment of the present invention.

The state transition diagram in FIG. 11 shows the legal transitions for the Etag MOESI cache states for a Data block. Note that these are not necessarily the transitions seen by a cache line at index [i], but rather these are the transitions for a data block which is moving to/from a cache line. The Invalid state in this context means that the block is not present in this cache (but may well be present in another cache).

Figure 12:
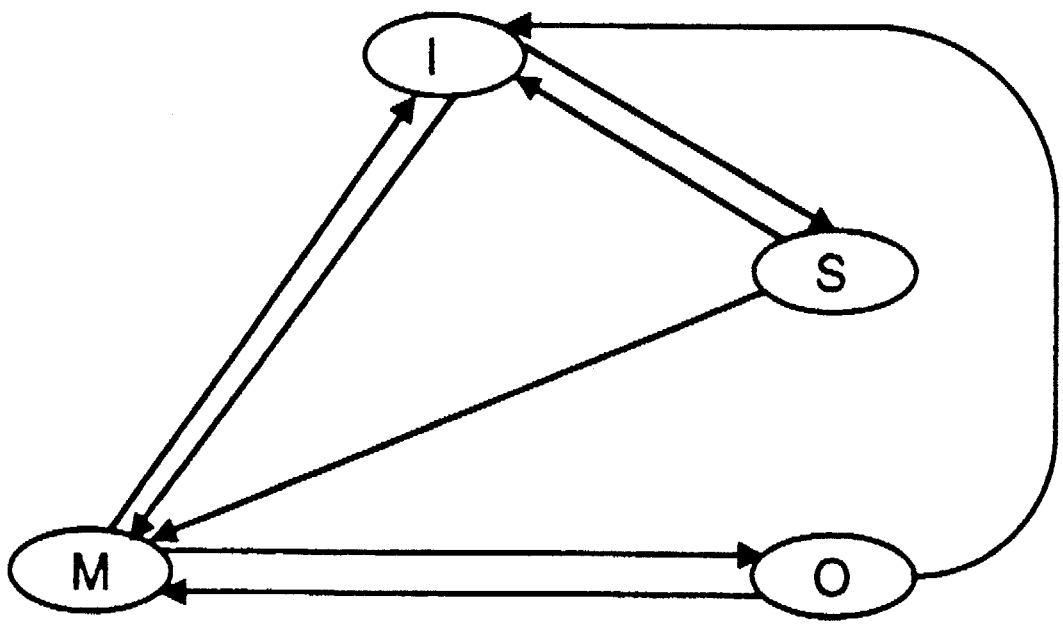
FIG. 12 is a state transition diagram of the cache tag line states for each cache entry in an Dtag array in a preferred embodiment of the present invention.

The state transition diagram in FIG. 12 shows the legal transitions for the Dtag MOSI cache states for a Data block. The state transition table in Table 9 specifies all the legal state transitions for a data block, and the conditions under which the transitions occur. These transitions are as viewed by the initiating processor for a block of data moving to/from its cache, both due to its own coherent activity as well as coherent activities of other UPA ports that affect it. Table 9 also specifies the various transaction request types and the S_REPLY and P_REPLY types which cause these state transitions to occur at a caching master UPA port.

Note that only one cache at a time can have a particular data block in the Dtag M state, and while one cache has the data block in the Dtag M state no other cache may have a copy of that datum.

Only one cache at a time can have a particular data block in the Dtag O state, and any other cache having that data block must have it in the Dtag S state only.

If all the cache memories that store a particular data block have the data block stored in cache lines in the Dtag S state, the datum is always sourced from the addressed location in main memory instead of from another cache for ReadToShare and ReadToDiscard requests.

For ReadToOwn transaction when a data transfer is needed, the requested data block is always sourced from a cache that has the data block in the M, O or S state. If no cache currently stores the data block, only then it is sourced from the addressed location in main memory.

With a P_WRB_REQ transaction, a cache line is written to the destination address only if its Dtag line state is M or O. The writeback is cancelled if its Dtag state is I. More specifically, the only time a P_WRB_REQ transaction is cancelled is when a P_RDO_REQ (S_CPI_REQ to this port) or P_WRI_REQ (S_INV_REQ to this Port) request from any other UPA port causes the invalidation of the writeback buffer in this UPA port.

With a P_WRI_REQ transaction, a data block is written regardless of its Dtag state.

Note that the transaction set specified above is also capable of supporting several subsets of cache states shown in FIG. 11. However such modes of operation are not used in the preferred embodiments.

Writeback Transactions

A Dirty_Victim_Pending (DVP) bit is defined in the transaction request packet. See FIG. 10A and the above discussion regarding the defined set of transactions in the preferred embodiment. A caching UPA master sets this bit in the coherent read transaction for the missed data if the miss has victimized a dirty line needing writeback. The System Controller uses the DVP bit for managing the update of the Dtag state for the missed block.

In particular, the writeback transaction is always paired one to one with a read transaction (with the DVP bit set). Pairing means that both the writeback and the read must be for the same cache line. The two transactions however may be issued from any master class in any order.

There can be at most one outstanding dirty victim writeback transaction per UPA port, since only one writeback buffer 280 and one Dtag TB 282 are provided for each cache memory 132 (as shown in FIG. 9). As a result, a caching UPA master can have only one outstanding coherent read transaction with the DVP bit set. The UPA master port must not issue a subsequent read transaction with the DVP bit set, until the first read and the writeback have both completed, i.e., the S_REPLY for both must be received before another transaction with the DVP bit set can be generated by the UPA master port. However, the UPA master can issue a subsequent read transaction with the DVP bit not set while there is a previous writeback pending.

The restriction on outstanding transactions with the DVP bit set is not required if the UPA port implements only a single master request class. Due to the strong ordering property within a master class, transactions can be pipelined regardless of the DVP bit and without waiting for an S_REPLY from the previous transaction.

A caching UPA master must block (i.e., not issue) a subsequent coherent transaction for its own dirty victimized block which is pending a writeback, until the writeback transaction completes. The earliest the UPA port can issue a coherent request for the previously victimized block, is after it receives the acknowledgment S_REPLY for it's writeback transaction. It can make the request in the very next clock cycle after the S_REPLY. This blocking requirement is not necessary if both the writeback transaction for the dirty datum and the coherent read transaction for the missed datum are put in the same master request class, and the subsequent transaction to get the victim back is put behind the first two (i.e., after the writeback transaction and the read transaction that displaced the victim data block from the cache). The strong ordering property within a master request class takes care of this blocking constraint automatically.

A caching UPA master must also block a subsequent coherent transaction for a clean victim data block (i.e., displaced from the cache without being written back to main memory) until the transaction that displaced the victim data block completes. However, if the request that caused the clean victim displacement, and the subsequent one that brings the victim back into the cache, are put in the same master request class, then it is not necessary for the UPA port to block the second request until the first one completes. If the two requests can be issued from different request classes (which is the case in the preferred embodiment), then this blocking requirement must be enforced by the data processor.

A caching master UPA port must prevent a subsequent load or store to a victimized data block from its own processor. This applies both to clean victims as well as dirty victims pending writeback. The caching UPA master must keep the victimized datum in the coherence domain for a possible S_REQ from the System Controller, until either the S_REPLY for the cache fill, in case of a clean victim, or the S_REPLY for the writeback, in case of a dirty victim, is received by it. In other words, the caching UPA master port must be able to source the displaced victim data block to the interconnect if the System Controller so requests until such time that the System Controller sends it a S_REPLY releasing the caching UPA master port from this obligation.

A UPA port does not cancel its writeback transaction for a dirty victim block upon receiving an invalidation S_REQ from the System Controller (S_INV_REQ, S_CPI_REQ). The System Controller cancels the writeback instead. The System Controller is required to maintain the state that the writeback is pending cancellation either in the Dtags or using other logic in systems without Dtags, and must not allow the writeback to be written to its addressed location. The System Controller can cancel the writeback either by issuing a S_WBCAN request, in which case no data is transferred from the UPA port, or accept the data from the UPA port by issuing S_WAB reply and then discarding the data.

Making Transaction Requests Active

Figure 13:
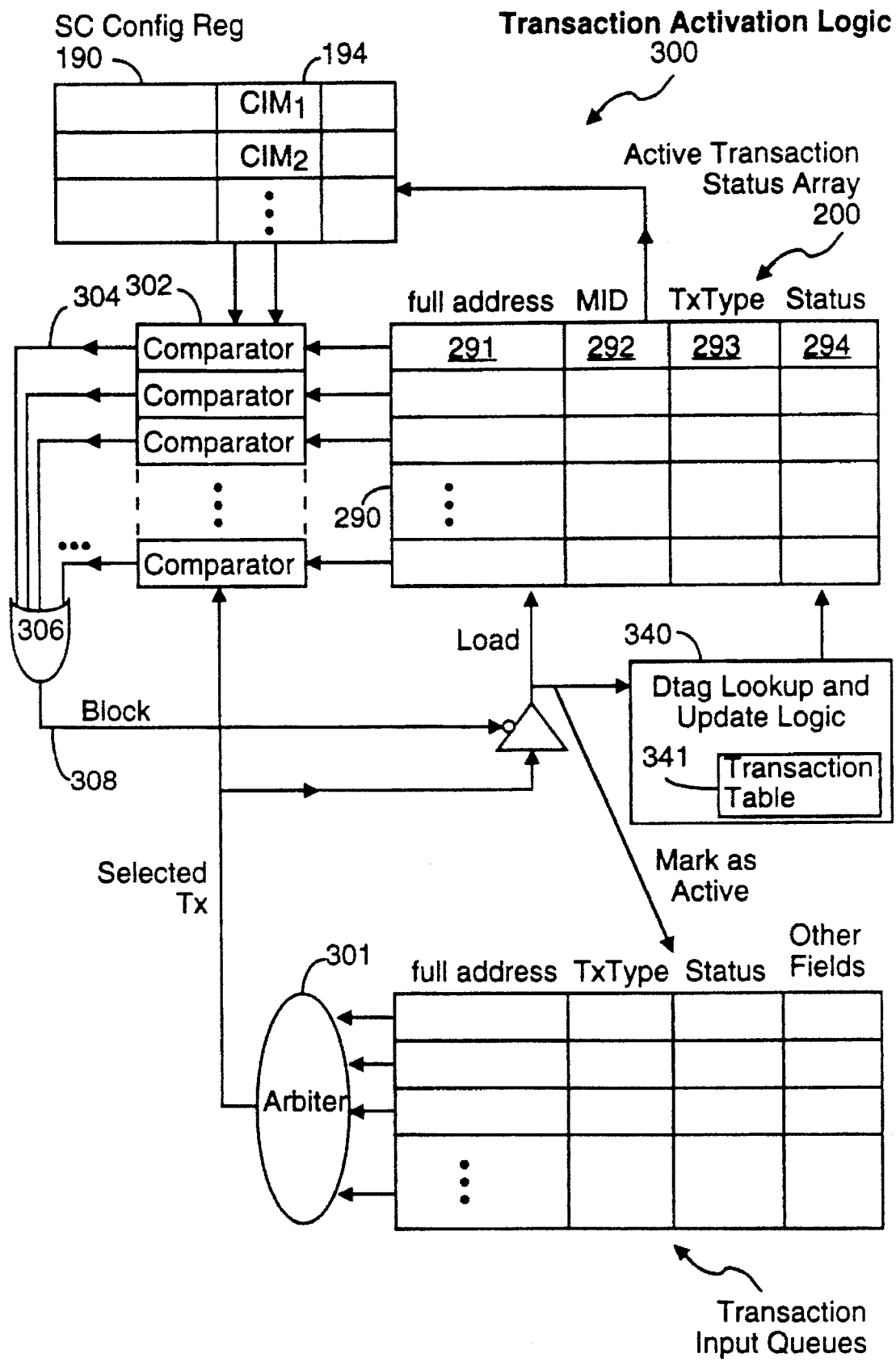
FIG. 13 depicts the logic circuitry for activating transactions.

Referring to FIGS. 5 and 13, the System Controller 110 maintains a pending transaction status array 200 that stores information on all pending and Active transactions. Some of the cache utilization optimizations of the present invention depend on the System Controller being able to enforce strict ordering of transactions on a given address. The transaction status array 200 is one tool used by the System Controller to maintain proper ordering of transactions.

The transaction status array 200 includes a row 290 for each active transaction, including transactions in the "snoop pipeline" (i.e., which are undergoing Dtag lookup and update) and other Active transactions that have not yet completed. In a typical implementation of two data processor system using the present invention, having a two stage snoop pipeline, the transaction status array would typically have six rows 290, including two rows for transactions in the snoop pipeline and two for each data processor. More generally, the transaction status array 200 will typically include at least one row per data processor for each master class and one row for each stage of the snoop pipeline. Thus, a system with four data processors, two master request classes, and a two stage snoop pipeline would have at least ten rows in its transaction status table 200. However, it should be noted that transactions are dynamically assigned to unused status array rows 290 and that none of the individual rows 290 are permanently assigned to a particular processor or task.

In one preferred embodiment, each row 290 of the transaction status table 200 includes the full address 291 of the data block associated with a transaction, the master (port) ID 292 of the requesting UPA port, the 5-bit transaction type 293 (including the 1-bit master request class, if any, and the 4-bit transaction identifier), and a vector of status bits 294. The address field 291 need not store the full address if there is an established minimum cache memory size for all data processors in the system. For instance, if the minimum established cache memory size is 512K bytes, a cache that size will have 8192 cache lines (each of which stores a 64 byte data block), the cache index for the minimum size cache memory will be 13 bits, and thus the address field 291 of each status row can be used to store physical address bits PA[18:6] of the addressed data block for each active transaction.

There are two operations performed by the System Controller on the snoopbus: 1) lookup and 2) update. The System Controller exclusively performs both operations. The Dtags of all the caching UPA master ports are looked up simultaneously for present state, and updated simultaneously with the next state.

The lookup operation determines where data will be sourced from for a coherent read transaction (i.e., from main memory or from a UPA port). In conjunction with the DVP bit from a previous coherent read transaction, it determines whether or not to cancel this writeback transaction.

The Dtag lookup operation determines which UPA ports to send invalidation requests and which to send copyback-invalidation requests for a ReadToOwn or Write-Invalidate transaction. In particular, for either of these transactions, the Dtag lookup operation determines all the caching UPA masters which currently store the data block being addressed by the transaction. In the case of a Write-Invalidate transaction, all those caching UPA masters that currently store the addressed data block are sent invalidation requests by the System Controller. In the case of the ReadToOwn transaction, all but one of the caching UPA masters that currently store the addressed data block (if any) are sent invalidation requests by the System Controller, and one is sent a copyback-invalidate request (S_CPI_REQ).

The Dtag update operation is applied by the System Controller only to 1) the UPA port that initiated the transaction for which the update is being performed, and 2) the UPA ports to which an S_REQ transaction (copyback/ invalidate) was sent by the System Controller. Table 9 lists all the defined Dtag updates in the preferred embodiment.

TABLE 9

| | | Cache State Transitions for a Data Block at a UPA Port | | |
|---|---|---|---|---|
| Etag State Trnstn | Dtag State Trnstn | Condition | Tx Request at UPA Port | Reply at UPA Port |
| 1→E | 1→M | Load miss on read of data block, and no other cache has it. System Controller supplied the data block from memory and informs the UPA port that data block is unshared. | P_RDS_REQ | S_RBU |
| 1→S | 1→S | Load miss on read of data block, and some other cache has it. The System Controller will source the data block from the other cache whose DTAG is in the M or O state. Otherwise, System Controller will source the data block from main memory, System Controller informs the UPA port that the data block is shared. | P_RDS_REQ | S_RBS |
| | | Instruction misses also cause this transition, even when no other cache has the data block. The coherent transaction used for this miss indicates to the System | P_RDSA_REQ | R_RBS |

TABLE 9-continued

Cache State Transitions for a Data Block at a UPA Port

| Etag State Trnstn | Dtag State Trnstn | Condition | Tx Request at UPA Port | Reply at UPA Port |
|---|---|---|---|---|
| | | Controller to set the DTAG state to S instead of M. | | |
| I→M | I→M | Store miss. If any other caches store the same data block, System Controller sources the data block from another cache whose Dtag Is in the M, O or S state and invalidates all cached copies of the data block. The S_REPLY to the requester is held off until all invalidation acknowledgements are received by System Controller. If no cache has the data block, then System Controller sources it from the main memory. In all cases, System Controller informs the requestor that the data is unshared. | P_RDO_REQ | S_RBU |
| E→M | M | Store hit on an Exclusive Clean data block, i.e. private data. No state change in Dtag. No interconnect transaction is generated. | No transaction | No transaction |
| E→S | M→O | Another processor had a load miss on this Exclusive Clean data block. The System Controller will source the block from this cache. Since the data block is clean, the Etags will transition to Shared Clean. But since Dtags do not know that the block is clean, it will transition to Shared Modified. The Etag and Dtag get out of sync at this point. | S_CPB_REQ | P_SACK or P_SACK followed by S_CRAB |
| E→I | M→I | This processor victimized a clean data block. The block is simply evicted from the cache after the S_REPLY for the missed block is received. No additional interconnect transaction is generated for the victimized block. The Dtag state for the new data block that caused this eviction automatically overwrites the old Dtag state. | P_RDS_REQ or P_RDSA_REQ or R_RDO_REQ | S_RBU or S_RBS S_RBS R_RBU |
| | | This transition also occurs when another processor has a store miss on this data block. The System Controller sources the data block from this cache instead of from memory (even though the block is clean but System Controller does not see the E state). The Etag is updated to I by this UPA port before issuing the P_REPLY to the System Controller. The Dtag is updated to I by System Controller before issuing the S_REPLY to the requesting UPA. | S_CPI_REQ | P_SACK or P_SACK followed by S_CRAB |
| | | This transition also occurs when either this processor or any other processor does a block store to this data block. System Controller sends an invalidate to everyone caching is line, including this UPA port. | P_WRI_REQ S_INV_REQ | S_WAB P_SACK or P_SACKD |
| S→M | S→M | Store hit to a Shared Clean datap block. System Controller invalidates all other caches which have this data block including any cache that might be the owner. The S_REPLY is not issued by System Controller to the requestor UPA until all the other UPA ports acknowledge the invalidation from System Controller with their P_REPLY. | P_RDO_REQ | S_OAK |
| | O→M | This alternate transition can occur | | |

TABLE 9-continued

Cache State Transitions for a Data Block at a UPA Port

| Etag State Trnstn | Dtag State Trnstn | Condition | Tx Request at UPA Port | Reply at UPA Port |
|---|---|---|---|---|
| | | in the Dtags due to the fact that it is possible for Dtag to get out of sync with Etags. | | |
| S→I | S→I | This processor victimized this Shared clean data block. The block is evicted from the cache after the S_REPLY for the missed block is received. | P_RDS_REQ or P_RDSA_REQ or R_RDO_REQ | S_RBU or S_RBS S_RBS R_RBU |
| | | This transition also occurs when another processor wants to write this Shared data block. System Controller sends an Invalidation request to this cache. | S_INV_REQ | P_SACK or P_SACKD |
| | | This transition also occurs when either this processor or any other processor does a block store to this data block. System Controller sends an invalidate to everyone including this UPA port. | P_WRI_REQ S_INV_REQ | S_WAB P_SACK or P_SACKD |
| | O→I | This alternate transition can also occur in the Dtags due to the fact that Dtags can get out of sync with the Etags. If this transition occurs due to another processor having a store miss, System Controller may source the data block from this cache. | S_CPI_REQ | P_SACK or P_SACKD followed by S_CRAB |
| M→O | M→O | Another processor had a load miss for this data block. System Controller sources the data from this cache. | S_CPB_REQ | P_SACK or P_SACKD followed by S_CRAB |
| M→I | M→I | This transition occurs when this processor victimizes this dirty data block. The dirty victim is put in a writeback buffer and written to memory with the writeback transaction. The UPA port is required to keep the victim within the coherence domain until it receives the S_REPLY for the writeback. | P_WRB_REQ | S_WAB |
| | | This transition also occurs when another UPA port has a store miss for this data block. System Controller will send a CPI request for the data block to this UPA port. This UPA port will copyback the data block and invalidate Its Etag. If the CPI request comes while the data block is victimized pending a writeback, this UPA port will not cancel the outstanding writeback. The System Controller will cancel the writeback later with an S_REPLY. | S_CPI_REQ | P_SACK or P_SACKD followed by S_CRAB and later followed by S_WFCAN instead of S_WAB if the data block was victimized. |
| | | This transition also occurs when either this UPA port or any other UPA port does a block store to this data block. System Controller sends an invalidate to all ports including this UPA port. And if a writeback outstanding in another UPA | P_WRI_REQ S_INV_REQ | S_WAB P_SACK or P_SACKD followed by S_WBCAN if the data |
| O→I | O→I | Another processor wants to write this data block. If the other processor has a store hit, then the System Controller invalidates this data block. If the other processor has a store miss, then the System Controller also sources it. The other conditions of M→I transition also apply here | S_INV_REQ S_CPI_REQ | P_SACK or P_SACKD P_SACK or P_SACKD followed by S_CRAB |

TABLE 9-continued

Cache State Transitions for a Data Block at a UPA Port

| Etag State Trnstn | Dtag State Trnstn | Condition | Tx Request at UPA Port | Reply at UPA Port |
|---|---|---|---|---|
| O→M | O→M | Store hit to a Shared Modified data block. System Controller invalidates all other caches which have this data block. | P_RDO_REQ | S_OAK |

The System Controller manages the Snoopbus as a pipeline. When a transaction enters the snoop pipeline (for a lookup operation), the transaction becomes Active and a record for the transaction is stored in any available row of the Active Transaction Status Array 200. Due to input queuing before the snoop pipeline and/or resource starvation effects, if a transaction is sitting in a System Controller input queue (SCIQ0 or SCIQ1) and has not yet entered the snoop pipeline, it is not considered Active.

Once a transaction becomes Active, it remains in the Active state in the System Controller until it completes. Thus, the row 290 for the transaction in the Active Transaction Status Array 200 is maintained, and under various conditions updated, until the transaction completes. All subsequent incoming transactions are compared against the already Active transactions in the System Controller according to the Activation rules explained below before they can become Active.

An Active transaction can only become complete after the later of the update operation and the issuance of an S_REPLY for that transaction to the requesting UPA port.

Transaction Activation By the System Controller

Pipelined execution of transactions results in multiple transactions being active simultaneously in the System Controller. This would lead to coherence hazards in the system if multiple active transactions shared the same cache index in the Dtags. To avoid such hazards, the System Controller utilizes Transaction Activation Logic 300 that blocks a transaction from becoming active based on information in the Active Transaction Status Array for already active transactions.

For example, if the System Controller has an S_REQ outstanding to a UPA port for a datum, and that UPA port displaces that datum due to a cache miss, the System Controller must block the S_REPLY for the displacing transaction until the S_REPLY for the S_REQ is given by that port. In the present invention, in order to maintain this S_REPLY ordering, the System Controller will index block the incoming transaction from becoming Active until the S_REQ completes.

From another perspective, the System Controller must correctly block on Active transactions such that the Dtag lookup operation performed when each transaction becomes active correctly determines where the data for the transaction will be sourced from. Once the data source for a transaction is determined, based on the Dtag lookup for the transaction, the data is sourced from there regardless of how long it takes, or for how long the transaction waits behind another Active transaction in any internal queue before being launched.

In accordance with the present invention, an incoming transaction will be blocked from becoming Active if:

A) the cache index associated with the incoming transaction is likely to be updated by an already active transaction; or B) the cache index associated with the incoming transaction is likely to update the cache index associated with an already active transaction; or C) the incoming transaction is likely to source/invalidate a cache line which is being sourced/invalidated by an already active transaction.

However, the transaction activation logic does not block activation of a transaction when the incoming transaction and the already active transaction are a read-writeback pair. Cache miss-load time is minimized by allowing the two transactions to be active at the same time, which results in significantly improved system performance. Coherence hazards are be eliminated in this case, without applying the above blocking rule, by ensuring that the Dtag update vector due to the first lookup is visible to the second lookup, and the status (the fact that the update is completed or not) of the first update operation is visible at the time the update vector for the second update is initiated.

Referring to FIG. 13, each of the transaction input queues in the System Controller presents the oldest inactive transaction request in that input queue to an arbiter circuit 301. Transactions previously activated, as indicated by an active/ inactive status bit in the record for each pending transaction request, are not presented to the arbiter circuit 301. The arbiter circuit 301 selects one inactive transaction request, giving highest priority to I/O requests (i.e., from an I/O UPA port), next highest priority to master class 0 requests (i.e., read and block load requests), and lowest priority to master class 1 requests (i.e., writeback requests, WriteInvalidate requests, block stores, interrupt requests, and non-cached read/write requests).

The transaction request selected by the arbiter circuit 301 is compared with all the currently Active transactions by a set of comparators 302. Each comparator 302 compares the selected transaction request with the Active transaction denoted in one row 290 of the Active Transaction Status Array 200 and outputs a one bit "Block/NoBlock" result on an output line 304 that is equal to "1" if the selected transaction is to be blocked based on the Active transaction denoted in the corresponding row 290, and is equal to "0" if the Active transaction (if any) denoted in the row 290 does not require blocking the selected inactive transaction. The results one lines 304 generated by all the comparators 302 are logically ORed by OR gate 306 to generate an aggregate Block/NoBlock result signal on line 308. The Transaction Activation Logic 300 activates the selected transaction if (A) there is at least one free row in the Active Transaction Status Array 200 and (B) the comparison of the selected inactive transaction with the currently Active transactions generates a NoBlock signal on line 308.

Two embodiments of the System Controller's Transaction Activation Logic 300 will be described next. Both embodiments are compatible with all the previously described aspects of the present invention. In fact, it would be possible to use a transaction activation logic 300 with even more restrictive activation rules, which would further reduce the system's ability to perform a plurality of data transfer operations in parallel but would simplify the implementation of the System Controller.

In both preferred embodiments, the Transaction Activation Logic 300 selects one inactive transaction from the System Controller's input request queues (SCIQ0 and SCIQ1 for each master UPA port, and SYSIOQ for an I/O device) during each system clock system for Activation testing. During that clock cycle the selected incoming transaction is simultaneously compared with all the Active transactions by a set of comparators 302. During the next system clock cycle, the Transaction Activation Logic 300 Activates the incoming transaction selected and tested during the previous clock cycle that transaction is not blocked by one of the currently Active transactions. If there are no pending inactive transactions, or if there are no available rows in the Active Transaction Status Array 200, then the Transaction Activation Logic 300 is inactive.

Relaxed Transaction Activation Rules

The boolean expression for the logic circuitry in each Comparator 302 in a first "relaxed transaction activation rule" embodiment of the present invention is as follows:

If there is an Active transaction that is a writeback transaction, and the selected incoming transaction is a non-writeback, or if the Active transaction is a non-writeback and the selected incoming transaction is a writeback, the selected incoming transaction is blocked from activation if there is a full address match.

If the Active transaction is a non-writeback and the selected incoming transaction is a non-writeback, an address comparison is performed to determine whether the selected incoming transaction should be blocked. If the DVP bit in the selected incoming transaction is set, or the selected incoming transaction is a P_RDD_REQ or P_WRI_REQ transaction, then all address bits of the active and selected incoming transactions are compared. Otherwise, the relevant address bits for both the Active and selected incoming transactions are the bits stored in the corresponding UPA port's cache index field, and the comparison is then performed on the intersection of the two bit fields. The number of bits in the cache index field is specified in the Cache Index Mask (CIM) field 194 in the SC Config Register for each UPA Port ID. The selected incoming transaction is activated if there is no match.

The complexity of the boolean logic circuitry for this "Relaxed Transaction Activation Rules" embodiment can be significantly reduced by using only those address bits associated with the cache index for the smallest allowed cache memory for all address compares. As explained above, the

```
Block = Status.Active
        & Not(InTx.TxType=WriteBack & AcTx.TxType=WriteBack)
        & AddressMatch
where
    AddressMatch = 1 if
        {
        FullAdrTest & (InTx.Adr = AcTx.Adr)
        } OR
        { (NOT FullTest) &
        ((InTx.Adr & CIMtoUse) = (AcTx.Adr & CIMtoUse))
        }
    FullTest=
        ((InTx.TxType=P_WRB_REQ & AcTx.TxType≠P_WRB_REQ)
        OR
        (InTx.TxType≠P_WRB_REQ & AcTx.TxType=P_WRB_REQ)
        OR
        (InTx.Status.DVP = True OR InTx.TxType=P_RDD_REQ OR
        InTx.TxType=P_WRI_REQ)
    CIMtoUse = SC_Config_Reg(InTx.Port#).CIM &
        SC_Config_Reg(AcTx.Port#).CIM
    AcTx is the row of the Active Transaction Status Array being
        compared with the selected inactive transaction
    InTx is a set of information for the selected inactive transaction
        structured in the same was as the rows of the Active
        Transaction Status Array
    AcTx.TxType is the transaction type of the active transaction
    InTx.TxType is the transaction type of the selected inactive
        transaction
    InTx.Status.DVP is True if the DVP bit is set in the selected inactive
        transaction
    SC_Config_Reg(X).CIM is the cache index mask (CIM) for the Xth
        UPA port
```

In accordance with the above boolean expression:

The selected inactive coherent transaction is always Activated if there are no Active transactions.

If both the Active transaction and the selected inactive transaction are writeback transactions, then the selected transaction is not blocked by the Active transaction, regardless of the addresses associated with the Active and selected inactive transactions.

number of address bits compared in this embodiment is the number of bits in the cache index of the smallest cache memory in the system. In the example used above, when the minimum established cache memory size is 512K bytes, the cache index for the minimum size cache memory is 13 bits, corresponding to physical address bits PA[18:6] of the addressed data block. However, once full address compares are eliminated, explicit logic must be included to allow overlapping operation of read/writeback transaction pairs.

In this "reduced complexity relaxed transaction activation rule" embodiment of the system, boolean expression for the logic circuitry in each Comparator 302 in one preferred embodiment is as follows:

```
Block = Status.Active
    & Not(InTx.TxType=WriteBack & AcTx.TxType=WriteBack)
    & (AddressMatch & Not (ReadWRBPair))
where
    AddressMatch = 1 if (InTx.Adr(MinCIM) = AcTx.Adr(MinCIM)
    ReadWRBPair =
    {
    InTx.Port# = AcTx.Port# AND
    ( (InTx.TxType=P_WRB_REQ & AcTx.TxType≠
        P_WRB_REQ & AcTx.Status.DVP) OR
    (InTx.TxType≠P_WRS_REQ & AcTx.TxType=
        P_WRB_REQ & InTx.Status.DVP) )
    }
    and Adr(MinCIM) are the address bits associated with the address
    index for the minimum size cache memory.
```

The logic circuitry for detecting a read/writeback pair, represented by the above boolean expression for the Read-WRBPair signal, generates a positive ReadWRBPair signal if (A) the two transactions are from the same UPA port, (B) one of the two is a writeback transaction while the other is not, and (C) the one transaction that is not a writeback transaction has its DVP bit set to True.

Use of the above described "reduced complexity" comparator logic has very little negative impact on system performance over the full comparator logic because the frequency of having a non-match on a full address compare and a match on the minimum cache index is, on average, equal to $2^{-N}$ where N is the number of bits in the minimum cache index. For example, if N is equal to 13 (for a 512K byte minimum cache memory size), the average percentage of transactions blocked by this implementation and not blocked by the reduced complexity implementation will be less than 0.01% of all transactions, assuming that P_RDD_REQ and P_WRI_REQ transactions constitute less than 80% of all transactions.

Stricter Transaction Activation Rules

The boolean expression for the logic circuitry in each Comparator 302 in a first "strict transaction activation rule" embodiment of the present invention is as follows:

```
Block = Status.Active
    & (AddressMatch & Not (ReadWRBPair))
where
    AddressMatch = 1 if
    { (NOT AcTx.Status.DVP &
    ((InTx.Adr & CIMtoUse1) = (AcTx.Adr & CIMtoUse1))
    } OR
    {
    AcTx.Status.DVP &
    (InTx.Adr & CIMtoUse2) = AcTx.Adr & CIMtoUse2)
    }
    ReadWRBPair =
    {
    InTx.Port# = AcTx.Port# AND
    ( (InTx.TxType=P_WRB_REQ & AcTx.TxType≠
        P_WRB_REQ & AcTx.Status.DVP) OR
    (InTx.TxType≠P_WRB_REQ & AcTx.TxType=
        P_WRB_REQ & InTx.Status.DVP) )
    }
    CIMtoUse1 = SC_Config_Reg(InTx.Port#).CIM &
        SC_Config_Reg(AcTx.Port#).CIM
    CIMtoUse2 = SC_Config_Reg(InTx.Port#).CIM
```

In accordance with the above boolean expression:

A selected incoming coherent transaction is always Activated if there are no Active transactions.

A selected incoming coherent transaction is Activated if there is no address index match with any Active transaction in the System Controller. The incoming coherent transaction is blocked from Activation if there is an index match with any Active transaction in the System Controller, except that an incoming coherent writeback transaction is not blocked by an Active transaction that is a Read from the same UPA port as the writeback transaction.

The number of bits to use for each address index compare depends on which UPA port's cache index is being guarded until the Active transaction completes. If the DVP bit in the Active transaction is not set, the number of bits of the index used for the address comparison is the Intersection of the size of the selected incoming transaction block index and the size of the respective Active transaction block index. If the DVP bit in the Active transaction is set, the number of bits of the index used for the address comparison is the block index size of the incoming transaction.

The above "strict" transaction Activation rules have the following strong invariant: there can be at most one transaction Active in the system on any cache index, except for a read transaction with the DVP set and its companion writeback transaction from the same UPA port.

The complexity of the boolean logic circuitry for this "Strict Transaction Activation Rules" embodiment can be significantly reduced by always comparing the same number of address bits for all address compares.

In this "Reduced Complexity Strict Transaction Activation Rules" embodiment of the system, boolean expression for the logic circuitry in each Comparator 302 in one preferred embodiment is as follows:

```
Block = Status.Active
    & (AddressMatch & Not (ReadWRBPair))
where
    AddressMatch = 1 if (InTx.Adr(MinCIM) = AcTx.Adr(MinCIM)
    ReadWRBPair =
    {
    InTx.Port# = AcTx.Port# AND
    ( (InTx.TxType=P_WRB_REQ & AcTx.TxType≠
        P_WRB_REQ & AcTx.Status.DVP) OR
    (InTx.TxType≠P_WRB_REQ & AcTx.TxType=
        P_WRB_REQ & InTx.Status.DVP) )
    }
    and Adr(MinCIM) are the address bits associated with the address
    index for the minimum size cache memory.
```

Active Transaction Management

In addition to blocking a transaction from becoming Active due to the above mentioned address blocking rules (in either set), the System Controller may also block Active transactions from progressing due to the following conditions:

Work on an Active transaction is blocked if the transaction would require a second S_REQ to be sent to a UPA port while another S_REQ is still outstanding to that UPA port. In order for this condition to be detected, however, the System Controller must first have made the transaction Active and performed the associated Dtag lookup.

Work on an Active transaction can be blocked by resource contention, such as memory bank busy, or datapath busy conditions.

Work on an Active transaction can be blocked by flow control requirements. In particular, a transaction cannot be forwarded to a target slave UPA port if the slave's input queues are full.

Active Transaction Management is supported, in part, by the previously mentioned Active Transaction Status Array 200. Referring to FIGS. 14A-14D, status array 200 includes a status vector 294 for each Active transaction. The status vector 294 in each row of status array 200 includes:

A TxActive flag 320 that is True when the corresponding row 290 of the Active Transaction Status Array 200 contains valid data concerning an active transaction.

A DVP flag 321, which is a copy of the DVP (dirty victim pending) flag in the corresponding transaction request.

Figure 14A:
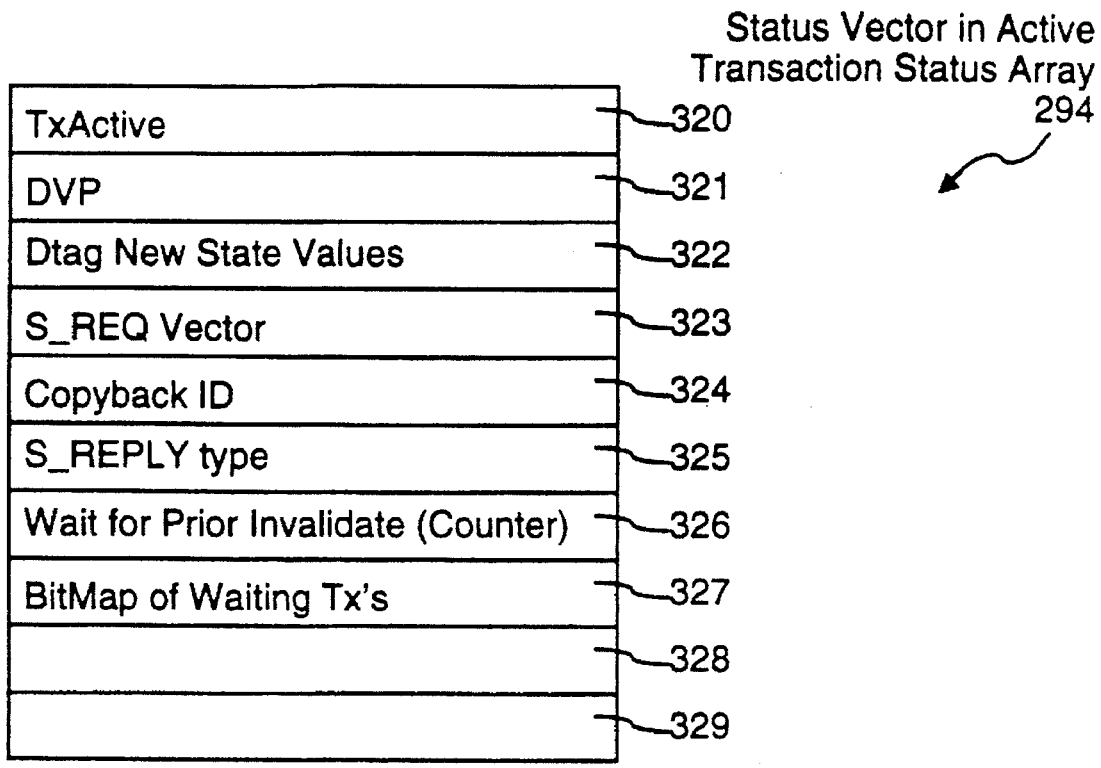
FIGS. 14A–14D are block diagrams of status information data structures used by the system controller in a preferred embodiment of the present invention.
Figure 14B:
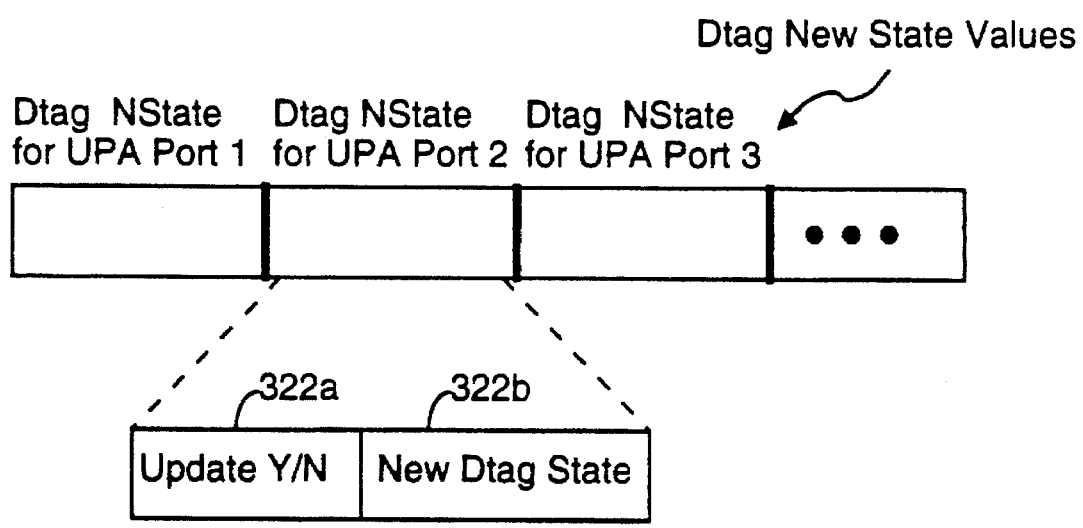

A vector of new Dtag state values 322 to be stored in the Dtag arrays for each transaction request. Referring to FIG. 14B, the Dtag New State values array includes for each Dtag array an update yes/no flag 322a that is equal to 1 if a Dtag update is to be performed on the corresponding Dtag array and a two-bit Dtag state value 322b that is to be stored in the Dtag corresponding to the cache index for this transaction. (See FIG. 14B.)

Figure 14C:
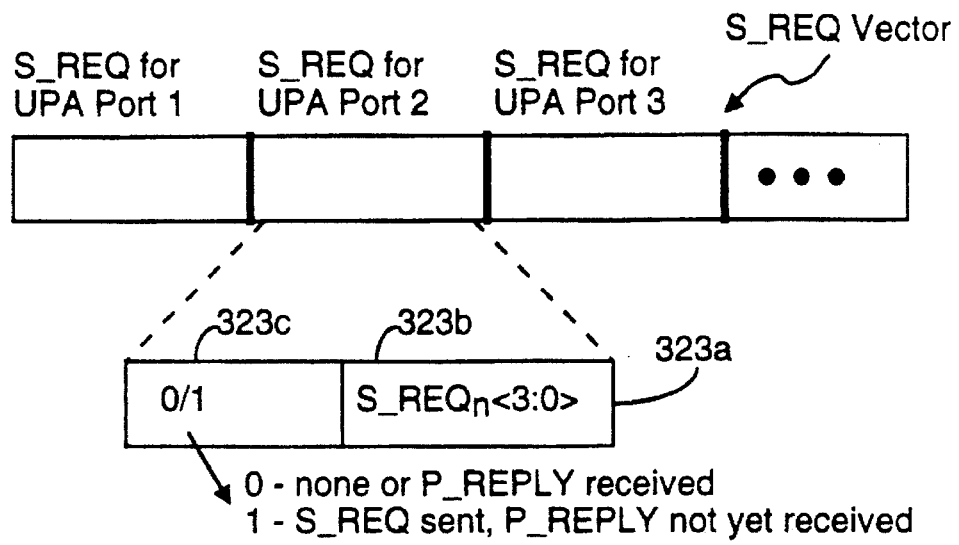
Figure 14D:
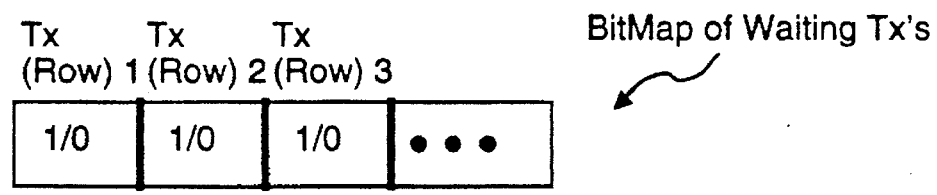

A S_REQ vector 323, indicating what S_REQ subtransaction, if any, should be sent to each UPA port, and the status of each such sub-transaction. Referring to FIG. 14C, the S_REQ vector 323 has an entry 323a for each UPA port. The entry 323a for each UPA port includes the 4-bit S_REQ type value 323b for the S_REQ, if any, to be sent to the corresponding UPA port, and a status value 323c. The status value 323c is equal to "1" when an S request has been sent to the corresponding UPA port or is waiting to be sent, and is equal to "0" for UPA ports to which no S request is to be sent and for UPA ports which have already sent a P_REPLY in response to a previously sent S_REQ.

A Copyback ID 324, which identifies the UPA port (if any) from which data is to be copied.

A S_REPLY type, which is the four bit code of the S_REPLY type to be sent to the requesting UPA port when the transaction is ready for completion. Whenever an S_REPLY is also to be sent to a sourcing UPA port, that S_REPLY is always an S_CRAB message, and thus that S_REPLY type does not need to be stored in the status vector for the transaction.

A Wait for Prior Invalidate counter 326, which has a nonzero value for each earlier activated and uncompleted transaction in which a Dtag Invalidate will be performed on a Dtag for the same UPA port as the requesting UPA port for this transaction. For example, this value is equal to two if there are two pending transactions that will invalidate Dtags in the Dtag array for the UPA port requesting this transaction (i.e., the transaction corresponding to this status array row 290).

A BitMap of Waiting Tx's 327, which is a bit map indicating which of the transactions denoted in the Active Transaction Status Array are being blocked until this transaction completes corresponding invalidate sub-transactions. For each blocked transaction, the BitMap 326 has a "1" bit, and for each other transaction it has a "0" bit. For transactions that do not involve any invalidate sub-transactions, the BitMap 327 is equal to all zeros.

Transaction Execution Logic

Figure 15:
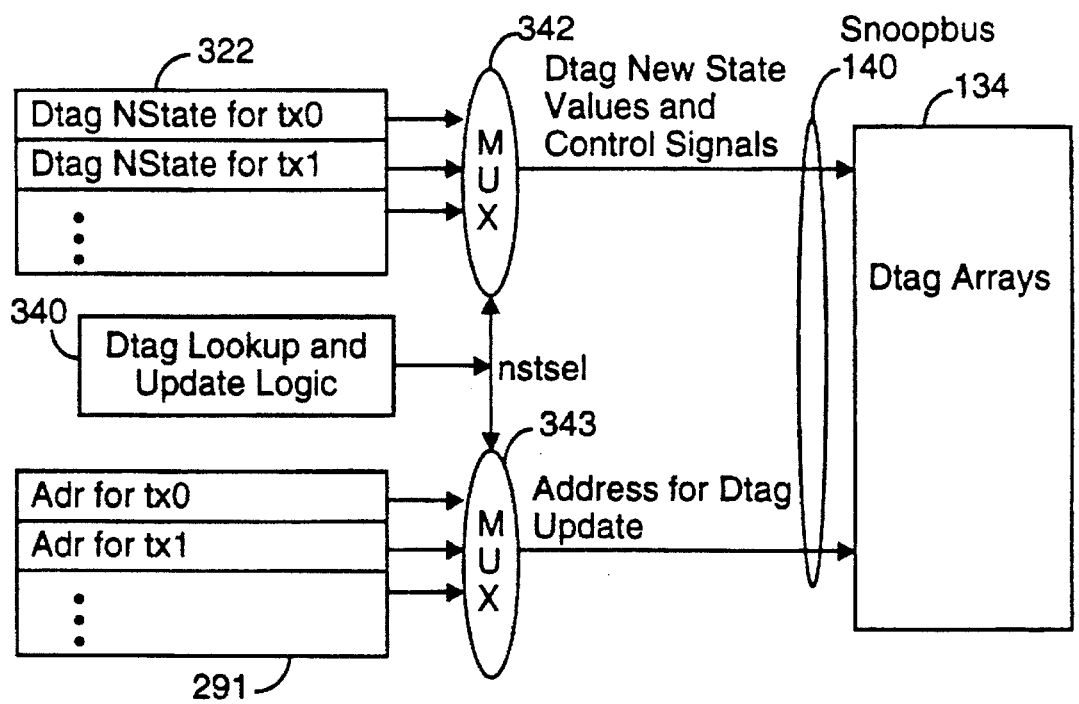
FIG. 15 is a block diagram of the Dtag lookup and update logic in the system controller in a preferred embodiment of the present invention.

Referring to FIGS. 14 and 15, once a transaction has been activated, a Dtag lookup is performed immediately or that transaction by Dtag Lookup and Update Logic 340. In the preferred embodiment, the Dtag lookup operation is pipelined as follows: over four system clock cycles, two Dtag lookups are performed for two incoming transactions, followed by two Dtag update operations.

The Dtag lookup operation produces a set of three Dtag bits for each Dtag array, one bit indicating if a cache hit was detected, and two bits indicating the state of the Dtag entry, if any, corresponding to the transaction's specified data block address. Those Dtag state values, along with the P_REQ transaction type are used to determine (A) the S_REQ's, if any, that need to be sent to the UPA ports to perform the requested transaction, (B) where data is being sourced or sent to or from, (C) the S_REPLY type to be sent to the requesting UPA port when the transaction is completed, and (D) the new Dtag state values to be stored in the Dtag arrays as a result of execution of the requested transaction. These values are generated using a simple table lookup in a Transaction Table 341.

An example of the Transaction lookup table 341 for a two data processor system is shown in Table 10. Similar tables can be constructed by those skilled in the art for systems having more than two data processors.

Referring to Table 10, the first four columns represent data values known at the conclusion of the Dtag lookup operation, but before the transaction table lookup. In Table 10, the following abbreviations are used:

Tx: transaction

CurSt: current Dtag state value obtained from Dtag lookup

NewSt: new Dtag state value for Dtag update

P0: data processor 0, coupled to UPA port 0

P1: data processor 1, coupled to UPA port 1

Mem: main memory

X: none, or don't care error: specified signal combination should never occur

Using the current Dtag state values obtained from the Dtag lookup, the identity of the requesting UPA port and type of transaction request, the Dtag lookup logic accesses the corresponding row of the Transaction Table 341 (stored in ROM in the preferred embodiment) and stores the resulting Dtag new state values in the Dtag New State Values vector 322 within the status vector 294 for the activated transaction. Similarly, the S_REQ type, if any, found in the Transaction Table 341 is stored in the S_REQ vector 323 for the activated transaction, and the S_REPLY type found in the Transaction Table 341 is stored in the S_REPLY type field 325 of the transaction record 290 for the activated transaction. The S_REPLY field 325 stores the S_REPLY to be sent to the requesting UPA port.

Thus, at the conclusion of the Dtag lookup operation, the information needed for performing the activated transaction is stored in the transaction's transaction record 290 in status array 200.

In the preferred embodiment, the Dtag arrays 134 are updated with the Dtag New State values in the Dtag new state values vector 322 immediately after the Dtag lookup and Transaction Table lookup operations have been completed. The Dtag update logic 340 is shown in FIG. 15. In particular, the Dtag update logic 340 uses two multiplexers 342, 343 to select the Dtag new state values vector 322 and the corresponding data block address for the activated transaction and to assert those signals on the Snoopbus 140.

TABLE 10

TRANSACTION TABLE

| Tx Issued From | P_Req Type | Dtag P0 CurSt | Dtag P1 CurSt | Dtag P0 NewSt | Dtag P1 NewSt | Data from/to | S_Req type | S_Reply type | |
|---|---|---|---|---|---|---|---|---|---|
| P0 | P_RDQ | I | I | M | I | Mem | X | S_RBU | |
| " | | I | S | S | S | Mem | X | S_RBS | |
| " | | I | O | S | O | P1 | S_CPB | S_RBS | |
| " | | I | M | S | O | P1 | S_CPB | S_RBS | |
| " | | not I | | | | | | | error |
| " | P_RDSA | I | I | S | I | Mem | X | S_RBS | |
| " | | I | S | S | S | Mem | X | S_RBS | |
| " | | I | O | S | O | P1 | S_CPB | S_RBS | |
| " | | I | M | S | O | P1 | S_CPB | S_RBS | |
| " | | not I | | | | | | | error |
| " | P_RDO | I | I | M | I | Mem | S | S_RBU | |
| " | | I | S | M | I | P1 | S_CPI | S_RBU | |
| " | | I | O | M | I | P1 | S_CPI | S_RBU | |
| " | | I | M | SM | I | P1 | S_CPI | S_RBU | |
| " | | S | I | M | I | X | X | S_OAK | |
| " | | S | S | M | I | X | S_INV | S_OAK | |
| " | | S | O | M | I | X | S_INV | S_OAK | |
| " | | S | M | | | | | | error |
| " | | O | I | M | I | X | X | S_OAK | |
| " | | O | S | M | I | X | S_INV | S_OAK | |
| " | | O | O | | | | | | error |
| " | | O | M | | | | | | error |
| " | | M | I | M | I | X | X | S_OAK | |
| " | | M | S | | | | | | error |
| " | | M | O | | | | | | error |
| " | | M | M | | | | | | error |
| P0 | P_RDD | I | I | X | X | Mem | X | S_RBS | |
| " | | I | S | X | X | Mem | X | S_RBS | |
| " | | iI | O | X | X | P1 | S_CPD | S_RBS | |
| " | | I | M | X | X | P1 | S_CPD | S_RBS | |
| " | P_WRB | I | X | I | X | X | X | S_WBCAN | |
| " | | not I | X | I | X | Mem | X | S_WAB | |
| " | P_WRI | I | I | X | X | Mem | X | S_WAB | |
| " | | I | not I | X | X | Mem | S_INV | S_WAB | |
| " | | not I | I | I | X | Mem | S_INV | S_WAB | |
| " | | not I | not I | I | I | Mem | S_INV | S_WAB | |

| Tx Issued From | P_Req Type | Dtag P1 CurSt | Dtag P0 CurSt | Dtag P1 NewSt | Dtag P0 NewSt | Data from/to | S_Req type | S_Reply type | |
|---|---|---|---|---|---|---|---|---|---|
| P1 | P_RDQ | I | I | M | I | Mem | X | S_RBU | |
| " | | I | S | S | S | Mem | X | S_RBS | |
| " | | I | O | S | O | P0 | S_CPB | S_RBS | |
| " | | I | M | S | O | P0 | S_CPB | S_RBS | |
| " | | not I | | | | | | | error |
| " | P_RDSA | I | I | S | I | Mem | X | S_RBS | |
| " | | I | S | S | S | Mem | X | S_RBS | |
| " | | I | O | S | O | P0 | S_CPB | S_RBS | |
| " | | I | M | S | O | P0 | S_CPB | S_RBS | |
| " | | not I | | | | | | | error |
| " | P_RDO | I | I | M | I | Mem | S | S_RBU | |
| " | | I | S | M | I | P0 | S_CPI | S_RBU | |
| " | | I | O | M | I | P0 | S_CPB | S_RBU | |
| " | | I | M | SM | I | P0 | S_CPB | S_RBU | |
| " | | S | I | M | I | X | X | S_OAK | |
| " | | S | S | M | I | X | S_INV | S_OAK | |
| " | | S | O | M | I | X | S_INV | S_OAK | |
| " | | S | M | | | | | | error |
| " | | O | I | M | I | X | X | S_OAK | |
| " | | O | S | M | I | X | S_INV | S_OAK | |
| " | | O | O | | | | | | error |
| " | | O | M | | | | | | error |
| " | | M | I | M | I | X | X | S_OAK | |
| " | | M | S | | | | | | error |
| " | | M | O | | | | | | error |
| " | | M | M | | | | | | error |
| P1 | P_RDD | I | I | X | X | Mem | X | S_RBS | |
| " | | I | S | X | X | Mem | X | S_RBS | |
| " | | iI | O | X | X | P0 | S_CPD | S_RBS | |
| " | | I | M | X | X | P0 | S_CPD | S_RBS | |
| " | P_WRB | I | X | I | X | X | X | S_WBC | |

TABLE 10-continued

TRANSACTION TABLE

| | | | | | | | | AN |
|---|---|---|---|---|---|---|---|---|
| " | | not I | X | I | X | Mem | X | S_WAB |
| " | P_WRI | I | I | X | X | Mem | X | S_WAB |
| " | | I | not I | X | X | Mem | S_INV | S_WAB |
| " | | not I | I | I | X | Mem | S_INV | S_WAB |
| " | | not I | not I | I | I | Mem | S_INV | S_WAB |

Figure 16:
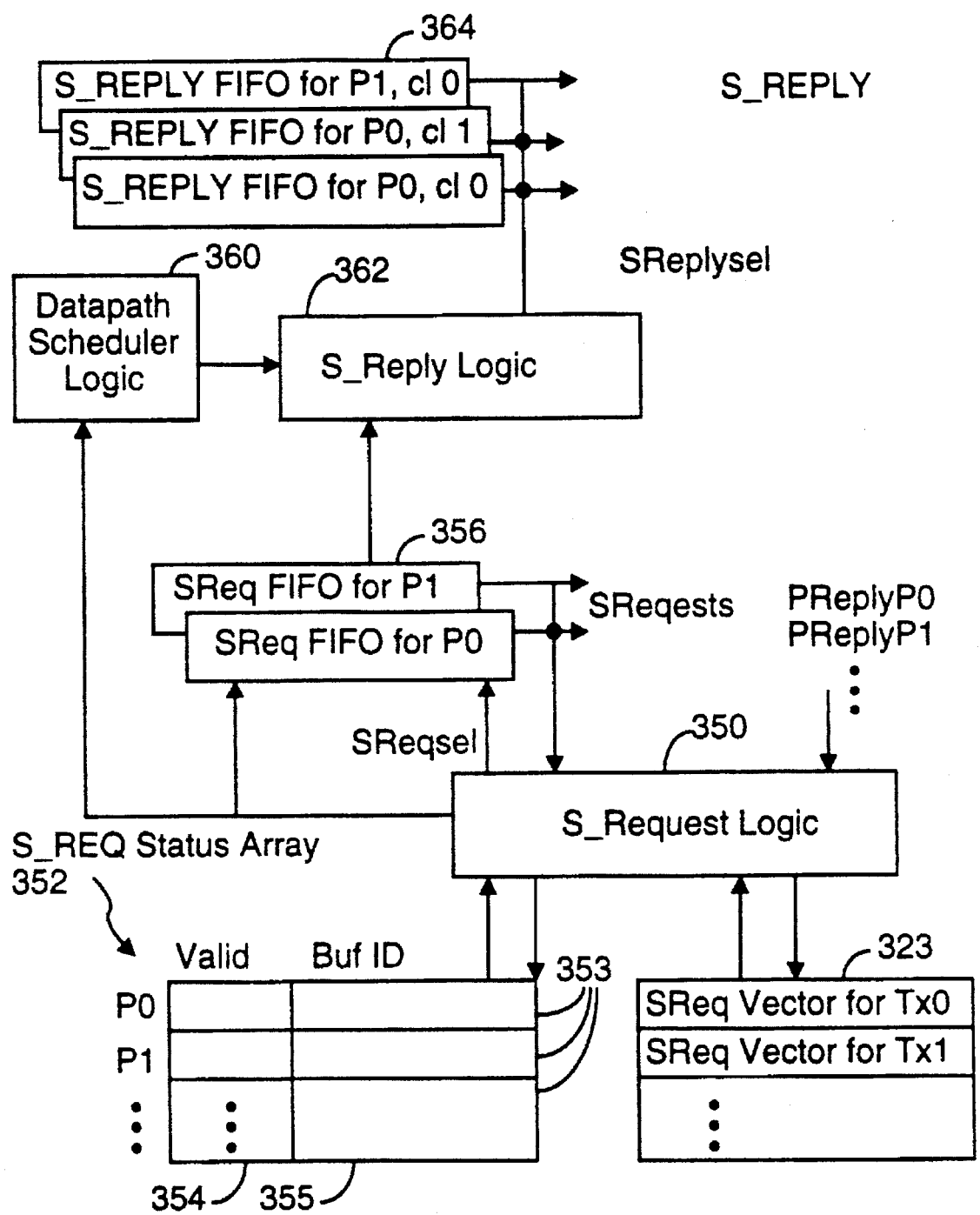
FIG. 16 is a block diagram of the S_Request and S_Reply logic in the system controller in a preferred embodiment of the present invention.

Referring to FIG. 16, the S_Request logic 350 for executing S_REQ's subtransactions utilizes a set of SReq FIFO buffers 356, including one SReq FIFO buffer for each data processor capable of receiving S_REQ's, as well as a S_REQ status array 352. Each time a transaction is activated and its Dtag lookup operation is performed, the same S_REQ data that is stored in vector 323 in each activated transaction's transaction record 290 is also stored in the SReq FIFO buffers, except that each S_REQ is stored in the SReq FIFO buffer 356 corresponding to the data processor to which that S_REQ is to be sent. By storing all S_REQ's for each data processor in a FIFO at the time of the corresponding Dtag lookup, the system ensures compliance with the transaction ordering requirement that transactions sent from a first data processor master class to the same second data processor will be performed in the same order as they were transmitted from the first data processor's master class output queue.

The S_REQ status array 352 includes one S_REQ status record 353 for each master UPA port. The S_REQ status record 353 for each master UPA port stored information concerning the pending S_REQ, if any, sent to that UPA port. The S_REQ status record 353 includes a valid bit 354, which is set to "1" only when an S_REQ has been sent to the corresponding UPA port, and a Buf ID 355 which stores the ID of the activated transaction record whose S_REQ status bit 323c will need to be cleared when the corresponding P_REPLY is received.

As described above with respect to FIG. 13, the system controller processes the memory transaction requests stored in the system controller's input request queues SCIQx (which have a one-to-one correspondence to the outbound request queues C1, C0 in the UPA ports of the system's data processors, as shown in FIG. 5) in accordance with prioritization rules that are independent of the relative order in which the oldest pending request in each of the input request queues was received by the system controller. Once activated, the order in which transactions are executed is based on resource availability: a datapath for any associated data transfer isn't scheduled until all the resources required for the transaction are available, as indicated by the P_Reply flag values 323c stored in the S_REQ vector 323 for each activated transaction (i.e., each pending P_Reply represents a resource required to perform the transaction). As a result of application of the prioritization rules and/or waiting for required resources, a first memory transaction request stored in a first data processor's outbound request queue may be processed later by the system controller than a second memory transaction request stored in a second data processor's outbound request queue, even when the second memory transaction request is stored in the second outbound request queue later than when the first memory transaction request is stored in the first outbound request queue.

Whenever one of the S_REQ status records has a valid bit equal to "0", that means there is no S_REQ pending in the corresponding UPA port, which in turn means that another S_REQ can be sent to that UPA port. Based on the identity of the UPA port which has no pending S_REQ, as well as on the S_REQ's waiting to be launched to that UPA port, if any, the S_Request logic transmits the first S_REQ in the corresponding SReq FIFO 356 to the identified UPA port. Whenever a P_REPLY is received from a UPA port, it is processed by the S_Request logic 350 by (A) clearing the valid bit 353 in the S_REQ status record 353 for the UPA port that sent the P_REPLY, (B) clearing the S_REQ status bit 323c in the transaction status record identified in the S_REQ status record 353 for the UPA port that sent the P_REPLY.

Once all the S_REQ status bits 323c for an active coherent transaction have been cleared, a datapath setup request is sent to the Datapath scheduler logic 360 if the transaction requires a data transfer. The Datapath scheduler logic 360 arbitrates between competing datapath setup requests using a round robin arbitration scheme. When the Datapath scheduler logic 360 selects a transaction for datapath service, it also sends a signal to S_Reply logic 362 to prompt the S_Reply logic 362 to send an S_REPLY message to the requesting UPA port for the selected transaction as well as a corresponding S_REPLY to the sourcing UPA port, if any. A set of S_REPLY FIFO buffers 364 store the S_REPLY's for active transactions, using a separate FIFO buffer 364 for each master class of each master UPA port. Use of FIFO buffers 364 for ordering S_REPLY's ensures that transactions in each master class of each master UPA port are completed in the same order that transactions are issued within each master class.

For each completed transaction, the S_Reply logic 362 prompts the transmission of the S_REPLY message stored in the appropriate FIFO 364. When a UPA port is sourcing data to a requesting processor, a S_CRAB message must be sent to the sourcing UPA port. The S_CRAB message is generated by hardwired logic in the S_Reply logic 362.

For transaction's not requiring a data transfer, the S_Reply logic 362 sends the S_REPLY indicated in field 325 of the transaction's status record (a copy of which is stored in the appropriate S_REPLY FIFO buffer 364) to the UPA port indicated in MID field 292 when all the S_REQ status bits 323c for the transaction have been cleared.

For non-coherent transactions to non-cached address space, the S_Reply logic 362 generates S_REPLY messages to the requesting UPA port, and for some transaction types, to the sourcing UPA port, once a P_REPLY is received from the target (sourcing) UPA port in response to the initial transaction request.

The S_Reply logic 362 and S_REPLY FIFO buffers 364 maintain a one to one correspondence between the ordering of Dtag lookup operations, and the ordering of S_REPLY messages for data transfers to a specific requesting UPA port, for all requests from the same master class. Thus, if a UPA master port issues a read transaction request followed by a write transaction request from the same master class, the S_REPLY for the write transaction is issued after the S_REPLY for the read transaction.

The S_REPLY ordering requirement is met by providing an S_REPLY FIFO buffer for each master class of each data processor for storing S_REPLY's for each data processor master class at the time the corresponding transaction's Dtag lookup operation is completed. As a result, S_REPLY's are ordered strictly in the same order that Dtag lookups are performed on the transactions for each data processor master class.

In another preferred embodiment, the S_REPLY ordering requirement is met by providing just one entry 290 in the active transaction status array 200 dedicated for each UPA port master class. Thus, in a system based on this first preferred embodiment that has two master UPA ports, each having two master classes, plus an I/O UPA master port, there are just five entries 290 in the active transaction status array 200, each dedicated to one port and master class (where applicable). Since in this preferred embodiment only one transaction for each UPA port master class can be active at any one time, the S_REPLY ordering requirement is automatically satisfied.

The System Controller further maintains a one to one correspondence between the order in which Dtag lookup operations are performed, and the order in which S_REQ messages are sent to a UPA port.

Implementation of Dekker's Algorithm

Suppose we have two processors, P1, and P2. Assume that data blocks or words A and B are shared by both processors, and are initialized to 0. We execute the following sequence of instructions on the two processors:

| Processor P1 | Processor P2. |
| --- | --- |
| st 1, A | st 1, B |
| membar | membar |
| ld B | ld A | where "membar" is an instruction that requires all prior instructions to complete before execution of instructions following the membar instruction.

Dekker's algorithm requires that both processors should not read 0 when their respective load operations (ld B, ld A) are performed.

In conventional systems, Dekker's algorithm is implemented by requiring, when a store miss to a cache line occurs, that the corresponding line in every other cache be invalidated before the store is allowed to complete.

In the present invention, the conventional "invalidate in all cache's before storing" rule is relaxed marginally, without impacting the correctness of Dekker's algorithm, by allowing the store from one processor to complete, while blocking stores from all other processors to complete until the corresponding invalidates are received, as shown in the following example.

If the system allows P1's store operation to proceed, and blocks P2's store operation until the corresponding invalidate acknowledgement message from P1 is received, then P1 will read B as "0", and P2 will read A as 1.

The transaction activation logic of the present invention blocks store operations by all but one of the processors within a time window when two or more processors try to touch mutex locks simultaneously, to ensure correctness of Dekker's algorithm. This improves the performance of stores to shared data over the conventional write invalidate logic.

In a first, conservative, embodiment of the S_Request logic 350 and S_Reply logic 362 that implements the above mentioned "relaxed rule," if the datum is in the S or O state in the requesting cache, the S_REQ logic issues a S_INV request to all other sharing caches and waits for P_Reply's from them before issuing S_OAK to the requesting cache.

Otherwise, if the datum is in the M state in any other cache, the state machine 342 issues a S_CPI request to that cache, waits for a P_Reply from it, and sources the data to the requesting cache.

If neither of the above conditions apply and if the datum is in S state in any cache, the state machine 342 issues a S_CPI request to one of the sharing caches, issues a S_INV request to all other sharing caches, and waits for a P_Reply from all of them before issuing a S_Reply to the requesting cache.

If none of the above conditions apply, the addressed data block is sourced from main memory.

In a second embodiment, the Dtag lookup and update logic 340 and the S_Request and S_Reply logic 350, 362 together utilize a "performance" version of the above mentioned "relaxed rule." In this implementation, if there is an outstanding S_REQ to the requesting cache, the S_Request logic 350 waits for a P_REPLY to the S_REQ.

Next, if the addressed datum is in the S or O state in the cache memory of the requesting processor, the System controller issues invalidate requests (S_INV) to all other sharing caches and issue S_OAK to the requesting cache.

If the addressed datum is not in the S or O state in the cache memory of the requesting process, but is in M state in any other cache, the System Controller issues a copyback invalidate request (S_CPI) to that cache's UPA slave port, waits for the P_REPLY from it, and then sources the data to the requesting UPA port.

If none of the above conditions apply, and if the addressed datum is in S state in any cache (i.e., other than the cache memory of the requesting processor), the System Controller issues invalidate requests (S_INV) to all sharing caches, and sources the requested data from main memory.

Finally, if none of the above conditions apply, the System Controller sources the addressed data from main memory.

In the preferred embodiment, the S_REQ and S_REPLY messages to be sent and the data source for each transaction are encoded in the Transaction Table 341 that is accessed at the end of the Dtag lookup operation to generate the Dtag new state values, the S_REQ vector for the transaction and the S_REPLY for the transaction.

Figure 17:
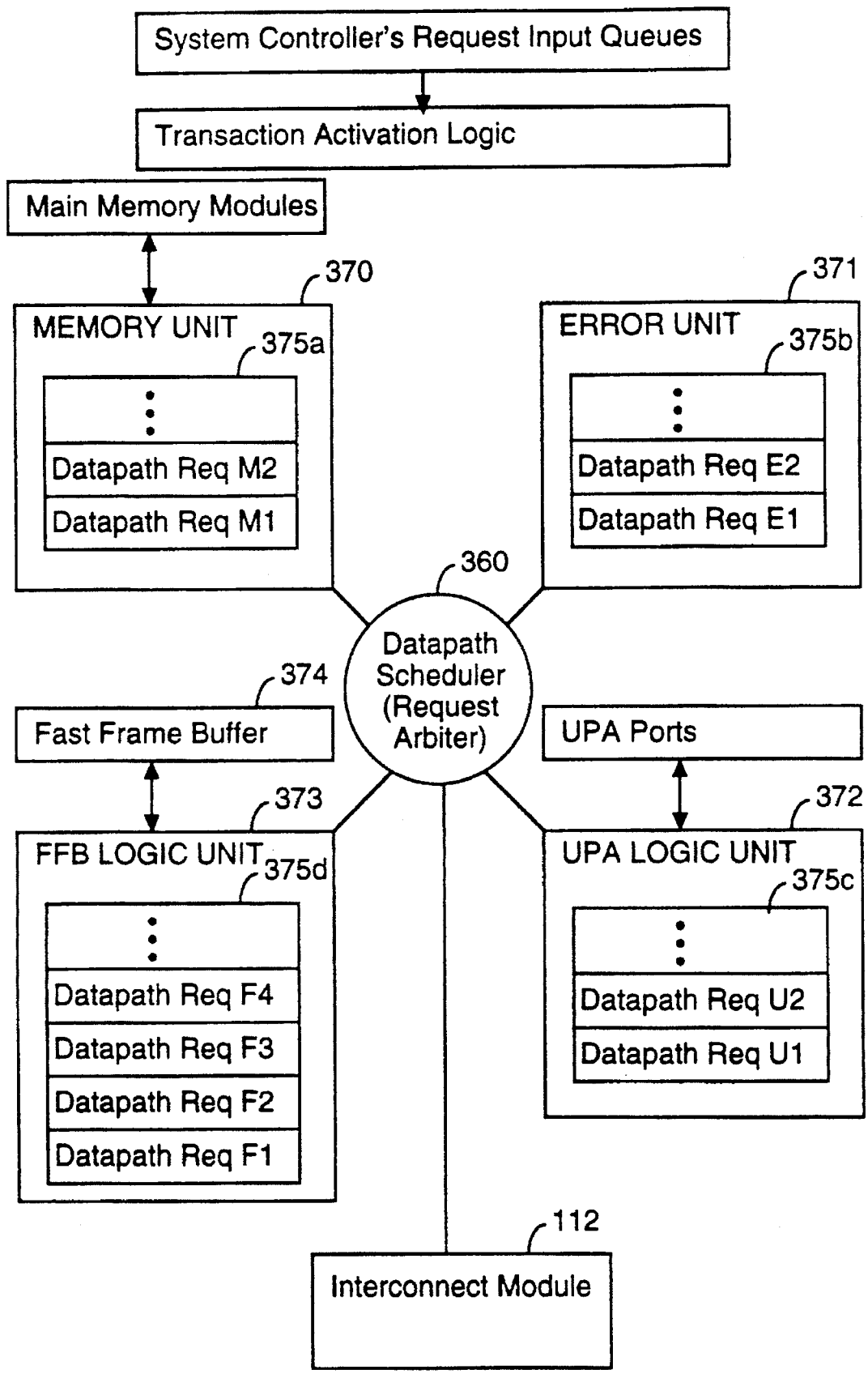
FIG. 17 is a block diagram of the datapath scheduler in a preferred embodiment of the present invention.

Referring to FIG. 17, the datapath scheduler 360 arbitrates between competing datapath setup requests from (A) memory unit logic 370, (B) Error unit logic 371, (C) UPA unit logic 372, and (D) Fast frame buffer (FFB) logic unit 373. The memory unit logic 370 controls the signalling necessary to read and write data from and to main memory. The error unit logic 371 handles timeout errors, illegal address range errors and the like. The UPA logic unit 372 handles the S_REQ, P_REQ and P_REPLY communications with UPA units to which data is being sourced or from which data is being requested. The FFB logic unit 373 controls the signalling necessary for reading and writing data from and to a frame buffer 374.

Each of the logic units 370–373 includes a FIFO request buffer 375a–375d for temporarily storing datapath requests. Each datapath request entry in each FIFO request buffer 375 includes:

a valid bit, to indicate if the entry contains valid data;
a source, indicating where data is to be transferred from, if any data is to be transferred;
a destination, indicating where data is to be transferred to, if any data is to be transferred; and a S_REPLY type, indicating the type of S_REPLY to issue when the requested datapath is "scheduled" (i.e., granted).

The datapath schedule 360 is implemented as a rotating priority encoder, and thus uses a round robin arbitration scheme. When a request from any logic unit 370–373 (other than the FFB logic unit) is granted, it is then assigned lowest priority for the next arbitration cycle. For the FFB logic unit, up to four datapath requests in its FIFO 375d are serviced by the datapath scheduler 360 as though they were a single request before the datapath scheduler 360 performs another arbitration cycle and services any other requests. This special priority is given to FFB datapath requests to ensure that the framebuffer is quickly loaded with new image data.

The FFB 374 is assigned a specified address range, and all data transfer operations whose source or destination fall in that specified address range are handled by the FFB logic unit 373.

Figure 18:
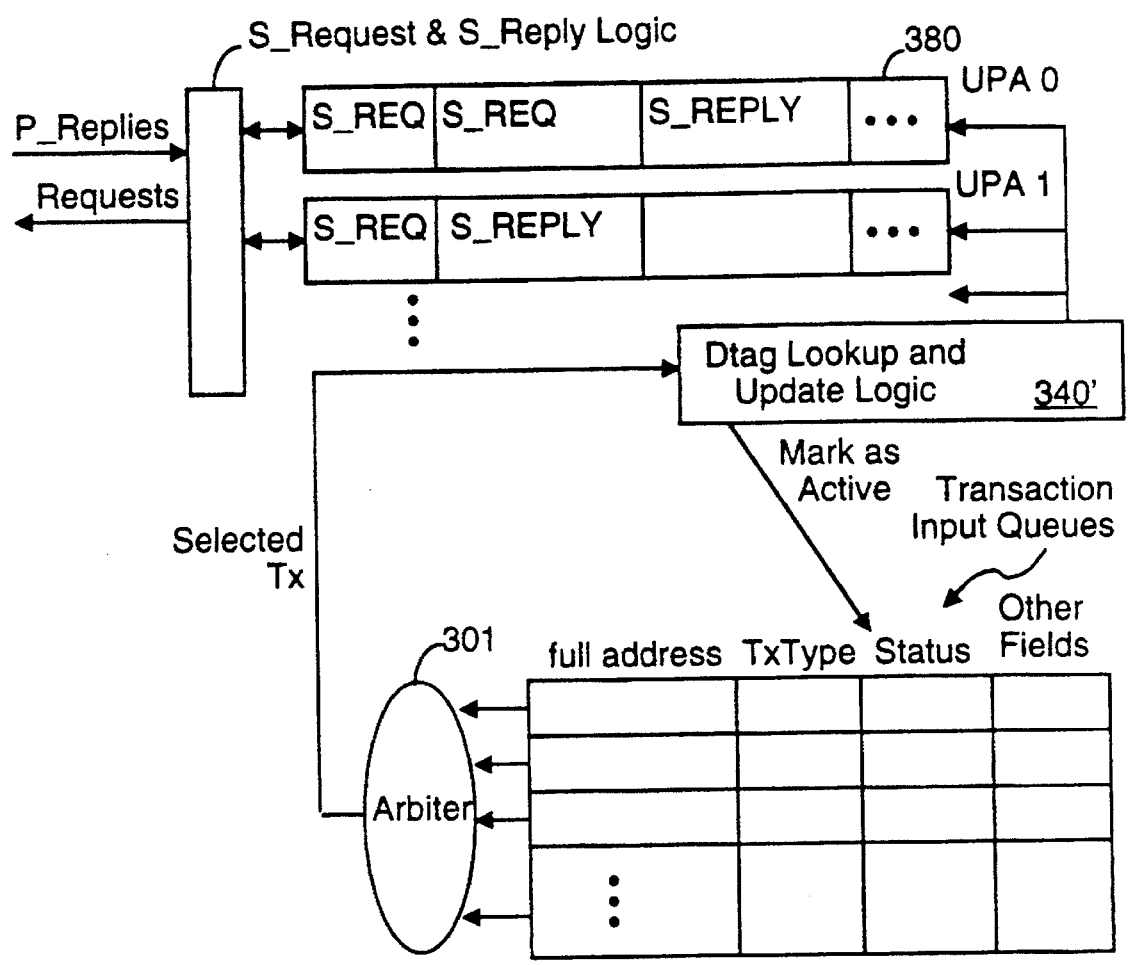
FIG. 18 is a block diagram of the S_Request and S_Reply logic in the system controller in a second preferred embodiment of the present invention.

Referring to FIG. 18, in an alternate embodiment, the Active Transaction Status Array 200 (not shown) is supplemented by a first-in-first-out (FIFO) transaction request queue 380 for each UPA port. Each time a transaction is activated, the Dtag lookup logic 340' determines the S_REQ's, if any, to be transmitted to various other UPA ports to execute the transaction, or the UPA port to which the P_REQ should be forwarded, using the same Transaction Table lookup methodology as described above. Those S_REQ's, as well as all S_REPLY's for coherent transactions, are stored by the Dtag lookup logic 340' in the FIFO queues 380 for the UPA ports to which they are to be transmitted.

Non-coherent P_REQ's that are forwarded by the System Controller to a destination UPA port are stored in parallel FIFO request queue buffers in the System Controller, and thus non-coherent transactions do not block the progress of coherent transactions.

Subtransaction requests are stored in the request queues 380 in the same order that the corresponding transactions were activated. Each subtransaction request (S_REQ) in a UPA port's request queue 380 is performed in the order that it is stored in the queue 380. In addition, S_REPLY's are stored in the request queues 380 in the same order that the corresponding transactions are activated. As a result, all the ordering requirements for transactions within master classes and for transactions executed by each UPA slave port discussed earlier in this document are automatically satisfied by the operation of the request queue mechanism. This request queue mechanism reduces parallel execution of transactions to some extent. For example, a S_REQ can block an S_REPLY, and vice versa, while in many instances the S_REPLY and S_REQ could be serviced by the UPA port in parallel. However, the simplicity of the queue structure, and the high degree of parallel execution still allowed in a system using this architecture for two to eight or more data processor UPA ports and one or more non-processor UPA ports, offer attractive performance/cost characteristics.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. Additional aspects of the operation of the System Controller 110 are described in Appendix 1 of patent application Ser. No. 08/415,175 filed Mar. 31, 1995, which is hereby incorporated by reference.

What is claimed is:

1. A computer system, comprising:

a system controller;

a main memory coupled to said system controller; and a data processor having a cache memory having cache lines for storing data blocks;

said data processor having a master interface, coupled to said system controller, for sending memory transaction requests to said system controller, said master interface including at least two parallel independent outbound request queues for storing memory transaction requests to be sent to said system controller; said memory transaction requests defining at least two transaction classes corresponding to said at least two outbound request queues, including a first transaction class that includes read memory transaction requests and a second transaction class that includes writeback memory transaction requests;

said system controller including a corresponding interface coupled to said data processor for receiving memory transaction requests from said data processor, said interface including at least two parallel independent incoming request queues for storing memory transaction requests received from said data processor; and the system controller including transaction execution logic for executing and responding to the requests in each of its incoming request queues and for ordering the execution of the requests in accordance with prioritization rules that are independent of the relative order in which an oldest pending request in each of the incoming request queues was received by the system controller, such that a first request in a first one of the incoming request queues may be executed and responded to later than a second request in a second one of the incoming request queues that was received by the system controller later than it received the first request.

2. The computer system of claim 1 further including independent outbound data queues in said data processor, one for each of said transaction classes, for storing data blocks associated with write transaction requests in each respective one of the transaction classes, said outbound data queues filled by said data processor prior to the transmission of the associated memory transaction request to said system controller.

3. The computer system of claim 2 wherein each of said two parallel independent outbound request queues in said data processor is a first-in-first-out buffer for transmitting memory transaction requests to the system controller, said memory transaction request logic, responsive to each of said received transaction requests, generating a reply for transmission to said data processor upon the availability of resources associated with said memory transaction request, said replies strictly ordered in each transaction class such that said data processor receives replies to those of said memory transaction requests transmitted from a transaction class in the same order as the transactions were originally issued from said data processor.

4. The computer system of claim 1 further including:

said data processor including a slave interface, coupled to said system controller, for receiving transaction requests from said system controller, said slave interface including at least one input request queue for storing transaction requests received from said system controller; said transaction requests including read requests and write requests; each said transaction request specifying an address for an associated data block to be read or written;

said system controller having a second interface including at least one outbound request queue for storing transaction requests to be transmitted to said data processor's slave interface.

5. A computer system, comprising:

a system controller;

a main memory coupled to said system controller; and a plurality of data processors each having a cache memory having cache lines for storing data blocks;

each said data processor having a master interface, coupled to said system controller, for sending memory transaction requests to said system controller, said master interface including at least two parallel independent outbound request queues for storing memory transaction requests to be sent to said system controller; said memory transaction requests defining at least two transaction classes corresponding to said at least two outbound request queues, including a first transaction class that includes read memory transaction requests and a second transaction class that includes writeback memory transaction requests;

said system controller including an interface coupled to each said data processor for sending and receiving memory transaction requests to and from each said data processor, said interface including distinct incoming request queues for each data processor, including at least two parallel independent incoming request queues for each data processor for storing memory transaction requests received from each said data processor; and said system controller including transaction execution logic for executing said transactions in each of said incoming request queues in the same order that said transactions are stored therein; said transaction execution logic ordering the execution of the requests in accordance with prioritization rules that are independent of the relative order in which an oldest pending request in each of incoming request queues was received by the system controller, such that a first request in a first one of the incoming request queues may be executed and responded to later than a second request in a second one of the incoming request queues that was received by the system controller later than it received the first request.

6. The computer system of claim 5, each data processor including a slave interface, coupled to the system controller, for receiving transaction requests from the system controller, the slave interface including at least one input request queue for storing transaction requests received from the system controller; the transaction requests including read requests and write requests; each transaction request specifying an address for an associated data block to be read or written;

the system controller having a second interface for each data processor including at least one output request queue for storing transaction requests to be transmitted to each data processor's slave interface, wherein each transaction request to be transmitted corresponds to one of the memory transaction requests received by the system controller from a requesting one of the data processors and has an associated transaction class; and each slave interface including logic for responding to received transactions requests by generating a reply for transmission to the system controller upon the availability of resources associated with the transaction requests, the replies strictly ordered for each transaction class in the requesting data processors such that the slave interface replies to transaction requests in the same order as the corresponding memory transaction requests were originally stored in their respective outbound request queues by the requesting one of the data processors.

7. The computer system of claim 5, further including independent outbound data queues in each data processor, one for each of the transaction classes, for storing data blocks associated with write transaction requests in each respective one of the transaction classes, wherein the outbound data queues are filled by their respective data processors prior to the transmission of the associated memory transaction request to the system controller.

8. A method for parallelizing memory transactions in a packet switched cache coherent multiprocessor system having a system controller coupled to a main memory and to a data processor having a cache memory comprising the steps of:

sending memory transaction requests from said data processor to said system controller, including storing said memory transaction requests in at least two parallel independent outbound request queues; said memory transaction requests defining at least two transaction classes corresponding to said at least two outbound request queues, including a first transaction class that includes read memory transaction requests and a second transaction class that includes writeback memory transaction requests;

receiving said memory transaction requests at said system controller and storing said received memory transaction requests in at least two parallel independent incoming request queues, such that said memory transaction requests for each of said transaction classes are stored in distinct ones of incoming request queues; and processing, at said system controller, each of said memory transaction requests by said data processor, said processing step including executing and responding to the requests in each of its incoming request queues and ordering the execution of the requests in accordance with prioritization rules that are independent of the relative order in which an oldest pending request in each of the incoming request queues was received by the system controller, such that a first request in a first one of the incoming request queues may be executed and responded to later than a second request in a second one of the incoming request queues that was received by the system controller later than it received the first request.

9. The method of claim 8 further including:

for write transaction requests, storing data in independent outbound data queues in said data processor, one for each of said transaction classes, prior to the transmission of the associated write transaction request to said system controller.

10. The method of claim 8, wherein said processing step includes:

in response to each of said received transaction requests, generating a reply for transmission to said data processor upon the availability of resources associated with said memory transaction request, said replies strictly ordered with respect to memory transaction requests in each transaction class such that said data processor receives replies to those of said memory transaction requests transmitted from a transaction class in the same order as the transactions were originally issued from said data processor.

11. The method of claim 8 further including:

receiving at said data processor transaction requests from said system controller corresponding to said memory transaction requests received by said system controller, said transaction requests including read requests and write requests; each said transaction request specifying an address for an associated data block to be read or written;

said system controller storing in at least one outbound request queue transaction requests to be transmitted to said data processor.

12. A method for parallelizing memory transactions in a packet switched cache coherent multiprocessor system having a system controller coupled to a main memory and to a plurality of data processors each having a cache memory, comprising the steps of:

sending memory transaction requests from each data processor to the system controller, including storing the memory transaction requests in at least two parallel independent outbound request queues; the memory transaction requests defining at least two transaction classes corresponding to the at least two outbound request queues, including a first transaction class that includes read memory transaction requests and a second transaction class that includes writeback memory transaction requests;

receiving the memory transaction requests at the system controller and storing the received memory transaction requests in distinct incoming request queues for each data processor, including at least two parallel independent incoming request queues for each data processor, such that distinct one of the incoming request queues receives memory transaction requests only from a respective one of the data processors and only for a respective one of the transaction classes; and processing, at the system controller, each of the memory transaction requests by the data processor, the processing step including executing and responding to the requests in each of its incoming request queues and ordering the execution of the requests in accordance with prioritization rules that are independent of the relative order in which an oldest pending request in each of the incoming request queues was received by the system controller, such that a first request in a first one of the incoming request queues may be executed and responded to later than a second request in a second one of the incoming request queues that was received by the system controller later than it received the first request.

13. The method of claim 12, further including:

for write transaction requests generated by each of the data processors, storing data in independent outbound data queues in each data processor, one for each of the transaction classes, prior to the transmission of the associated write transaction request to the system controller.

* * * * *